US011269294B2

(12) United States Patent
Javidi et al.

(10) Patent No.: US 11,269,294 B2
(45) Date of Patent: Mar. 8, 2022

(54) PORTABLE COMMON PATH SHEARING INTERFEROMETRY-BASED HOLOGRAPHIC MICROSCOPY SYSTEM WITH AUGMENTED REALITY VISUALIZATION

(71) Applicant: University of Connecticut, Farmington, CT (US)

(72) Inventors: Bahram Javidi, Storrs, CT (US); Adam Markman, Orange, CT (US); Siddharth Rawat, Storrs, CT (US); Arun Anand, Gujarat (IN)

(73) Assignee: University of Connecticut, Farmington, CT (US)

( * ) Notice: Subject to any disclaimer, the term of this patent is extended or adjusted under 35 U.S.C. 154(b) by 51 days.

(21) Appl. No.: 16/272,581

(22) Filed: Feb. 11, 2019

(65) Prior Publication Data

US 2019/0250558 A1 Aug. 15, 2019

Related U.S. Application Data

(60) Provisional application No. 62/631,140, filed on Feb. 15, 2018, provisional application No. 62/631,268, filed on Feb. 15, 2018.

(51) Int. Cl.
*G03H 1/02* (2006.01)
*G03H 1/04* (2006.01)
(Continued)

(52) U.S. Cl.
CPC ............ *G03H 1/02* (2013.01); *G01N 21/453* (2013.01); *G03H 1/0443* (2013.01);
(Continued)

(58) Field of Classification Search
CPC ..... G03H 2001/0033; G03H 2001/005; G03H 2226/02; G01N 21/453
See application file for complete search history.

(56) References Cited

U.S. PATENT DOCUMENTS 4,555,179 A 11/1985 Langerholc et al.
5,299,035 A 3/1994 Leith et al.
(Continued)

FOREIGN PATENT DOCUMENTS

CN 101894276 A 11/2010
CN 101894276 B 9/2012
(Continued)

OTHER PUBLICATIONS

Javidi et al., "Sickle cell disease diagnosis based on spatio-temporal cell dynamics analysis using 3D printed shearing digital holographic microscopy", Optics Express, vol. 26, No. 10, May 2018, 14 pages.
(Continued)

*Primary Examiner* — Darryl J Collins
*Assistant Examiner* — Tamara Y. Washington
(74) *Attorney, Agent, or Firm* — Michael Best & Friedrich LLP

(57) ABSTRACT

Portable common path shearing interferometry-based holographic microscopy systems. The system includes a light source, a sample holder, a microscope objective lens, a shear plate and an imaging device positioned in a common path shearing interferometry configuration. A housing is configured to receive and hold the shear plate and maintain a position of the shear plate relative to the microscope objective lens.

22 Claims, 54 Drawing Sheets

(51) Int. Cl.
    *G01N 21/45* (2006.01)
    *G03H 1/00* (2006.01)
(52) U.S. Cl.
    CPC ..... *G03H 1/0005* (2013.01); *G03H 2001/005* (2013.01); *G03H 2001/0033* (2013.01); *G03H 2226/02* (2013.01)

(56) References Cited

U.S. PATENT DOCUMENTS

| | | | |
|---|---|---|---|
| 5,371,368 | A | 12/1994 | Alfano et al. |
| 6,072,494 | A | 6/2000 | Nguyen |
| 6,128,003 | A | 10/2000 | Smith et al. |
| 6,215,587 | B1 | 4/2001 | Alfano et al. |
| 7,009,700 | B2 | 3/2006 | Dubois et al. |
| 7,242,449 | B1 | 7/2007 | Yamazaki et al. |
| 8,836,793 | B1 | 9/2014 | Kriesel et al. |
| 9,185,391 | B1 | 11/2015 | Prechtl |
| 10,419,688 | B2 | 9/2019 | Gurgov |
| 2002/0179717 | A1 | 12/2002 | Cummings et al. |
| 2003/0182013 | A1 | 9/2003 | Moreas et al. |
| 2005/0126505 | A1 | 6/2005 | Gallager et al. |
| 2006/0114553 | A1 | 6/2006 | Laudo |
| 2007/0083535 | A1 | 4/2007 | Zilliacus et al. |
| 2008/0018966 | A1 | 1/2008 | Dubois et al. |
| 2008/0317200 | A1 | 12/2008 | Lecomte et al. |
| 2009/0160985 | A1 | 6/2009 | Javidi et al. |
| 2010/0060897 | A1 | 3/2010 | Gustafsson |
| 2011/0053693 | A1 | 3/2011 | Wright |
| 2011/0222745 | A1 | 9/2011 | Osterhout et al. |
| 2012/0194649 | A1 | 8/2012 | Javidi et al. |
| 2013/0015236 | A1 | 1/2013 | Porter et al. |
| 2013/0088568 | A1 | 4/2013 | Nolte |
| 2013/0221084 | A1 | 8/2013 | Doss et al. |
| 2014/0133702 | A1 | 5/2014 | Zheng et al. |
| 2014/0317713 | A1 | 10/2014 | Gadotti |
| 2015/0049343 | A1* | 2/2015 | Shaked ............. G01B 9/02054 356/503 |
| 2015/0269427 | A1 | 9/2015 | Kim et al. |
| 2015/0295711 | A1 | 10/2015 | Javidi et al. |
| 2015/0304638 | A1 | 10/2015 | Cho et al. |
| 2015/0347889 | A1 | 12/2015 | Nosaka et al. |
| 2015/0356306 | A1 | 12/2015 | Carter |
| 2016/0153766 | A1 | 6/2016 | Jones et al. |
| 2016/0305883 | A1 | 10/2016 | Betzig et al. |
| 2016/0360186 | A1 | 12/2016 | Javidi et al. |
| 2017/0023472 | A1 | 1/2017 | Pavillon et al. |
| 2017/0227754 | A1 | 8/2017 | Huang |
| 2017/0322410 | A1 | 11/2017 | Watson et al. |
| 2018/0000441 | A1 | 1/2018 | Wang et al. |
| 2018/0024341 | A1 | 1/2018 | Romanowski et al. |
| 2018/0146180 | A1 | 5/2018 | Keesling et al. |
| 2019/0138786 | A1 | 5/2019 | Trenholm et al. |
| 2019/0226972 | A1* | 7/2019 | Javidi ................. G03H 1/0443 |

FOREIGN PATENT DOCUMENTS

| | | |
|---|---|---|
| CN | 108985344 A | 12/2018 |
| WO | WO2020036782 A2 | 2/2020 |

OTHER PUBLICATIONS

Moon et al., "Identification of Malaria-Infected Red Blood Cells via Digital Shearing Interferometry and Statistical Inference", IEEE Photonics Journal, vol. 5, No. 5, Oct. 2013, 8 pages.
O'Connor et al., "Automatic cell identification and visualization using digital holographic microscopy with head mounted augmented reality devices", Applied Optics, vol. 57, No. 7, Mar. 2018, pp. B197-B204.
Rawat et al., "Compact and field-portable 3D printed shearing digital holographic microscope for automated cell identification", Applied Optics, vol. 56, No. 9, Mar. 2017, pp. D127-D133.
Akram et al., "Camera Based Visible Light Communication System for Underwater Applications", Published in IEEE International Conference on Industrial and Information Systems, ICIIS 2017, 6 Pages.
Alfalou, A. et al., Optical image compression and encryption methods, Adv. Opt. Photon. 1, pp. 589-636 (2009).
Amer et al., "Enhancing underwater optical imaging by using a low-pass polarization filter", Optic Express vol. 27 No. 2 Jan. 21, 2019, 23 Pages.
Ando, et al., "Speckle-Learning-Based Object Recognition Through Scattering Media," Opt. Express 23, 33902-3391 (2015) (9 Pages).
Barrera, J. et al., Optical encryption and QR codes: Secure and noise-free information retrieval, Opt. Express 21 ,oo. 5373-5378 (2013).
Boening, T. W. Groemer, and J. Klingauf, "Applicability of an EM-CCD for spatially resolved TIR-ICS," Opt. Express 18(13), 13516-13528 (2010).
Bonin et al.,"Imaging Systems for Advanced Underwater Vehicles",Journal of Maritime Research, vol. VIII. No. 1, 2011, pp. 65-86.
Burguera et al., "Trajectory-Based Visual Localization in Underwater Surveying Missions", Sensors, 15, 2015, pp. 1708-1735.
Carnicer, A. et al., Vulnerability to chosen-cyphertext attacks of optical encryption schemes based on double random phase keys, Opt. Lett. 30, DD. 1644-1646 (2005).
Chan, R. Khoshabeh, K. B. Gibson, P. E. Gill, and T. Q. Nguyen, "An augmented Lagrangian method for total variation video restoration," IEEE Trans. Image Process. 20(11), 3097-3111 (2011).
Chen, H. Wei, and J. Ferryman, "A Survey of Human Motion Analysis Using Depth Imagery" Pattern Recoqnition Letters, 34, 1995-2006 (2013).
Chen, W. et al., Phase-modulated optical system with sparse representation for information encoding and authentication, IEEE Photon. J. 5, 6900113 (2013).
Chen, Wen, Bahram Javidi, and Xudong Chen. "Advances in optical security systems." Advances in Optics and Photonics 6.2 (2014): 1-37.
Cho et al. "Three-Dimensional Optical Sensing and Visualization Using Integral Imaging," in Proceedings of the IEEE, vol. 99, No. 4, pp. 556-575, Apr. 2011. doi: 10.1109/JPROC.2010.2090114 (Year: 2011).
Cho et al., "Peplography—a passive 30 photon counting imaging through scattering media" Optics Letters vol. 41 No. 22, Nov. 15, 2016 pp. 5401-5404.
Cho et al., "Three-dimensional tracking of occluded objects using integral imaging," Opt. Lett. 33, 2737-2739 (2008).
Cho et al., "Three-Dimensional Visualization of Objects in Turbid Water Using Integral Imaging", Journal of Display Technology, vol. 6, No. 10, Oct. 2010, pp. 544-547.
Cho et al.,3D passive Integral Imaging Using Compressive Sensing, Nov. 2012, Optical Society of America, vol. 20. No. 24, pp. 26624-26635.
Cho, Myungjin, and Bahram Javidi. "Three-dimensional photon counting double-random-phase encryption." Optics letters 38.17 (2013): 3198-3201.
Dainty, J. C., "The Statistics of Speckle Patterns," Progress in Optics XIV, North-Holland (1976).
Doster et al., "Laguerre-Gauss and Bessel-Gauss beams propagation through turbulence: analysis of channel efficiency", applied optics vol. 55 No. 36, Dec. 20, 2016 pp. 10239-10246.
Dubois, F., Automatic spatial frequency selection algorithm for pattern recognition by correlation, Appl. Opt. 32, 4365-4371 (1993).
Dubreuil et al., "Exploring underwater target detection by imaging polarimetry and correlation techniques", Applied Optics vol. 52 No. 5, 2013, pp. 997-1005.
Frauel, Y. et al., Resistance of the double random phase encryption against various attacks, Opt. Express 15, pp. 10253-10265 (2007).
Goodman, "Statistical Optics", Book Published in 2000, 16 pages.
Goudail et al., "Bhattacharyya distance as a contrast parameter for statistical processing of noisy optical images", Optical Society of America, © 2004, pp. 1231-1240.
Goudail, F. et al., Influence of a perturbation in a double phase-encoding system, J. Opt. Soc. Am. A 15, pp. 2629-2638 (1998).
Hamamatsu, "Photon is Our Business", Book © 2007, 14 Pages.

(56) References Cited

OTHER PUBLICATIONS

Han, L. Shao, D. Xu, J. Shotton, "Enhanced Computer Vision with Microsoft Kinect Sensor: A Review", IEEE Trans. on Cybernetics, 43, 5, 1318-1334 (2013).
Hoshino, F. Okano, H. Isono, and I. Yuyama, "Analysis of resolution limitation of integral photography," J. Opt. Soc. Am. A 15(8), 2059-2065 (1998).
Huffman, David A., A Method for the Construction of Minimum-Redundancy Codes, Proceedings of the IRE (IEEE, 1952), Sep. 1952, pp. 1098-1101.
International Preliminary Report on Patentability for Application No. PCT/US2019/045477 dated Feb. 25, 2021 (7 pages).
International Search Report and Written Opinion for Application No. PCT/US2019/045477 dated Mar. 5, 2020 (13 pages).
Jang and B. Javidi, "Three-dimensional synthetic aperture integral imaging," Opt. Lett. 27(13), 1144-1146 (2002).
Javidi et al., "Multidimensional Optical Sensing and Imaging System (MOSIS): From Macroscales to Microscales", Proceedings OP the IEEE, vol. 105 No. 5 May 5, 2017, pp. 850-875.
Javidi, B., Nonlinear joint power spectrum based optical correlation, ADDI. Opt. 28, DD. 2358-2367 (1989).
Kakue et al., "High-speed phase imaging by parallel phase-shifting digital holography", Optics Letters vol. 36 No. 21, pp. 4131-4133.
Kaushal et al., "Underwater Optical Wireless Communication", IEE Access Apr. 11, 2016, pp. 1518-1547.
Khalighi et al., "Underwater Wireless Optical Communications Using Silicon Photo-Multipliers", IEEE Photonics Journal, Jul. 14, 2017, 11 Pgs.
Krizhevsky, I. Sutskever, and G. Hinton, "Imagenet classification with deep convolutional neural networks," in the Neural Information Processing Systems Conference (2012), pp. 1097-1105.
Kullback et al., "On Information and Sufficiency", The Annal of Mathmatatical . Statistics vol. 22 No. 1, 1951, pp. 79-86.
Lathi et al., "Modern Digitial and Analog Communication Systems", Book Oxford University Press 2010, 15 Pgs.
Lawrence, C. L. Giles, A. C. Tsoi, and A. D. Back, "Face recognition: a convolutional neural-network approach," IEEE Trans. Neural Netw. 8(1), 98-113 (1997).
Leith et al. "Imaging Through Scattering Media With Holography," J. Opt. Soc. Am. A9, 1148-1153 (1992) (6 Pages).
LeMaster et al., "Mid-Wave Infrared 3D Integral Imaging at Long Range" J. Display Technology 9(7): 545-551 (2013) [7 pages].
Levin and Q. Zhang, "A global analysis of factors controlling VIIRS nighttime light levels from densely populated areas," Remote Sens. Rev. 190, 366-382 (2017).
Li, Y. et al., Security and encryption optical systems based on a correlator with significant output images, Appl. Opt. 39, pp. 5295-5301 (2000).
Lin et al., "Radiative transfer simulations of the two-dimensional ocean glint reflectance and determination of the sea surface roughness", Applied Optics vol. 55 No. 6 Feb. 20, 2016, pp. 1206-1215.
Lippman, "Epreuves reversibles donnant la sensation du relief", Journal of Theoretical and Applied Physics, vol. 7 No. 1, 1908, pp. 821-825.
Liu et al., "An underwater acoustic direct sequence spread spectrum communication system using dual spread spectrum code", Frontiers of Information Technology & Electronic Engineering vol. 19 No. 8, 2018, pp. 972-983.
Llavador, E. Sánchez-Ortiga, G. Saavedra, B. Javidi, and M. Martinez-Corral, "Free-depths reconstruction with synthetic impulse response in integral imaging," Opt. Express 23(23), 30127-30135 (2015).
Lopez-Salcedo, "Simple Closed-Form Approximation to Ricean Sum Distributions", IEEE Signal Processing Letters, Apr. 2009, 4 Pgs.
Markman et al. "Learning in the dark: 3D integral imaging object recognition in very low illumination conditions using convolutional neural networks" OSA Continuum, 1(2):3068-3071 (2018).
Markman et al. "Three-dimensional object visualization and detection in low light illumination using integral imaging" Optic letters vol. 42, No. 16, Aug. 15, 2017 pp. 3068-3071.
Markman, A., Bahram Javidi, and Mohammad Tehranipoor. "Photon-counting security tagging and verification usina optically encoded QR codes." Photonics Journal, IEEE 6.1 (2014): 6800609.
Markman, Adam, and Bahram Javidi. "Full-phase photon-counting double-random-phase encryption." JOSA A 31.2 (2014): 394-403.
Matoba et al., "Multimodal Imaging Based on Digital Holography", Proceedings of the IEEE vol. 105, No. 5, May 2017, pp. 906-923.
Matoba et al., Encrypted optical memory systems based on multi-dimensional keys for secure data storage and communications, IEEE Gire. Dev. Maa. 16, DD. 8-15 (2000).
Matoba, 0. et al., Optical techniques for information security, Proc. IEEE 97, pp. 1128-1148 (2009).
Mogensen et al., Phase-Only Optical Encryption, Apr. 2000, Optical Society of America, vol. 25 No. 8, pp. 566-568.
Mollah et al., "Comparative Analysis of Gold Codes with PN Codes Using Correlation Property in CDMA Technology" International Conference on Computer Communication and Informatics Jan. 10-12, 2012, 6 Pgs.
Ohbuchi, E. et al., Barcode readers using the camera device in mobile phones, in Proceedings of IEEE 2004 International Conference on Cyberworlds, M. Nakajima, ed. (IEEE, 2004), DD. 260-265.
Oiknin et al., "Compressive sensing resonator spectroscopy", Optics Letters vol. 42, No. 1, Jan. 1, 2017, pp. 25-28.
Okano, H. Hoshino, J. Arai, and I. Yuyama, "Real-time pickup method for a three-dimensional image based on integral photography," Appl. Opt. 36(7), 1598-1603 (1997).
Okoshi, "Three-Dimensional Displays", Proceedings of the IEEE, vol. 68, No. 5, 1980, pp. 548-564.
Palmese et al., "Spread Spectrum Modulation for Acoustic Communication in Shallow Water Channel", University of Connecticut, Paper No. 061215-038, IEEE © 2007, 4 Pgs.
Peng et al., "Generalization of the Dark Channel Prior for Single Image Restoration", IEEE Transactions on Image Processing, vol. 27. No. 6. Jun. 2018 , 2856-2868.
Peng et al., "Underwater Image Restoration Based on Image Blurriness and Light Absorption", IEEE Transactions on Image Processing, vol. 26, No. 4, Apr. 2017, pp. 1579-1594.
Perez-Cabre, E. et al., Information authentication using photon-counting double-random-phase encrypted images, Opt. Lett. 36, pp. 22-24 (2011).
Perez-Cabre, Elisabet et al., Photon-counting double-random-phase encoding for secure image verification and retrieval, Aug. 2012, Polytechnic University of Catalonica, Journal of Optics 14.
Petrášek and K. Suhling, "Photon arrival timing with sub-camera exposure time resolution in wide-field time-resolved photon counting imaging," Opt. Express 18(24), 24888-24901 (2010).
Phillips, D. Gruber, G. Vasan, C. Roman, V. Pieribone, and J. Sparks, "Observations of in situ deep-sea marine bioluminescence with a high-speed, high-resolution sCMOS camera," Deep Sea Res. Part I Oceanogr. Res. Pap. 111, 102-109 (2016).
Photron, FASTCAM, SA-X2 Datasheets, 2012, 6 pgs.
Proakis, Digital Communication Fourth Edition Book, McGraw-Hill 2000, 12 Pgs.
Proakis, et al. Digital Communication Fifth Edition Book, McGraw-Hill Higher Education, 2008, 15 Pgs.
Refregier et al., "Nonlinear joint-transform correlation: an optimal solution for adaptive image discrimination and input noise robustness", Optics Letters, vol. 19, No. 6, Mar. 15, 1994, pp. 405-407.
Refregier, P. et al., Optical image encryption based on input plane and Fourier plane random encoding, Opt. Lett. 20, DD. 767-769 (1995).
Sadjadi and A. Mahalanobis, "Automatic target recognition XXVIII," Proc. SPIE 10648, 106480I (2018).
Sadjadi et al., "Automatic Target Recognition XXVII", Proceedings of SPIE vol. 10202, Apr. 10-11, 2017, 9 Pgs.
Shan et al, Application of QR Two-dimension Code Technology in Credits Certification System, Dec. 2013, ACM ICCC '13: Proceedings of the Second International Conference on Innovative Computing and Cloud Computing, pp. 222-224.
Song et al., "ROC operating point selection for classification of imbalanced data with application to computer-aided polyp detection in CT colonography", Int J CARS, 2014, pp. 79-89.

(56) References Cited

OTHER PUBLICATIONS

Stern, D. Aloni, and B. Javidi, "Experiments with three-dimensional integral imaging under low light levels," IEEE Photon. J. 4(4), 1188-1195 (2012).
Suzuki, H. et al., Experimental evaluation of fingerprint verification system based on double random phase encoding, Opt. Express 14, pp. 1755-1766 (2006).
Tajahuerce, Enrique, and Bahram Javidi. "Encrypting three-dimensional information with digital holoaraphy." Aoolied Ootics 39.35 (2000): 6595-6601.
Takai et al., "Optical Vehicle-to-Vehicle Communication System Using LED Transmitter and Camera Receiver", IEEE Photonics Journal vol. 6 No. 5 Oct. 2014, 14 Pgs.
Tanzid et al. "Absorption-Induced Image Resolution Enhancement in Scattering Media," ACS Photonics. 3:1787-1793 (2016) (7 Pages).
Tavakoli, B. Javidi, and E. Watson, "Three dimensional visualization by photon counting computational Integral Imaging," Opt. Express 16(7), 4426-4436 (2008).
Thompson et al., "Imaging in Scattering Media by Use of Laser Speckle," J. Opt. Soc. Am. A 14, 2269-2277 (1997) (9 Pages).
Towghi, N. et al., Fully phase encryption image processor, J. Opt. Soc. Am. A 16, 1999, pp. 1915-1927.
Traver et al. Paper entitled "Human Gesture Recognition Using Three Dimensional Integral Imaging" J. Opt. Soc Am. A 31(10):2312-2320 (2014). [9 pages].
Treibitz et al., "Active Polarization Descattering", IEEE Trans. PAMI, vol. 31, No. 3, 2009, pp. 385-399.
Viola, M. Jones, and D. Snow, "Detecting pedestrians using patterns of motion and appearance," Int. J. Comput. Vis. 63(2), 153-161 (2005).
Wu et al. "Hiding Scattering Layers for Noninvasive Imaging of Hidden Objects," Scientific Reports vol. 5, 8375 (2015) (5 Pages).
Wu et al., Blue Laser Diode Enables Underwater Communication at 12.4Gbps, Scientific Reports, Published: Jan. 17, 2017, 10 Pgs.
Xia et al., "One million fps digital holography", Electronics Letters vol. 50 No. 23, Nov. 6, 2014, pp. 1693-1695.
Xiao et al., "Advances in three-dimensional integral imaging: sensing, display, and applications [Invited]", Applied Optics Vo. 52 No. 4, Feb. 1, 2013 pp. 546-560.
Yamaguchi and R. Higashida, "3D touchable holographic light-field display," Appl. Opt. 55(3), A178-A183 (2016).
Yoo, et al., "Imaging Through a Scattering Wall Using Absorption," Opt. Lett. 16, 1068-1070 (1991) (3 Pages).
Zweig et al., "Receiver-Operating Characteristic (AOC) Plots: A Fundamental Evaluation Tool in Clinical Medicine", Clinical Chemistry Vo. 39 No. 4, 1993, pp. 561-577.
Zhao et al., "A novel three-dimensional object detection with the modified You Only Look Once method," International Journal of Advanced Robotic Systems, Mar.-Apr. 2018: 1-13.

* cited by examiner

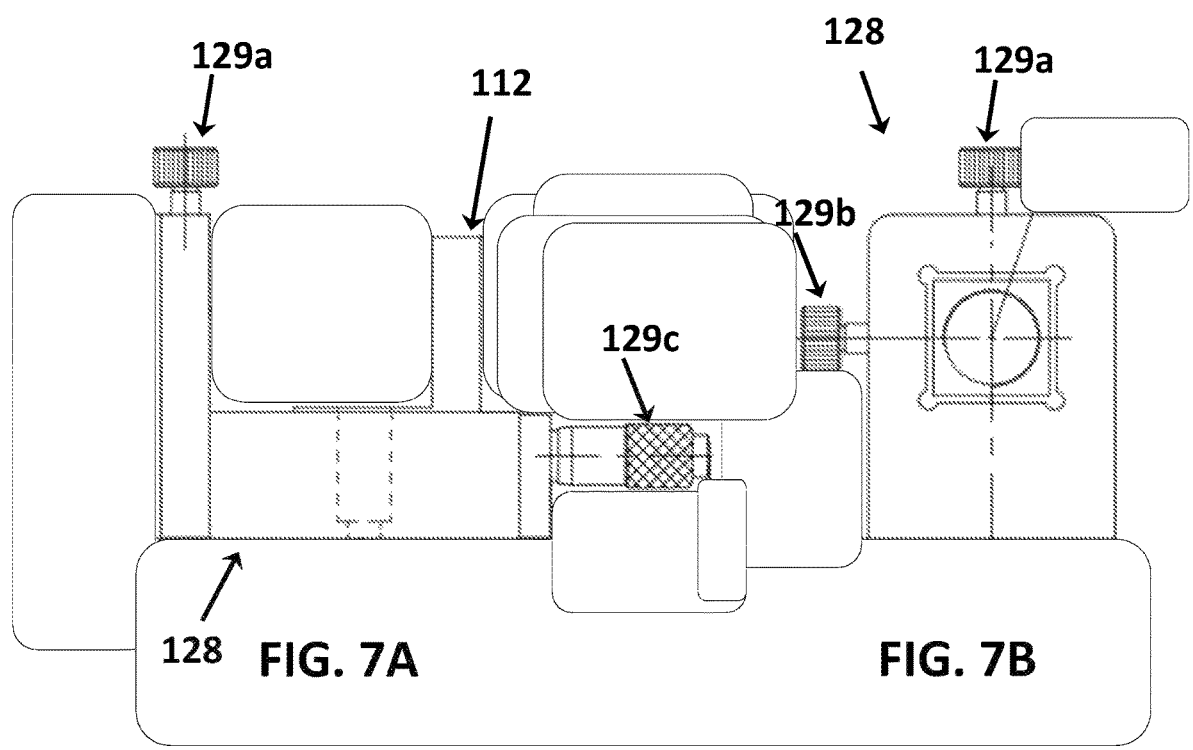

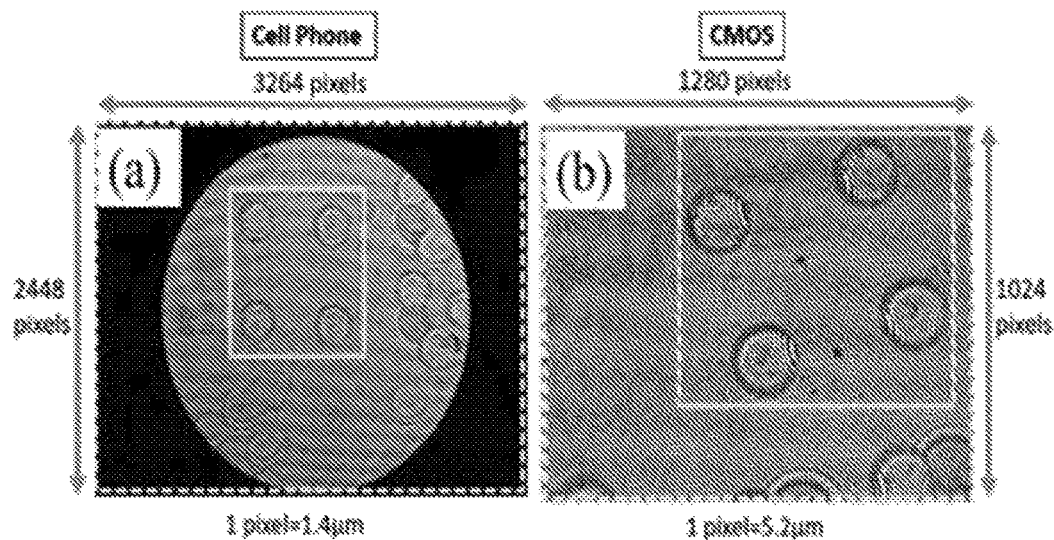
FIG. 21A  FIG. 21B
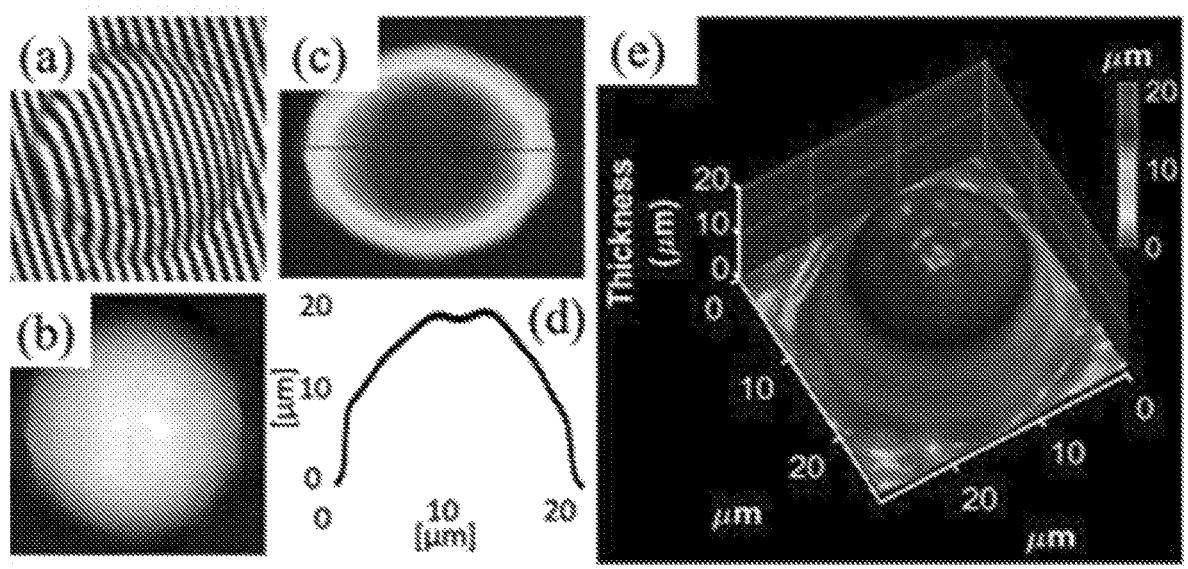
FIG. 22

| Line Color on Graph | Setup used | Data collection location | Bench used | Laser Source | Stability (nm) | Standard deviation (nm) |
|---|---|---|---|---|---|---|
| Red (201) | black setup | Lab on 4th floor ITE (08/08/2017) | floating optical bench | He-Ne laser | 0.11 | 0.010 |
| Black (202) | black setup | Lab on 4th floor ITE (08/08/2017) | Non floating optical bench | He-Ne laser | 0.24 | 0.029 |
| Green (203) | black setup | Lab on 4th floor ITE (08/08/2017) | a wooden table | He-Ne laser | 0.27 | 0.030 |
| Cyan (204) | green setup | Lab in BECAT (07/25/2017) | non-floating optical bench | Red laser diode | 0.39 | 0.172 |
| Magenta (205) | grey setup | UCONN Health center (03/21/2017) | lab bench | Red laser diode | 0.78 | 0.445 |
| Blue (206) | black setup | UCONN Health center (03/21/2017) | lab bench | He-Ne laser | 0.79 | 0.015 |

FIG. 28

PORTABLE COMMON PATH SHEARING INTERFEROMETRY-BASED HOLOGRAPHIC MICROSCOPY SYSTEM WITH AUGMENTED REALITY VISUALIZATION

CROSS-REFERENCE TO RELATED APPLICATIONS

This application claims priority to U.S. Provisional Application Ser. No. 62/631,268, filed on Feb. 15, 2018, and entitled "Portable Common Path Shearing Interferometry-Based Holographic Microscopy System" and to U.S. Provisional Application Ser. No. 62/631,140, filed on Feb. 15, 2018, and entitled "Automated Cell Identification Using Shearing Interferometry." The content of each of the foregoing provisional applications is incorporated herein in their entireties.

STATEMENT OF GOVERNMENT SUPPORT

This invention was made with Government support under Grant 1545687 and Grant 1422179 awarded by the National Science Foundation (the National Science Foundation, Directorate for Engineering (NSF ECCS 1545687)) and National Science Foundation (the National Science Foundation Division of Information and Intelligent Systems (NSF IIS-1422179)). The government has certain rights in the invention.

FIELD OF THE DISCLOSURE

The present disclosure relates generally to the field of imaging techniques, equipment and systems and, more particularly, to portable common path shearing interferometry-based holographic microscopy systems.

BACKGROUND OF THE DISCLOSURE

In general, interferometry based holographic microscopy systems are not portable. These systems are generally designed using standard optical components mounted to a floating optical table to have sufficient interferometric level stability in the nanometer to sub nanometer range for recording interference fringes.

Thus, an interest exists for improved interferometry based holographic microscopy systems and related methods of use. These and other inefficiencies and opportunities for improvement are addressed and/or overcome by the systems and methods of the present disclosure.

SUMMARY OF THE DISCLOSURE

The present disclosure provides portable common path shearing interferometry-based holographic imaging systems.

An embodiment includes a portable common path shearing interferometry based holographic imaging system. The portable common path shearing interferometry based holographic imaging system includes a laser light source, a sample holder, a microscope objective lens, a shear plate, an imaging device, and a housing. The housing is configured to receive and hold the shear plate and maintain a position of the shear plate relative to the microscope objective lens. The system is configured for positioning the laser light source, the sample holder, the microscope objective lens, the shear plate and the imaging device in a common path shearing interferometry configuration.

In some embodiments, the system has a length of less than 350 mm, a width of less than 350 mm and a height of less than 300 mm. In some embodiments, the system has a length of less than 320 mm, a width of less than 320 mm and a height of less than 250 mm. In some embodiments, the system has a length of less than 150 mm, a width of less than 150 mm and a height of less than 250 mm. In some embodiments, the system has a length of less than 100 mm, a width of less than 100 mm and a height of less than 150 mm.

In some embodiments, the system has a mass of less than 6 kg. In some embodiments, the system has a mass of less than 2 kg. In some embodiments, the system has a mass of less than 1 kg. In some embodiments, the system has a mass of less than 0.7 kg.

In some embodiments, the system exhibits a temporal stability of 1.5 nm or better when used without mechanical isolation (e.g., not on a floating optical table), where stability is the mean or average of the standard deviation calculated for every pixel of a selected area of the imaging device (e.g., 128 by 128 pixels) over a period of time calculated at a video rate of 30 frames per second relative to reference frame. In some embodiments, the system exhibits a temporal stability of 1.2 nm or better when used without mechanical isolation. In some embodiments, the system exhibits a temporal stability of 1.0 nm or better when used without mechanical isolation. In some embodiments, the system exhibits a temporal stability of 0.8 nm or better when used without mechanical isolation. In some embodiments, the system exhibits a temporal stability of 0.5 nm or better when used without mechanical isolation. In some embodiments, the system exhibits a temporal stability of 0.4 nm or better when used without mechanical isolation. In some embodiments, the system exhibits a temporal stability of 0.3 nm or better when used without mechanical isolation. In some embodiments, the system exhibits a temporal stability of 0.26 nm or better when used without mechanical isolation. In some embodiments, the system exhibits a temporal stability of 0.25 nm or better when used without mechanical isolation. In some embodiments, the system exhibits temporal stability of 0.24 nm or better when used without mechanical isolation.

In some embodiments, the system exhibits temporal stability in a range of 0.1 nm to 1.5 nm, in a range of 0.1 nm to 1.2 nm, in a range of 0.1 nm to 1.0 nm, in an range of 0.1 nm to 0.5 nm, in a range of 0.1 nm to 0.4 nm, in a range of 0.1 nm to 0.3 nm, in a range of 0.1 nm to 0.26 nm, in a range of 0.1 nm to 0.25 nm, or in a range of 0.1 nm to 0.24 nm without mechanical isolation.

In some embodiments, the system exhibits temporal stability in a range of 0.2 nm to 1.5 nm, in a range of 0.2 nm to 1.2 nm, in a range of 0.2 nm to 1.0 nm, in an range of 0.2 nm to 0.5 nm, in a range of 0.2 nm to 0.4 nm, in a range of 0.2 nm to 0.3 nm, in a range of 0.2 nm to 0.26 nm, in a range of 0.2 nm to 0.25 nm, or in a range of 0.2 nm to 0.24 nm without mechanical isolation.

In some embodiments, the system exhibits temporal stability of 0.2 nm or better when used with mechanical isolation (e.g., on a floating optical table). In some embodiments, the system exhibits temporal stability of 0.15 nm or better when used with mechanical isolation In some embodiments, the system exhibits temporal stability of 0.12 nm or better when used with mechanical isolation.

In some embodiments, a beam path of the system is uninterrupted between the laser light source and the sample holder.

In some embodiments, the optical path between the laser light source and the imaging device is uninterrupted except by the microscope objective, the shear plate, the sample and any support for the sample.

In some embodiments, a beam path is oriented in the same direction as the laser light source and is disposed between the laser light source and the sample holder.

In some embodiments, the housing comprises a shearing plate mounting portion including: a slot configured to receive the shearing plate; a first channel that enables light from the microscope objective to reach the shearing plate; and a second channel that enables light from the shearing plate to reach the imaging device, wherein the second channel intersects the first channel. In some embodiments, the microscope objective is mounted in or at an opening of the first channel. In some embodiments, the sample holder is mounted on a sidewall of the housing. In some embodiments, the microscope objective and the sample holder are mounted to the housing. In some embodiments, the imaging device is mounted to the housing. In some embodiments, the laser light source is mounted to the housing.

In one embodiment, a system for automatic cell identification and visualization using digital holographic microscopy using an augmented reality display device can include a sample holder configured to hold and support a sample, a laser light source configured to emit a beam to illuminate the sample, a microscope objective lens configured to magnify the beam after illuminating the sample, and a shear plate configured to split the beam into two laterally sheared beams generating a hologram of the sample. The system can further include an imaging device mounted to an augmented reality display device, configured to capture one or more images of the hologram of the sample. The augmented reality display device can include a display and can be configured to render a pseudo-colored 3D visualization of the sample and information associated with the sample, on the display.

In some embodiments, the system can further include a computing system in communication with the imaging device and augmented reality display device. The computing system can be configured to receive one or more images of the hologram of the sample from the imaging device, segment the one or more images to isolate regions of interest including the sample, digitally reconstruct the one or more images based on the regions of interest including the sample, extract one or more features from the reconstructed one or more images, classify the sample using the extracted features and one or more classifiers, generate the pseudo-colored 3D visualization of the sample, and instruct the augmented reality display device to render the pseudo-colored 3D visualization of the sample and the information associated with the sample.

In some embodiments, the augmented reality display device can be a head-mounted device and the display can be an optical see through display. The one or more features include one or more of: optical volume (OV), coefficient of variation (COV), mean optical path length (MOPL), projected area (AP), PA to OA ratio, cell skewness, or cell kurtosis. The one or more classifiers include one or more of: random forest (RF) classifier, support vector machines (SVM), or K-nearest neighbor (KNN).

In some embodiments, the sample can be one or more biological cells. The pseudo-colored 3D visualization of the sample and the information associated with the sample can include a 3D rendering of an optical path length profile and labels for cell type of the one or more cells, and the extracted one or more features.

In some embodiments, the system can further include a housing configured to receive and hold the shear plate and maintain a position of the shear plate relative to the microscope objective lens. The laser light source, the shear plate, the microscope objective lens, and the imaging device can be mounted to the housing. The imaging device can be coupled to an opening of the housing. The beam path of the system is disposed between the laser light source and the sample holder.

In some embodiments, a method for automatic cell identification and visualization using digital holographic microscopy using an augmented reality display device can include holding and supporting, via a sample holder, a sample, emitting, via a laser light source, a beam to illuminate the sample, magnifying, via a microscope objective lens, the beam illuminating the sample. The method can further include splitting the beam using a shear plate into two laterally sheared beams. A hologram of the sample is generated using the two laterally sheared beams. The method further includes capturing, via an imaging device mounted to an augmented reality display device, one or more images of the hologram of the sample, and rendering, via the augmented reality display device including a display, a pseudo-colored 3D visualization of the sample and information associated with the sample, on the display.

Any combination or permutation of embodiments is envisioned. Additional advantageous features, functions and applications of the disclosed systems of the present disclosure will be apparent from the description which follows, particularly when read in conjunction with the appended FIGS. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended FIGS. It is to be noted that the various features, steps and combinations of features/steps described below and illustrated in the FIGS. can be arranged and organized differently to result in embodiments which are still within the scope of the present disclosure. To assist those of ordinary skill in the art in making and using the disclosed systems, reference is made to the appended FIGS., wherein:

FIG. 7A is a side view of a lens and stage mounting component of the system of FIG. 1A;

FIG. 7B is a top view of the lens and stage mounting component of FIG. 8A;

FIG. 21A is a hologram showing a field of view (FOV) of a first example system when using a cell phone camera as described in Example 1;

FIG. 21B is a hologram showing a field of view (FOV) of the first example system when using a CMOS sensor as described in Example 1;

FIGS. 22A-E are experimental results for the first example system using the CMOS sensor to image microbeads: FIG. 22A shows a digital hologram of a 20 μm glass bead;

FIG. 22B shows the unwrapped phase profile of the same bead; FIG. 22C shows a 2D thickness profile; FIG. 22D shows a 1D cross-sectional profile of the bead along the line shown in FIG. 22C; and FIG. 22E shows a pseudocolor 3D rendering of the thickness profile for the glass bead;

FIG. 23A shows a digital hologram of Diatom-Tabellaria using the CMOS sensor; FIG. 23B shows a 2D thickness profile; FIG. 23C shows a 1D cross-sectional profile of diatom along the line shown in FIG. 23B; FIG. 23D shows a pseudocolor 3D rendering of the thickness profile for the diatom; likewise, FIGS. 23E-23H are the digital hologram, 2D thickness profile, 1D cross-sectional profile, and pseudocolor 3D rendering of the thickness profile for *E. coli* bacteria, respectively;

FIG. 24A shows a digital hologram of a 20-μm glass bead;

FIG. 24B shows the unwrapped phase profile of a 20-μm glass bead and FIG. 24C shows a 2D thickness profile; FIG. 24D shows a 1D cross-sectional profile of the bead along the line shown in FIG. 25C; FIG. 24E shows a pseudocolor 3D rendering of the thickness profile for the glass bead;

FIG. 25A shows a digital hologram of yeast cells; FIG. 25B shows the unwrapped phase profile for the same cells; FIG. 25C shows a 2D thickness profile; FIG. 25D shows a 1D cross-sectional profile of the yeast cells along the line shown in FIG. 25C; FIG. 25E shows a pseudocolor 3D rendering of the thickness profile for the yeast cells;

FIG. 27A depicts three 3D reconstructed images/profiles after numerical processing of digital holograms of healthy RBCs from different patients taken with the first example system; FIG. 27B depicts three 3D reconstructed images/profiles after numerical processing of digital holograms of sickle cell diseased (SCD) RBCs from different patients taken with the first example system;

FIG. 28 is a table of experimental temporal stability data acquired using different example systems placed in varying locations that exhibit different sources of noise

DETAILED DESCRIPTION OF DISCLOSURE

Figure 1A:
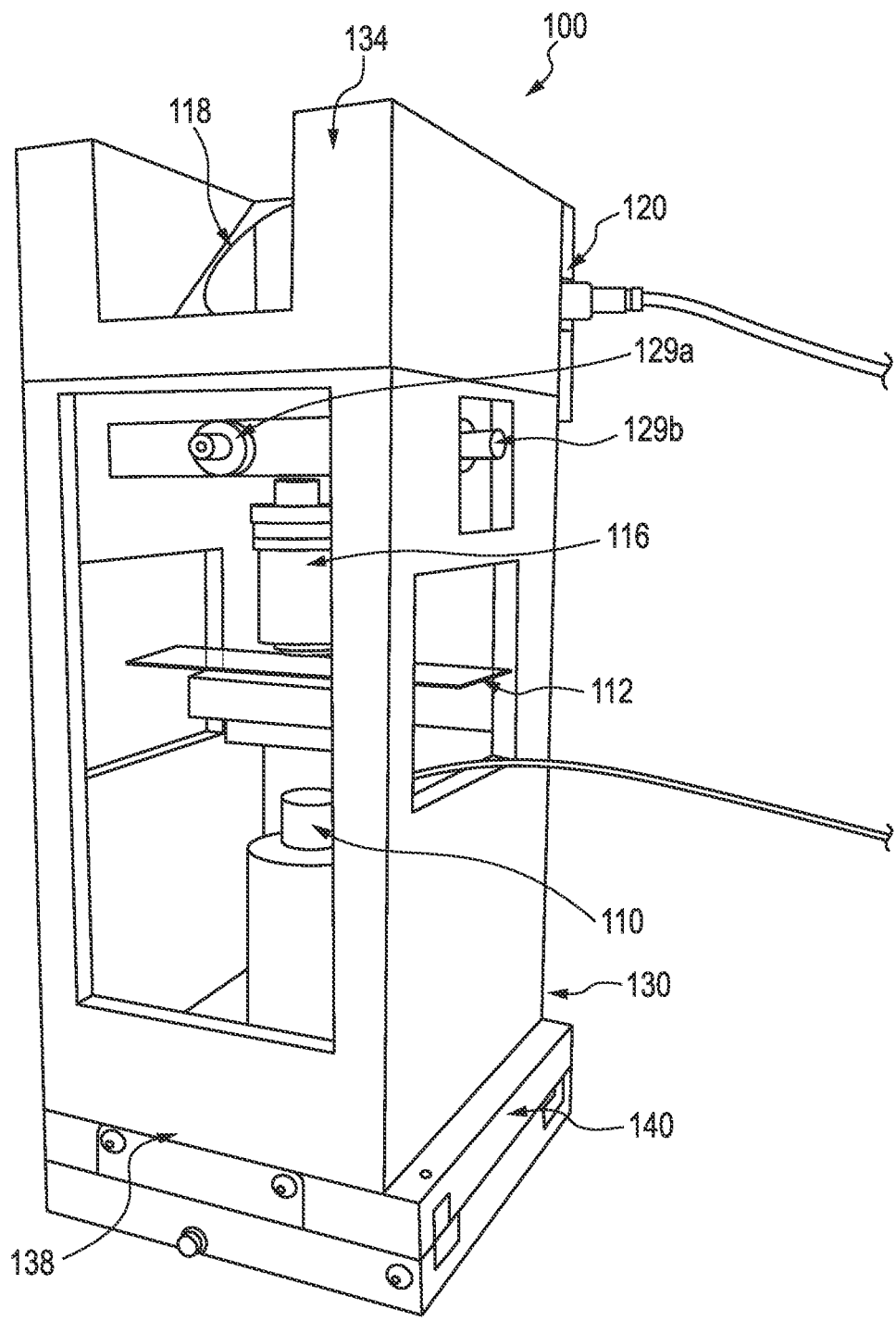
FIG. 1A is a perspective view of a portable common path shearing interferometry-based holographic microscopy system in accordance with some embodiments.
Figure 1B:
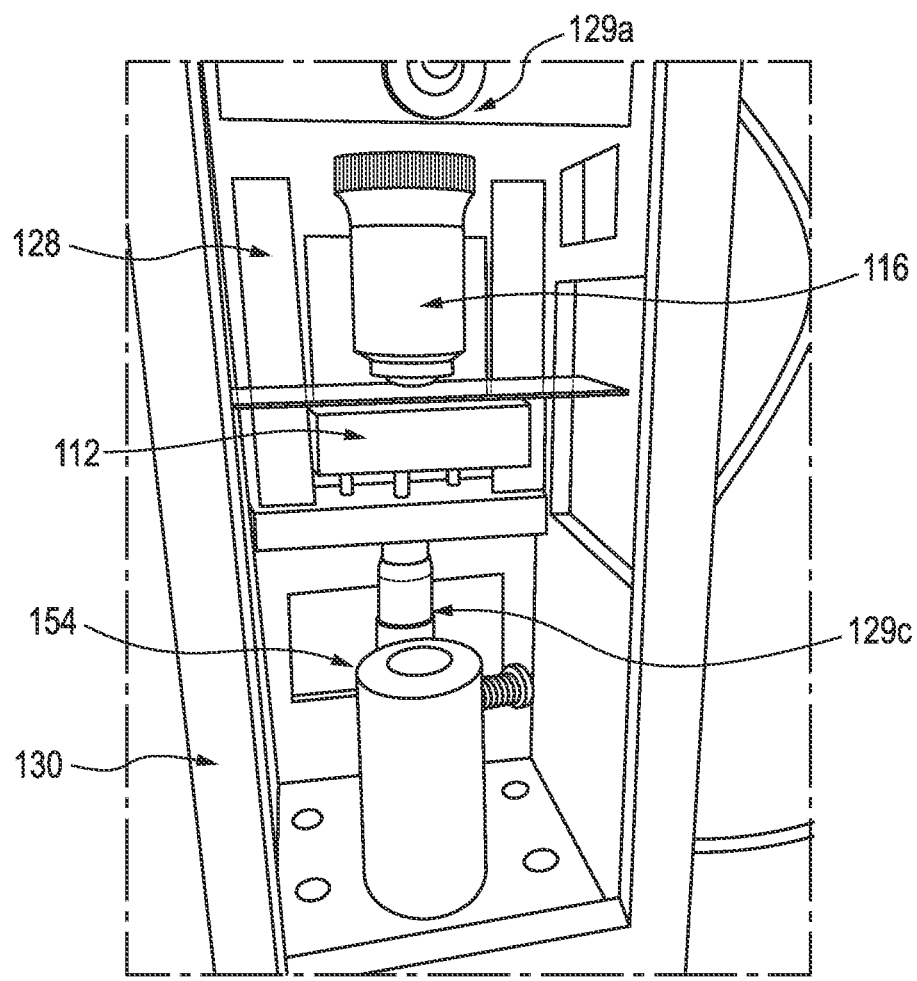
FIG. 1B is a front perspective view of a portion of the system of FIG. 1A.
Figure 1C:
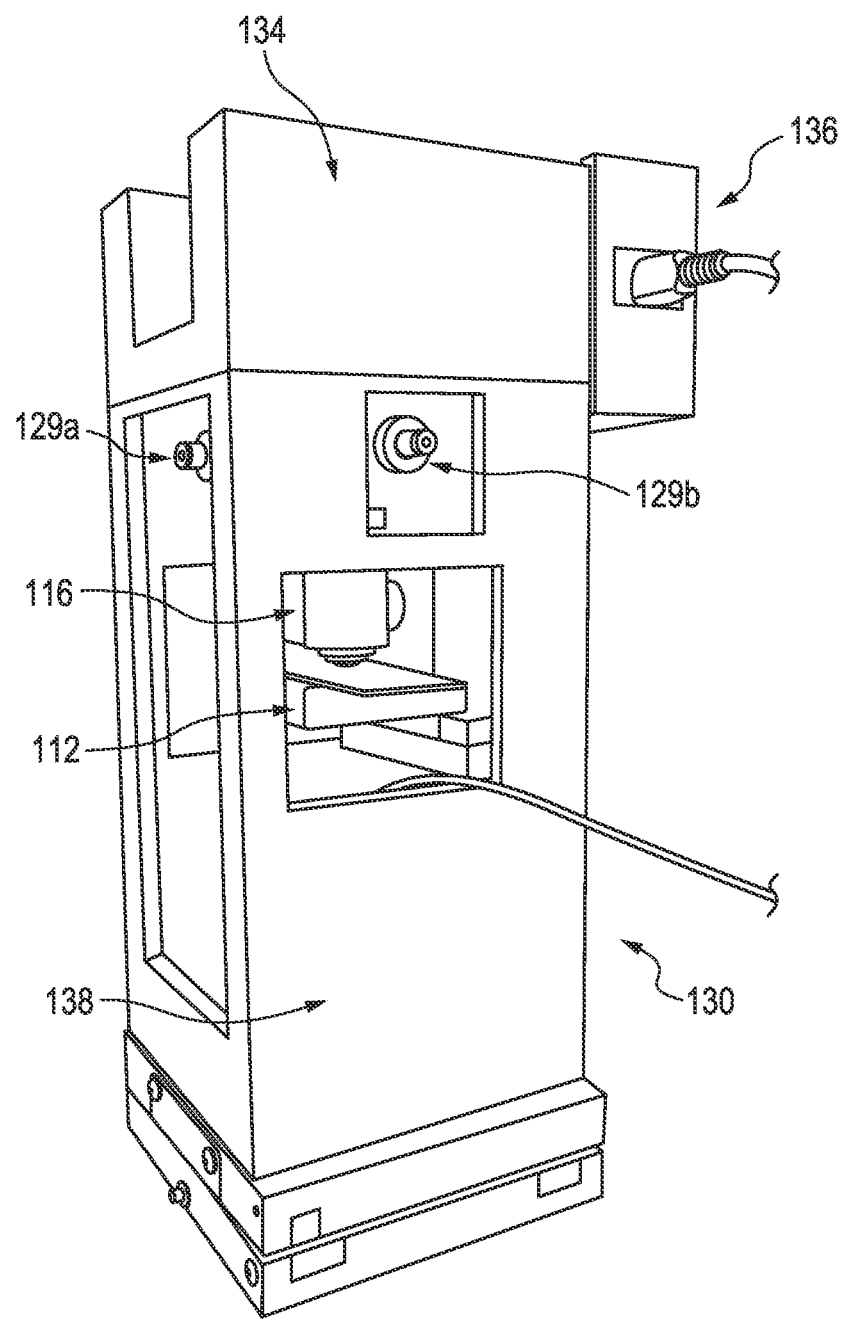
FIG. 1C is a side perspective view of the system of FIG. 1A.
Figure 1D:
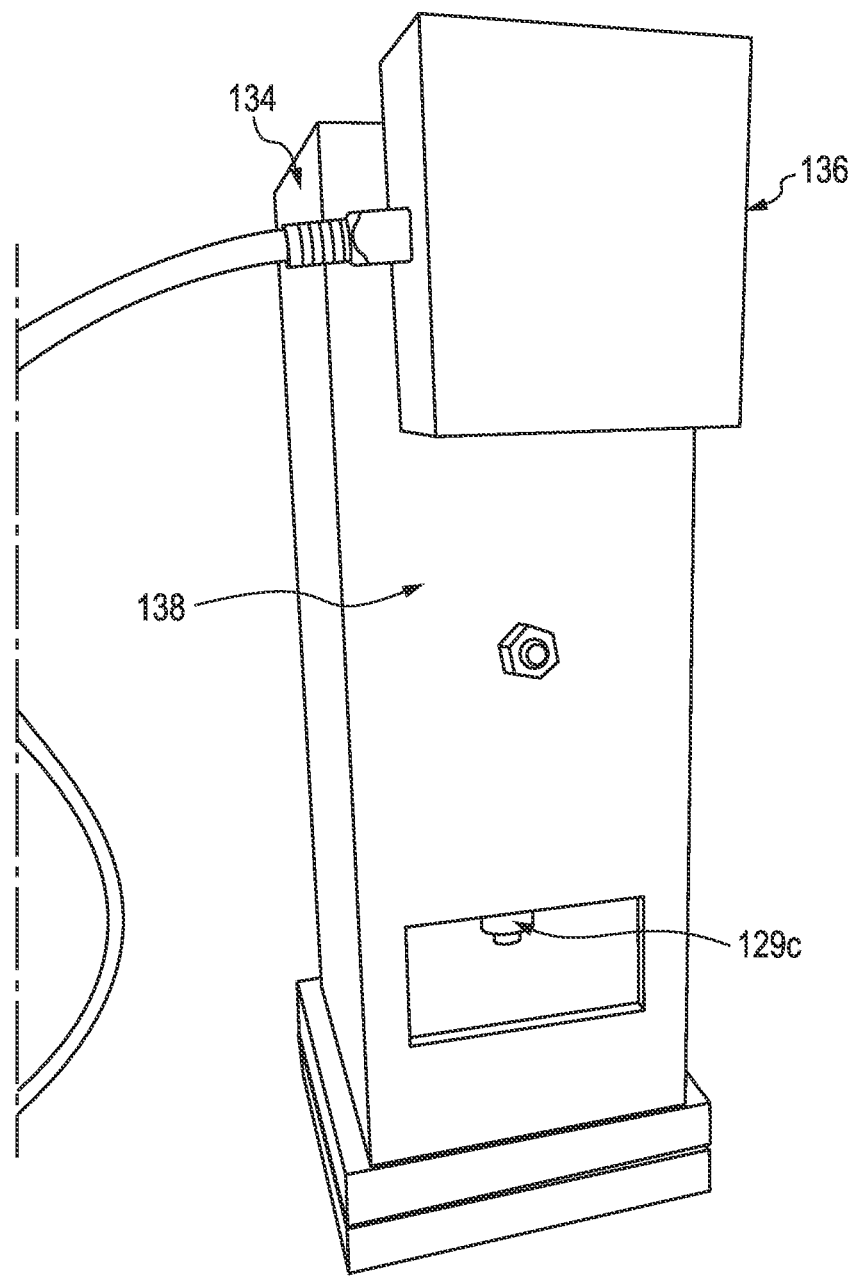
FIG. 1D is a back perspective view of the system of FIG. 1A.
Figure 1E:
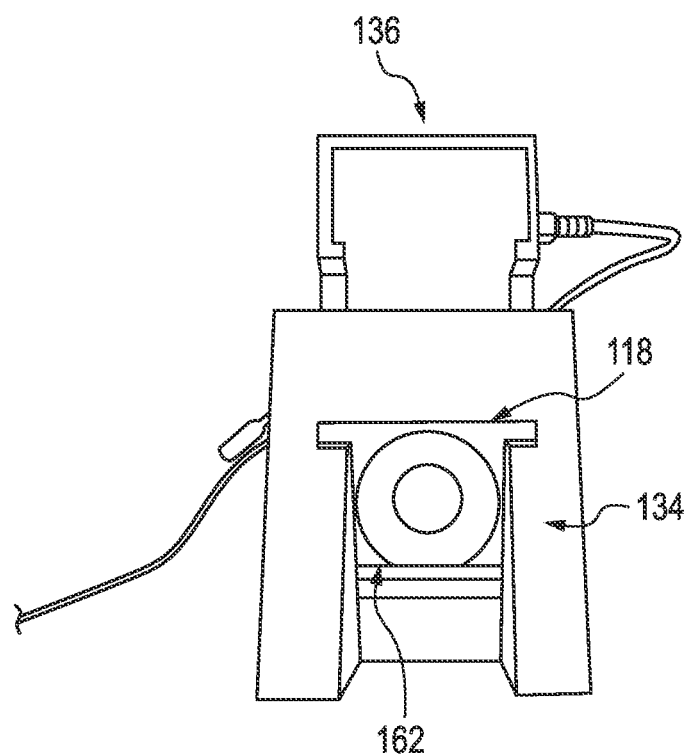
FIG. 1E depicts a top perspective view of the system of FIG. 1A.
Figure 1F:
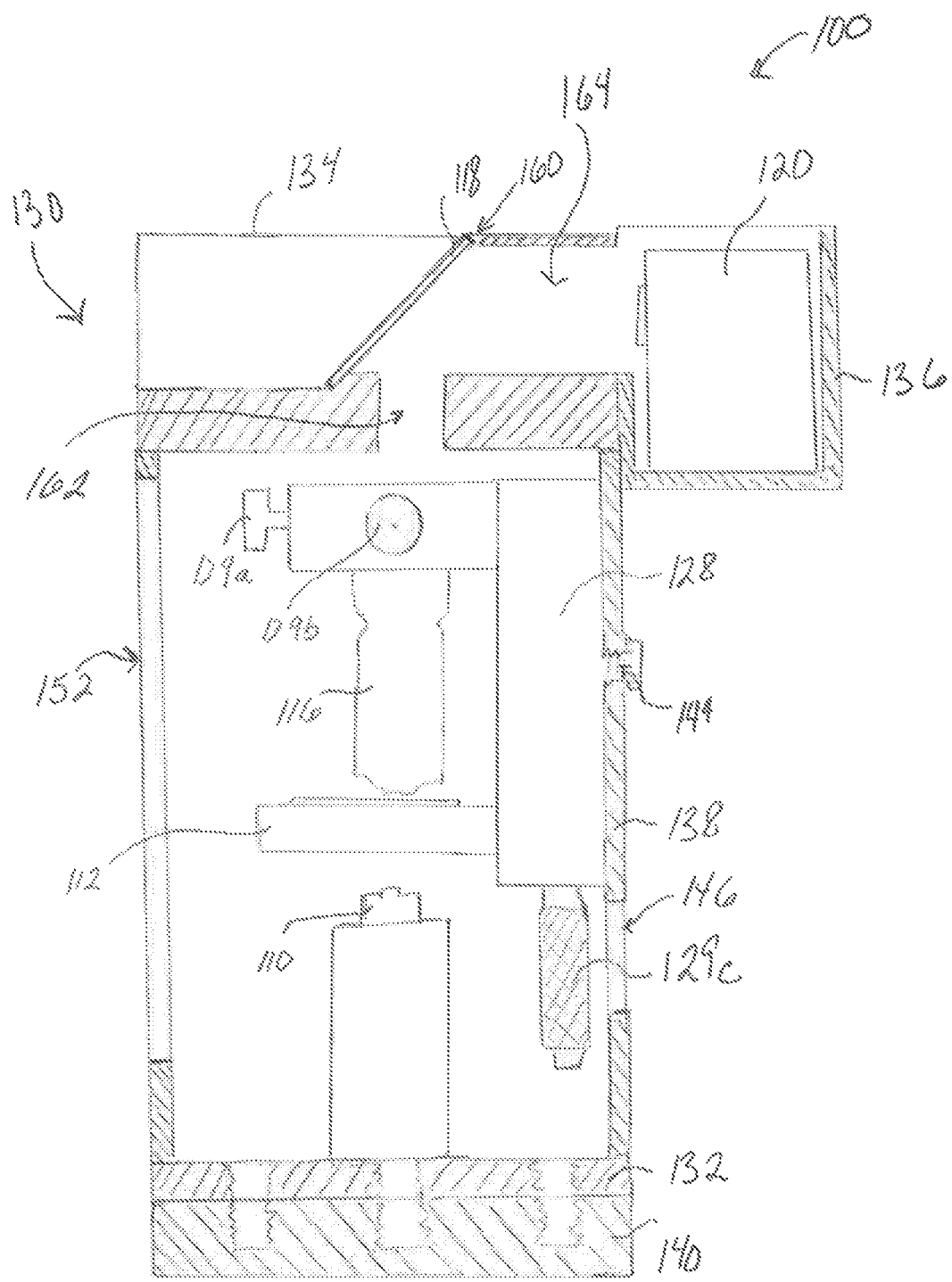
FIG. 1F schematically depicts a side cutaway view of the system of FIG. 1A with the housing cut away to show components within the housing.

The exemplary embodiments disclosed herein are illustrative of advantageous systems of the present disclosure and methods/techniques thereof. It should be understood, however, that the disclosed embodiments are merely exemplary of the present disclosure, which may be embodied in various forms. Therefore, details disclosed herein with reference to exemplary systems and methods are not to be interpreted as limiting, but merely as the basis for teaching one skilled in the art how to make and use the advantageous systems of the present disclosure.

Digital holographic microscopy (DHMIC) is a label-free imaging modality that enables the viewing of microscopic objects without the use of exogenous or contrast agents. DHMIC provides high axial accuracy; however, the lateral resolution is dependent on the magnification of the objective lens used. DHMIC overcomes two problems associated with conventional microscopy: the finite depth of field, which is inversely proportional to the magnification of the objective, and low contrast between the cell and the surrounding media. Cells alter the phase of the probe wave front passing through the specimen, depending on the refractive index and thickness of the object. Several methods have been developed to transform the phase information of the object into amplitude or intensity information, but these methods only provide qualitative information and lack quantitative information. Staining methods, such as the use of exogenous contrast agents, can enhance the image contrast, but it might change the cell morphology or be destructive. Due to the availability of fast CCD and CMOS sensors, it is possible to record digital holograms in real time. The recorded holograms can be numerically reconstructed by simulating the process of diffraction using scalar diffraction, leading to the complex amplitude of the object. This complex amplitude contains the spatial phase information of the object, from which one can reconstruct the phase profile of the object.

Digital holography and microscopy are complementary techniques, and when combined, they can be useful for studying cells in a quantitative manner. To study dynamic parameters of the cell, such as cell membrane fluctuations, one needs a very stable setup because these fluctuations occur over just a few nanometers. The problem with existing digital holographic (DH) microscopy setups that use a double path configuration, is that the beams travel in two different arms of the interferometer and are then combined using a beam-splitter. As a result, the two beams may acquire uncorrelated phase changes due to mechanical vibrations. In comparison to two beam or double path interferometric setups, common path setups are more robust and immune to mechanical vibrations. In a common path setup, the two beams travel in the same direction, that is, the direction of beam propagation.

Digital holographic microscopy (DHM) provides quantitative phase and amplitude information of the object from the recorded hologram, which can be numerically reconstructed to produce a three-dimensional (3D) rendering of its optical path length (OPL) profile. DHM offers advantages over other approaches for extracting phase images, such as Fourier phase microscopy, phase shifting, and Hilbert phase microscopy, because DHM allows for both real-time phase imaging and the ability to numerically focus. Numerical focusing permits a single hologram's depth to be adjusted slightly for optimal focus after imaging without any need for additional optical components. Using DHM, quantitative measuring of cells without staining may be achieved, which is well suited for extracting morphological and motility information from biological specimens.

Digital holographic reconstructions can provide useful information about a cell's parameters, including projected surface area, perimeter, circularity, average phase volume, sphericity coefficient, elongation, mean optical path length (MOPL), and optical volume (OV). Extracted morphological cell features are useful for identifying specific cell types and diagnosing the health of a patient. Examples include the use of cell-extracted features to classify different types of red blood cells (RBC) or as a means to detect Malaria infected RBCs.

Augmented reality is a technology that creates a composite view of computer-generated objects superimposed onto a real-world scene, allowing for both real-world information and digital information to be viewed simultaneously. Augmented reality can be presented through numerous mediums, including projection, handheld, and head mounted devices. In particular, the smart glasses are a head mounted augmented reality device that uses optical see-through techniques to display virtual images coexisting with reality. With optical see-through systems, the virtual images are displayed onto a partially transmissive screen that does not block the real world behind it. Optical see-through devices have the advantages of not altering the real-world resolution, as well as often being cheaper, safer, and parallax free. The use of augmented reality in smart glasses leads to a variety of medical applications, such as assisting and improving surgery, helping to improve vision for patients, and displaying useful information overlaid onto a subject.

DHM can be integrated with augmented reality devices for real-time analysis and visualization of micro-objects (i.e., samples). Described herein is an integration of a DHM system with head mounted augmented reality devices for automated cell identification and visualization.

Some embodiments include a compact, and field portable holographic microcopy imaging system. In some embodiments, the system that can be used for automated cell identification. In some embodiments, the system includes a laser light source, a microscopic objective lens, a shear plate, an imaging device (e.g., a CMOS camera or a cell phone camera), and a housing configured to hold the shear plate and to maintain a position of the shear plate relative to the objective lens. In some embodiments, the components used to build the setup are off-the-shelf optical components combined with a custom housing. In some embodiments, the custom housing may be printed from using 3D printer. In some embodiments, the system is a low cost, compact, and field-portable holographic microscopy system.

In some embodiments, the system also includes a computing device in communication with the imaging device. The computing device may be programmed to reconstruct an x-y map of height data for a sample, which may be referred to as a 3D profile reconstruction, from the recorded hologram. In some embodiments, the computing system is also programmed to extract features from the 3D reconstruction. In some embodiments, the features are extracted from phase maps of a cell or a microorganism or a cell-like object in the sample. In some embodiments, the features may be used to classify a cell, as disclosed in the related U.S. provisional application entitled "Automated Cell Identification Using Shearing Interferometry," Ser. No. 62/631,140, filed on Feb. 15, 2018, the entirety of which is incorporated herein by reference. In some embodiments, data is recorded at various time points, features are extracted for various points in time, and time-dependent features are used for the automated cell classification as described in the related U.S. provisional application entitled "Portable Common Path Shearing Interferometry-Based Holographic Microscopy System," Ser. No. 62/631,268, filed on Feb. 15, 2018, the entirety of which is incorporated herein by reference.

Based on their developments in automated classification of cells based on time dependent features, the inventors realized that a portable, common-path shearing interferometry-based microscope with good temporal stability that could be used for automated cell identification would be incredibly advantageous for onsite analysis of samples in facilities and areas where space is at a premium, or where normal analysis facilities are not available and the system could be carried in.

Some embodiments of the portable common path shearing interferometry-based holographic microscopy system have good stability over time even though they are small and not mounted on a traditional floating optical table. As noted above, this is especially important when time-dependent processes, such as cell membrane fluctuations, are being studied or time-dependent features are being used for the classification of cells. Some embodiments eliminate components and optical elements used in traditional common path shearing interferometry-based holographic microscopy systems to improve temporal stability. The custom housing of systems also improves temporal stability by reducing vibrations between various components (e.g., between the shear plate and the objective lens) by mounting both components to the same housing. Further, in contrast to traditional common path shearing interferometry-based holographic microscopy systems, the geometries employed by the housings in embodiments enable the optical components to be housed in a relatively small system that is lightweight and portable, while maintaining good temporal stability.

In some embodiments, the system is portable having a relatively small size and a relatively small weight. For example, in some embodiments, the system has a length of less than 350 mm, a width of less than 350 mm and a height of less than 300 mm. In some embodiments the system has a length of less than 320 mm, a width of less than 320 mm and a height of less than 250 mm. In some embodiments, the system has a length of less than 150 mm, a width of less than 150 mm and a height of less than 250 mm. In some embodiments, the system has a length of less than 100 mm, a width of less than 95 mm and a height of less than 200 mm. In some embodiments, the system has a length of less than 90 mm, a width of less than 90 mm and a height of less than 130 mm. In some embodiments, the system has a mass of less than 6 kg. In some embodiments, the system has a mass of less than 2 kg. In some embodiments, the system has a mass of less than 0.9 kg. In some embodiments, the system has a mass of less than 0.5 kg. In one example embodiment, a system has a length of about 95 mm, a width of about 75 mm and a height of about 200 mm. In one embodiment, the system has a length of about 90 mm, a width of about 85 mm and a height of about 200 mm. In one example embodiment, a system has a length of about 80 mm, a width of about 80 mm and a height of about 130 mm. In one example embodiment the system has a mass of about 0.87 kg. In one example embodiment the system has a mass of 0.45 kg.

FIGS. 1A-1F depict an embodiment of a portable common path shearing interferometry based holographic imaging system 100. The system 100 includes a light source (e.g., laser diode 110), a sample holder 112, an objective lens 116, a shear plate 118, an imaging device 120, and a housing 130, where the housing 130 holds the shear plate 118. In some embodiments, the housing 130 is mounted on a base 140 as shown. The system 100 is configured to position the laser light source 110, the sample holder 112, the objective lens 116, the glass plate 118 and the imaging device 120 in a common path shearing interferometry configuration as explained below with respect to FIG. 2.

Figure 2:
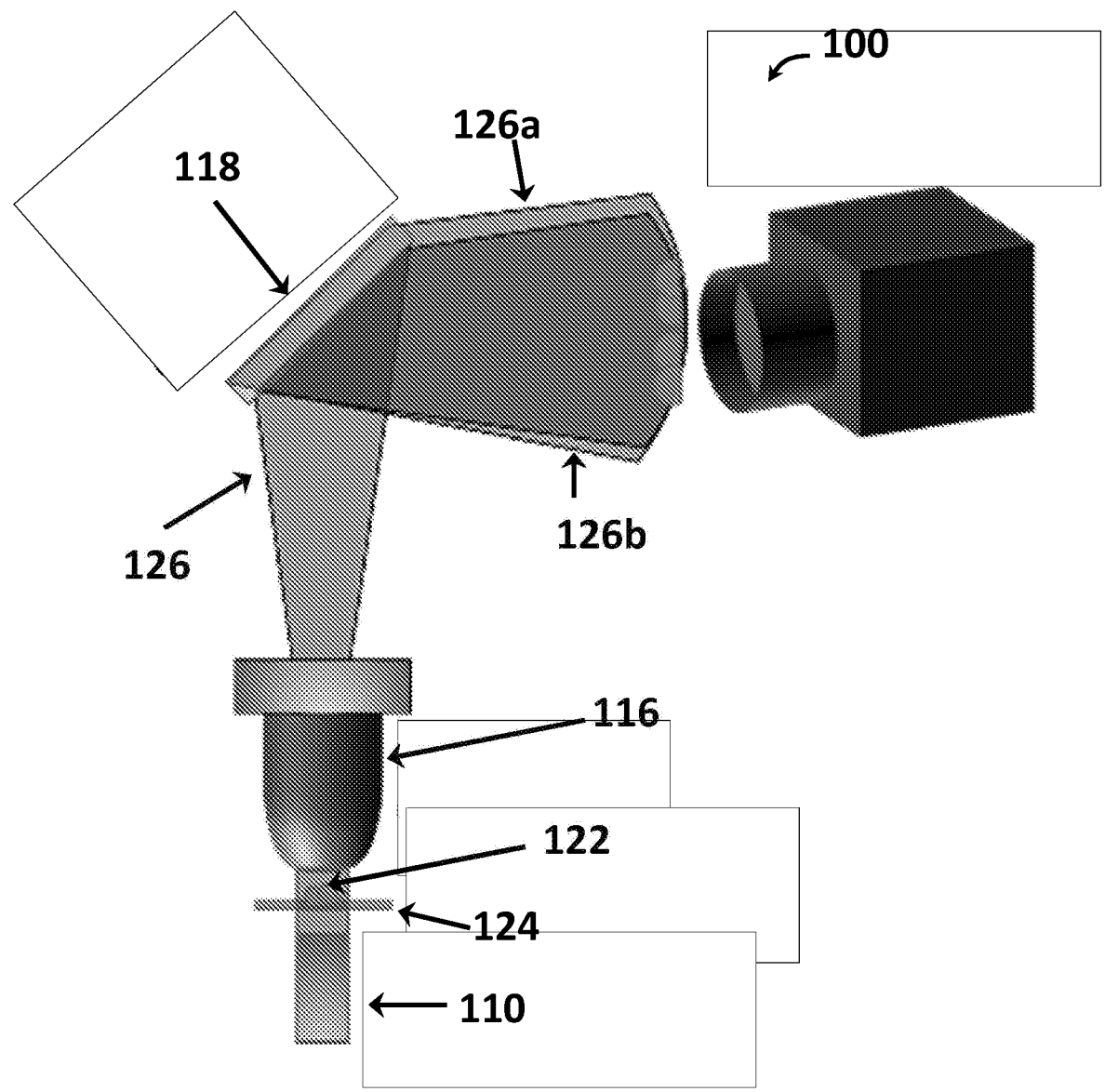
FIG. 2 schematically depicts the optical path of the common path shearing interferometry system of FIG. 1A.

FIG. 2 schematically depicts the beam path and optical elements of the system 100 shown FIGS. 1A-1F. The laser light source (e.g., laser diode 110) outputs a beam 126 which illuminates a sample 122 at a specimen plane 124. After passing through the specimen plane 124 and through/around the sample 122, the beam 126 is magnified by the microscope objective lens 116, and is incident on the shear plate 118, which splits the beam generating two laterally sheared object beams 126a, 126b. These two sheared beams interfere at the imaging device 120 and interference fringes are observed.

In some embodiments, the system may exhibit good temporal stability. As noted above, in comparison to two beam or double path interferometric setups, common path interferometers are more robust and immune to mechanical vibrations, at least, because in a common path setup the two beams in the same direction at the same time along the common path. Some embodiments incorporate additional features that increase the temporal stability of the system. For example, some digital holographic imaging systems incorporate a beam expander, a mirror or other additional optical elements between the laser light source and the specimen plane; however, the more optical elements between the laser source and the imaging device, the greater the impact of vibrations on temporal stability. Thus, some embodiments do not include any optical elements in the beam path between the laser source and the specimen plane. In some embodiments, the only optical elements in the beam path between the laser light source and the imaging device are the shear plate, the microscope objective and a support for the sample, such as a sample stage and/or slide mount. Further, having many of the optical components supported by the same housing increases the temporal stability of the system. In embodiments where the different portions of the housing are all part of a unitary piece, the system may exhibit even better temporal stability.

Temporal stability of the system may be influenced by the stability of the laser employed. A low noise, improved stability laser (e.g., one that includes feedback for temperature control), can exhibit increased temporal stability as compared with a higher noise, less stable laser. However, a low noise laser with improved stability that includes feedback temperature control may be significantly larger than a smaller diode laser with a similar level of light output that does not include such feedback. Thus, in some embodiments, there can be a tradeoff between size and temporal stability for the laser light source.

In some embodiments, a vibration isolation material (e.g., a Sorbothane vibrational damping sheet) may be used between the base of the system and a surface supporting the system (e.g., a table or counter) to reduce the effect of external mechanical vibrations on the system.

In some embodiments, the housing 130 is configured to maintain the relative positions of at least the objective lens 116 and the shear plate 118. For example, in some embodiments, the objective lens 116 is mounted to the housing 130, either directly or indirectly. In some embodiments, the housing is also configured to maintain the position of the sample holder 112 relative to the objective lens 116 and the shear plate 118. For example, in some embodiments, the sample holder 112 is mounted to the housing 130, either directly or indirectly. In the embodiment shown in FIGS. 1A-1F, the objective lens 116 is mounted to a lens and stage mounting component 128 that enables x-y lateral adjustment of the objective lens 116 through two adjustment knobs 129a, 129b. The lens and stage mounting component 128 also has a portion, which is used as the sample holder 112, that can be translated in the z-direction relative to the objective lens 116 using a third control knob 129c. The lens and stage mounting component 128 is mounted to a back wall of the housing 130. An opening 146 in the back wall of the housing provides access to the third control knob 129c (see FIGS. 1B, 1D and 1F). In this embodiment, the lens and stage mounting component 128 is a modified version of a commercially available spatial filter mount, which is depicted in Figured 7A and 7B.

In some embodiments, the housing 130 is also configured to maintain the position of the imaging device 120 relative to the objective lens 116 and the shear plate 118. For example in some embodiments, the imaging device 120 is also mounted to the housing 130, either directly or indirectly. In the embodiment shown in FIGS. 1A-1F, the housing 130 includes an imaging device holding portion 136 that is configured to receive and hold an imaging device (see also FIGS. 6A and 6B).

The housing 130 also includes a shear plate holding portion 134 that is configured to receive and hold the shear plate. Further details regarding the shear plate holding portion are provided below with respect to FIGS. 5A and 5B.

FIGS. 3-7B depict components of the housing 130, specifically the sidewall portion 138, the housing base portion 132, the shear plate holding portion 134 and the imaging device holding portion 136. In some embodiments, one or more of the components depicted in FIGS. 3-7B may be combined into one or more unitary pieces instead of being formed as separated components. In some embodiments, one or more of the components of the housing may be formed by 3D printing. In some embodiments, one or more of the components may be formed by molding. Any other suitable technique may be employed for forming or making the components of the housing.

Figure 3A:
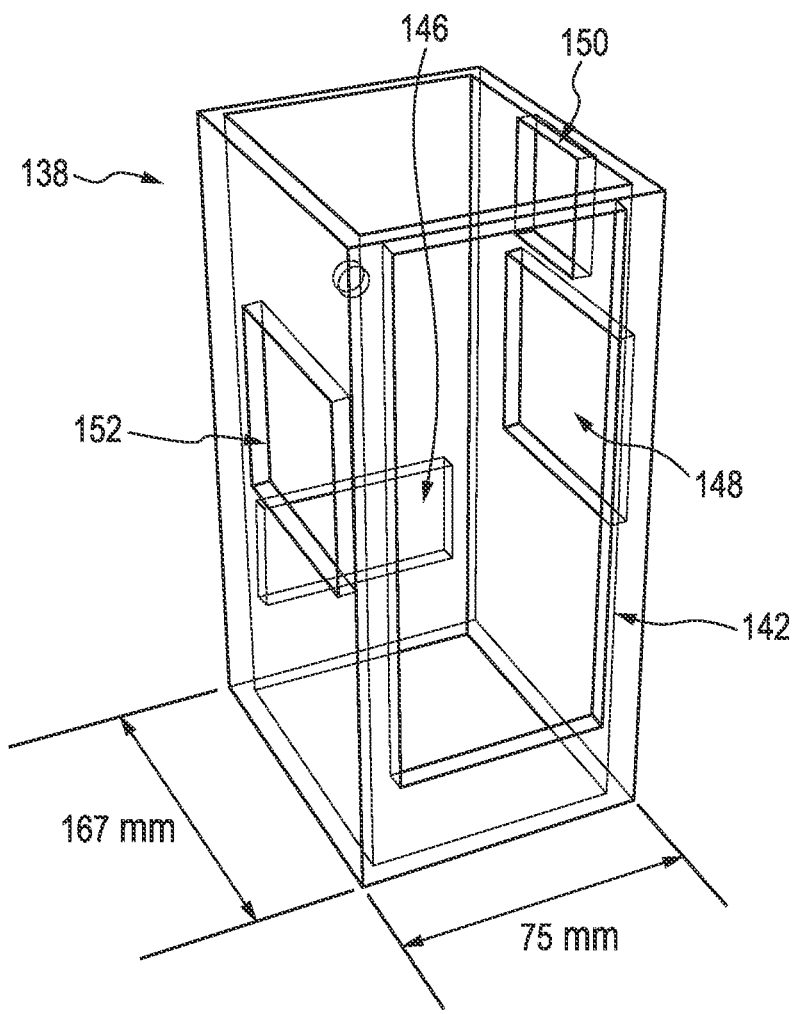
FIG. 3A depicts a perspective view of the sidewall portion of the housing of the system of FIG. 1A.
Figure 3B:
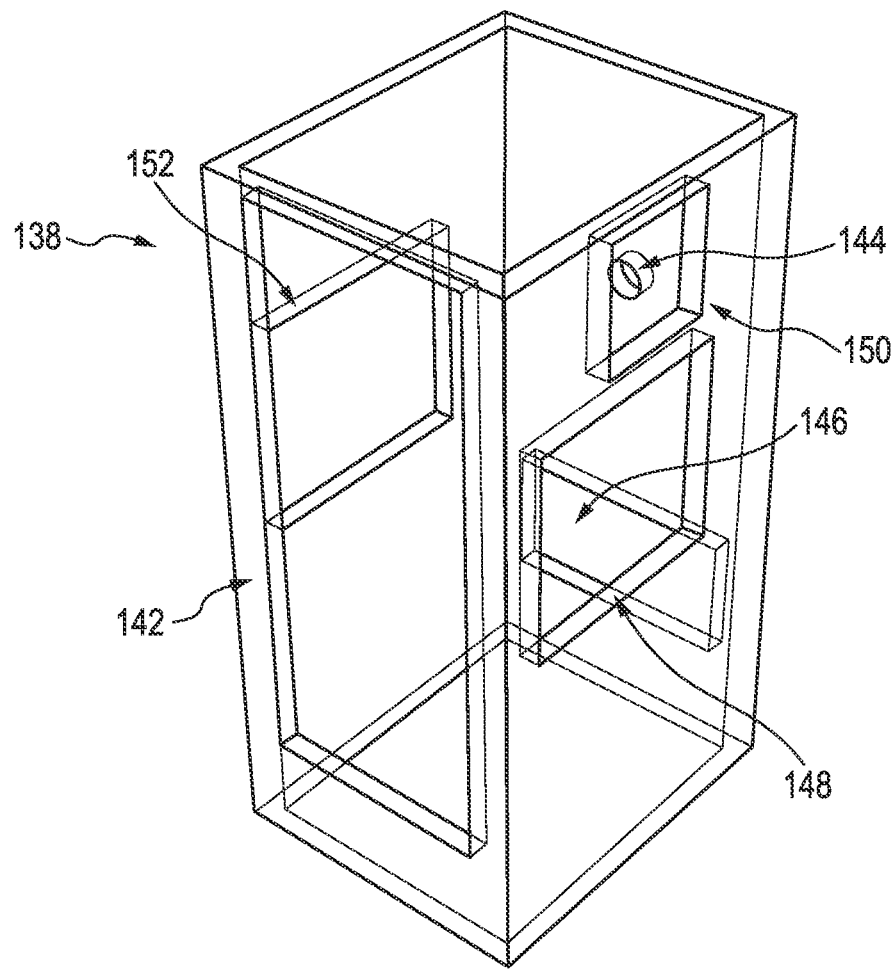
FIG. 3B depicts another perspective view of the sidewall portion of the housing of FIG. 3A.

FIGS. 3A and 3B depict a sidewall portion 138 of the housing, to which the microscope objective lens 116 and the sample holder 112 are mounted. In the embodiment depicted, a front wall of the sidewall portion has a large opening 142 for accessing the laser light source 110, the microscope objective 116 and the sample holder 112. In the embodiment depicted, a back wall of the sidewall portion 138 has a hole 144 to enable attachment of the lens and stage mounting component 128 using a screw or bolt. The back wall of the sidewall portion 138 also has an opening 146 to enable access to the knob 129c to the z-control for the lens and stage mounting component 128 to control a height of the sample holder 112. The housing is also configured to enclose the laser light source 110, the sample holder 112, and the microscope objective lens 116. In some embodiments, a first side wall of the sidewall portion 138 includes two openings, a lower opening 148 for accessing the sample holder 112 and an upper opening 150 for accessing the adjustment knob 129b for adjusting a lateral position of the microscope objective 116. In some embodiments, a second sidewall of the sidewall portion 138 includes an opening 152 for accessing the sample holder 112.

Figure 4:
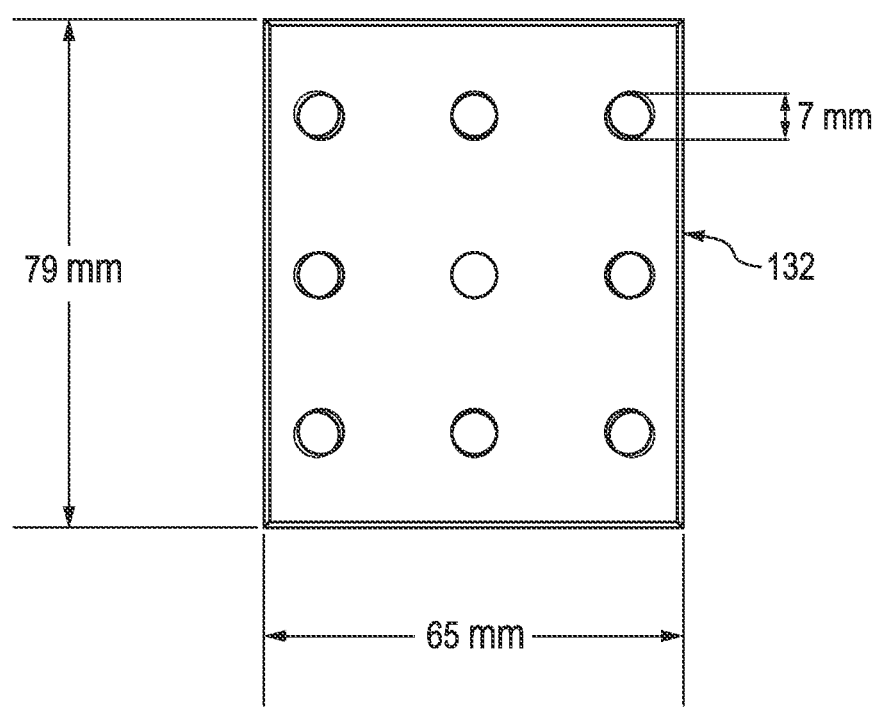
FIG. 4 is a top view of a base portion of the housing of the system of FIG. 1A.

In some embodiments, the housing 130 includes a base portion 132 that may be attached to the housing or may be a unitary portion of the housing. In some embodiments, a separate base 140 may be employed where the housing 130 is attached to the separate base 140. In some embodiments, the housing 130 includes a base portion 132 and the housing including the base portion are attached to a separate base 140. FIG. 4 depicts a top view of a base portion 132 of the housing 130. In the system depicted in FIGS. 1A-1F, the laser light source (e.g., the laser diode light source) is mounted to the separate base 140 using a post holder 154 that screws into the separate base 140 through the base portion 132 of the housing (see FIGS. 1B and 1F).

Figure 5A:
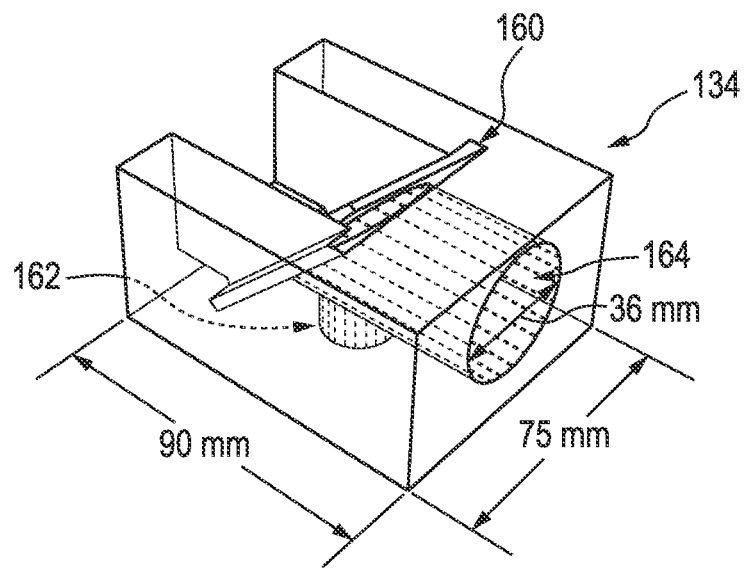
FIG. 5A is a perspective view of a shear plate holding portion of the housing of the system of FIG. 1A.
Figure 5B:
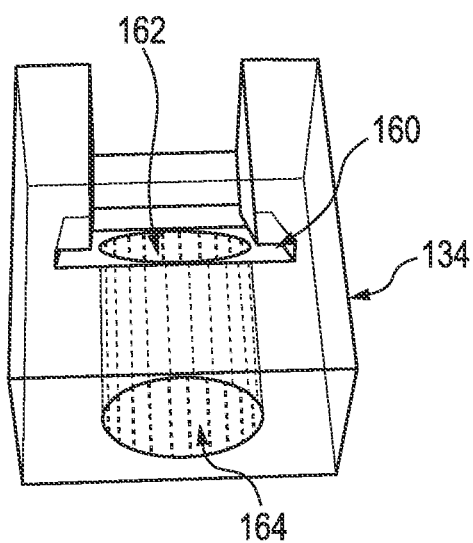
FIG. 5B is a perspective view from the top and front of the shear plate holding portion of FIG. 5A.

FIGS. 5A and 5B depict a shear plate holding portion 134 of the housing that is configured to hold the shear plate 118. In some embodiments, the shear plate holding portion 134 of the housing is positioned over the sidewall portion 138 of the housing. In some embodiments, the shear plate holding portion 134 is attached to the sidewall portion 138 (e.g., via glue, melt bonding, or via screws) In some embodiments, the shear plate holding portion 134 of the housing includes a slot 160 configured to receive the shear plate 118 as shown. In some embodiments, the shear plate holding portion 134 of the housing defines a first channel 162 extending to the slot configured to hold the shear plate 118 (see also FIG. 1F). In some embodiments, the shear plate holding portion 134 of the housing also a second channel 162 that intersects with the first channel 164. The shear plate holding portion 134 of the housing is configured such the light beam 126 enters through the first channel 162, strikes the shear plate 118, and is reflected off the different surfaces of the shear plate 118 as two different beams 126a, 126b along the second channel 164 toward the imaging device 120.

Figure 6A:
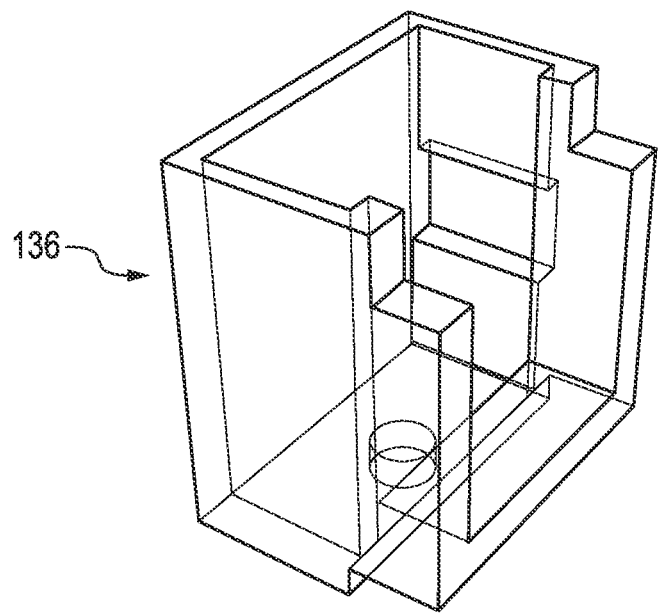
FIG. 6A is a perspective view from the side and front of an imaging device holding portion of the housing of the system of FIG. 1A.
Figure 6B:
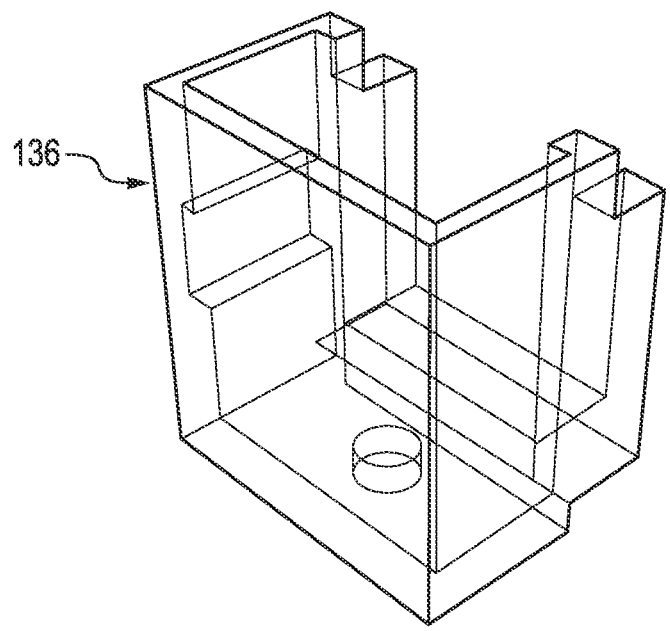
FIG. 6B is a perspective view from the side and back of the imaging device holding portion of FIG. 5A.
Figure 6C:
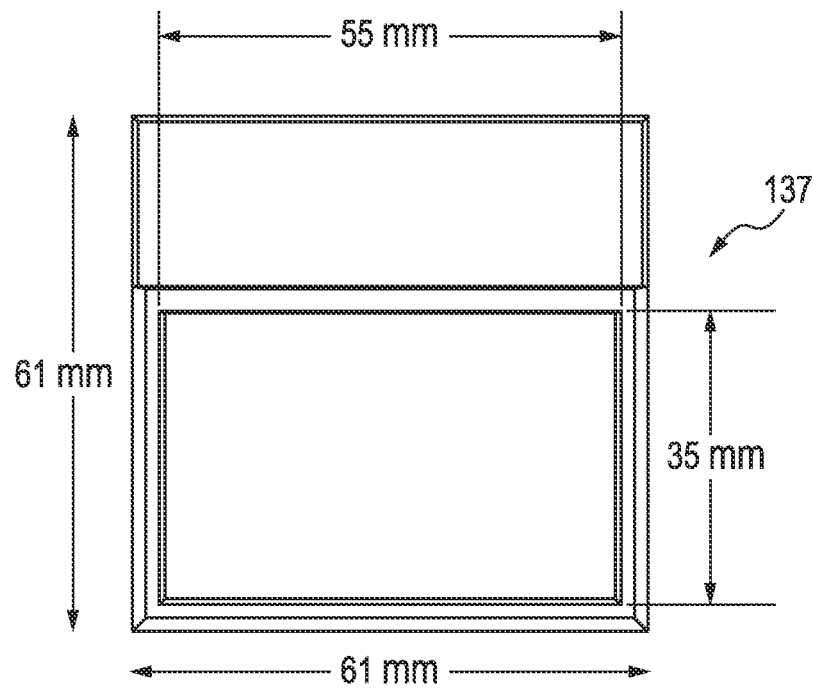
FIG. 6C is a top view of a cover for the imaging device holding portion FIG. 6A.
Figure 6D:
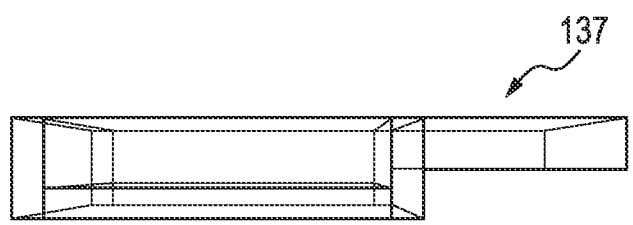
FIG. 6D is a side view of the cover of FIG. 6C.

FIGS. 6A and 6B depict the imaging device holding portion 136 of the housing. In some embodiments, the imaging device holding portion 136 of the housing is attached to the shear plate holding portion 136 of the housing (see FIGS. 1C-1E). The imaging device holding portion 136 of the housing is configured to receive and hold the imaging device 120 (e.g., a CMOS image sensor). In some embodiments imaging device holding portion 136 is permanently attached to the shear plate holding portion 136 and in some embodiments it is detachable or removable to enable the system to work with other imaging devices having other physical configurations. FIGS. 6C and 6D depict an optional cover 137 for the imaging device holding portion 136 of the housing that may be included in some embodiments.

FIGS. 7A and 7B depict the 128 lens and stage mounting component 128.

Figure 8A:
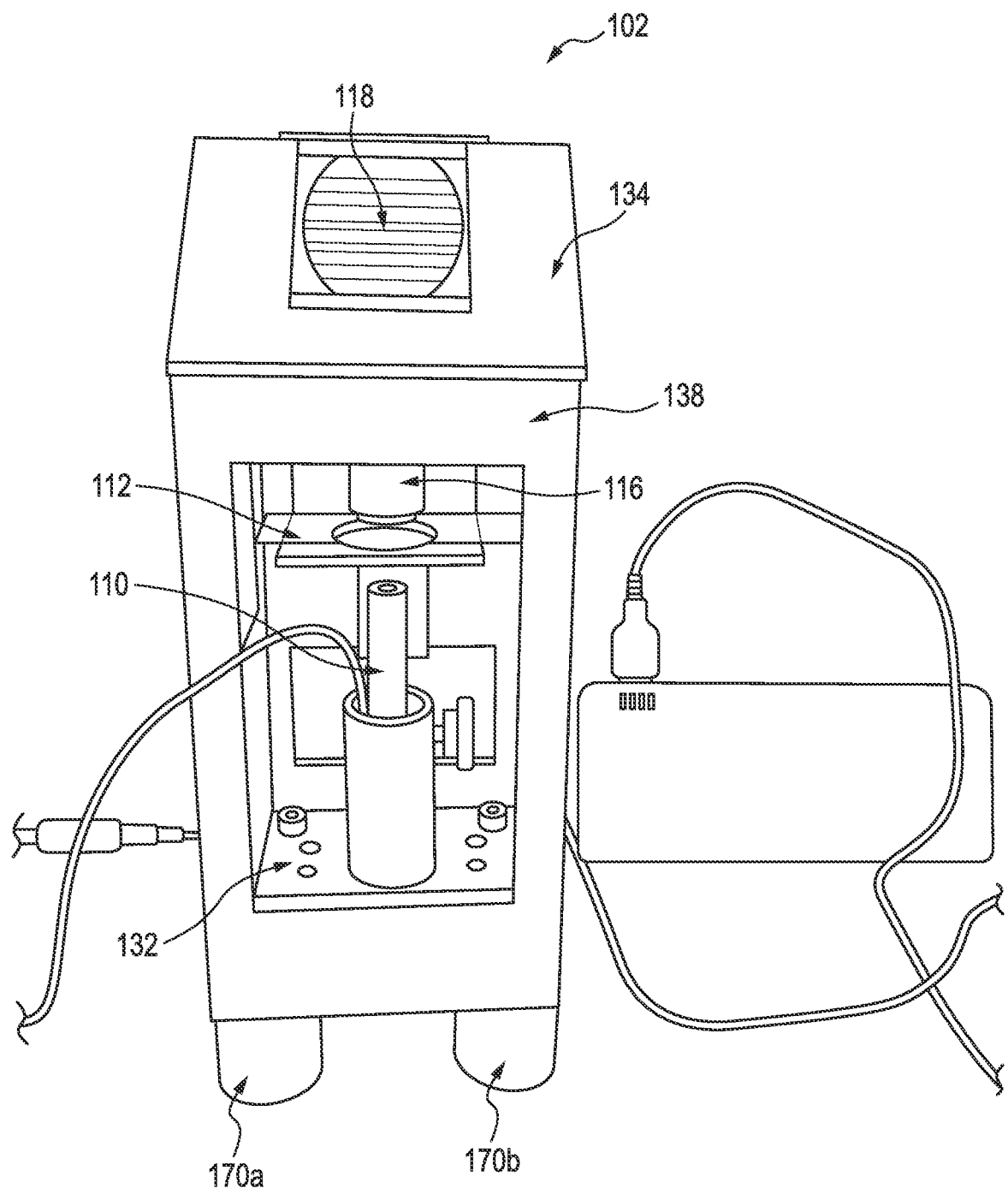
FIG. 8A is a perspective view of a portable common path shearing interferometry-based holographic microscopy system in accordance with some embodiments.
Figure 8B:
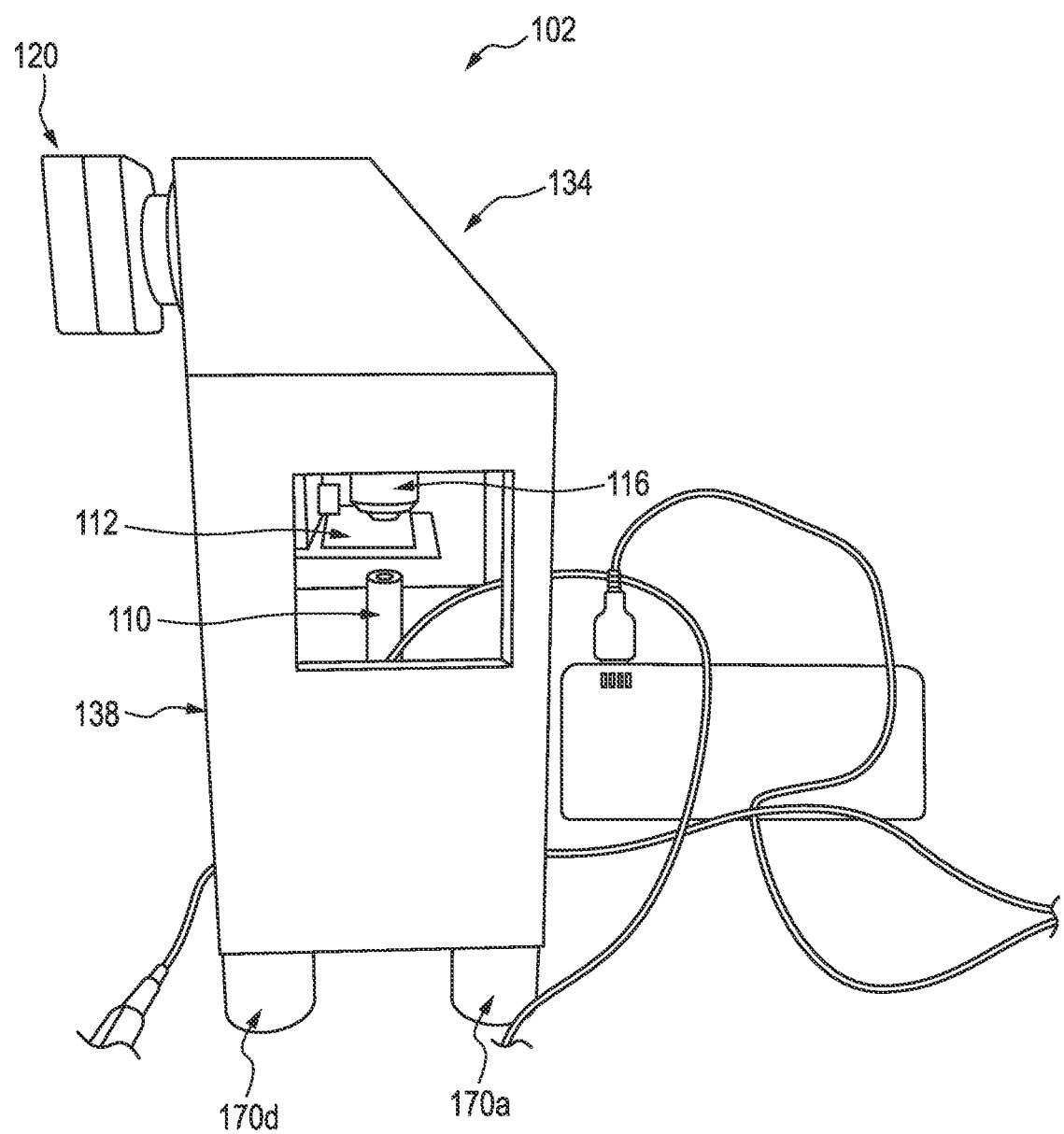
FIG. 8B is a side perspective view of the system of FIG. 8A.
Figure 8C:
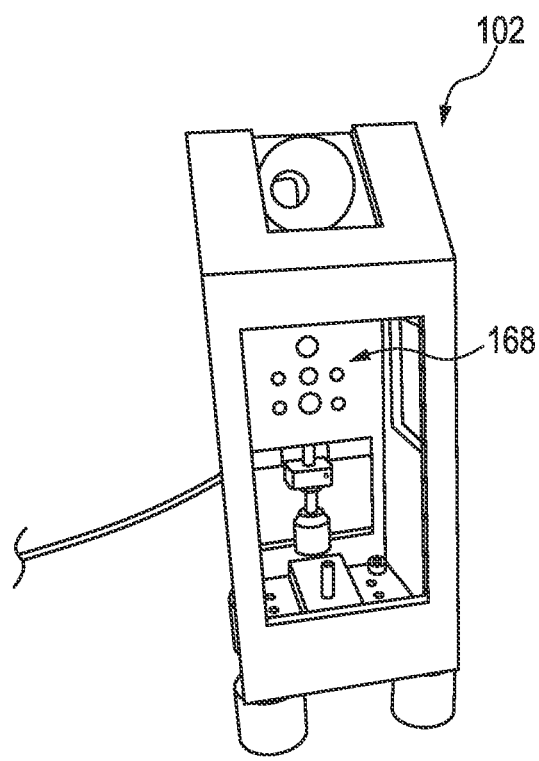
FIG. 8C is another perspective view of the system of FIG. 8A.
Figure 8D:
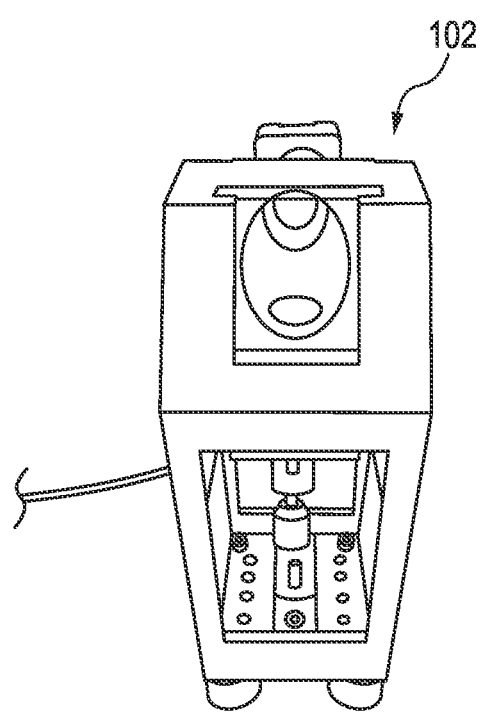
FIG. 8D is a perspective view from the top and front of the system of FIG. 8A.

FIGS. 8A-8E depict another embodiment of a portable common path shearing interferometry based holographic imaging system 102. System 102 has some similarities with system 100 described above, however, it has fewer components. For simplicity, the reference numbers employed for system 100 will be used to when referring to similar components in system 102, however, there are differences between many of the components in the different systems which are described below. In system 102, the lens and stage mounting component 128 is replaced with single translating stage 168 that attaches to the back of the sidewall portion 138 of the housing. FIGS. 8C and 8D show the system 102 with the sample holder 112, microscope objective 116 and laser light source 110 removed to provide a clear view of the single translating stage 168. A sample holder 112 is attached to the single translating stage 168. A microscope objective holder is affixed (e.g., by an adhesive) in a tapered hole in the shear plate holding portion 134 of the housing. The microscope objective holder includes internal threads that mate with threads in the microscope objective lens 116 for removably mounting the microscope objective lens 116 to the shear plate holding portion 134 of the housing. Because there is no longer an x-y adjustment for the objective, fewer openings are needed in the sidewall portion 138 of the housing.

Figure 8E:
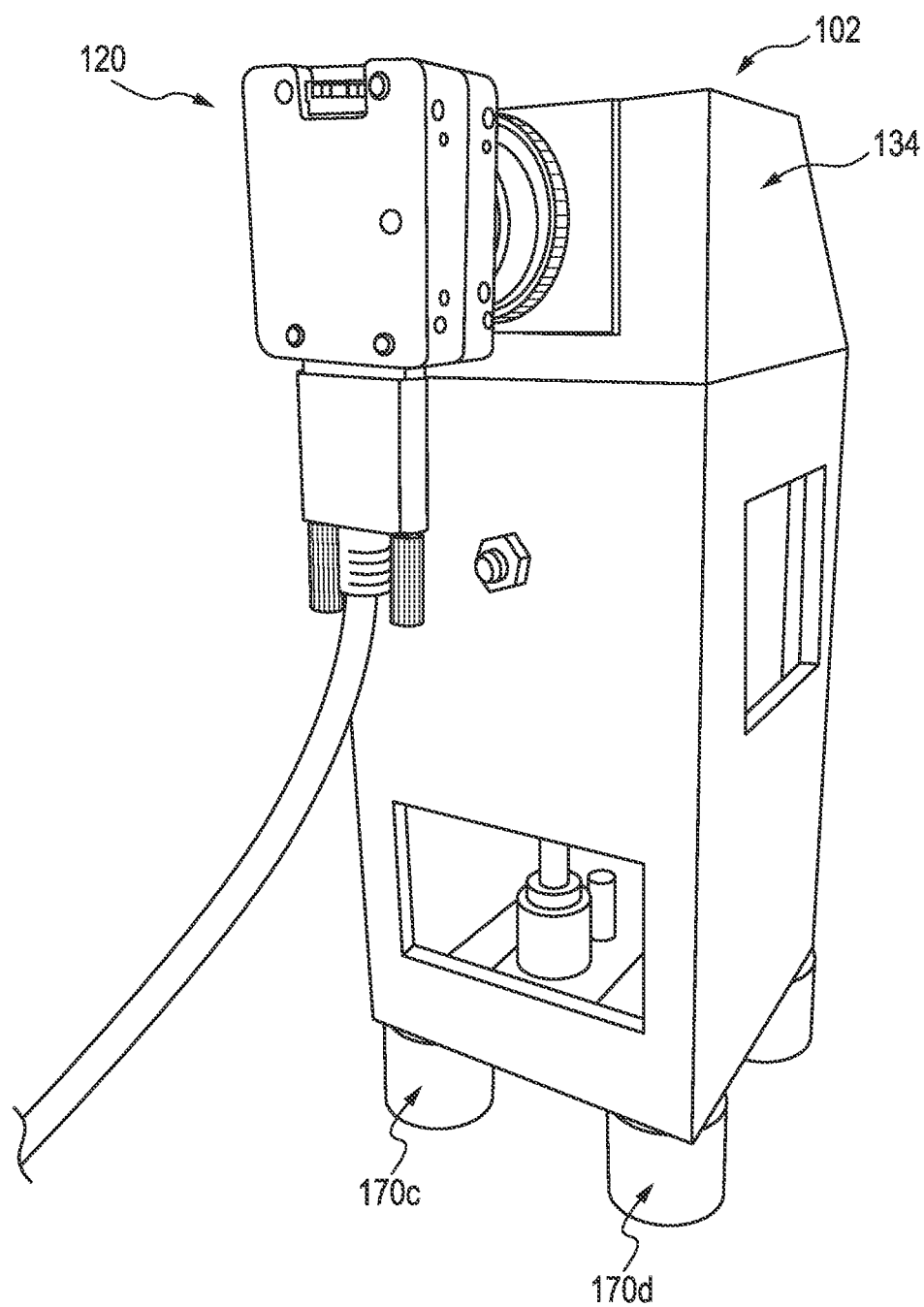
FIG. 8E is a perspective view from the back and side of the system of 8A.

In system 102, the imaging device holding portion 136 of the housing is omitted and the imaging device 120 itself mounts to the shear plate holding portion 134 of the housing (see FIGS. 8B and 8E).

System 102 includes a base portion 132 of the housing, but does not include a separate base 140. Instead, the housing 130 in system 102 is supported on legs 170a-170d.

Figure 9:
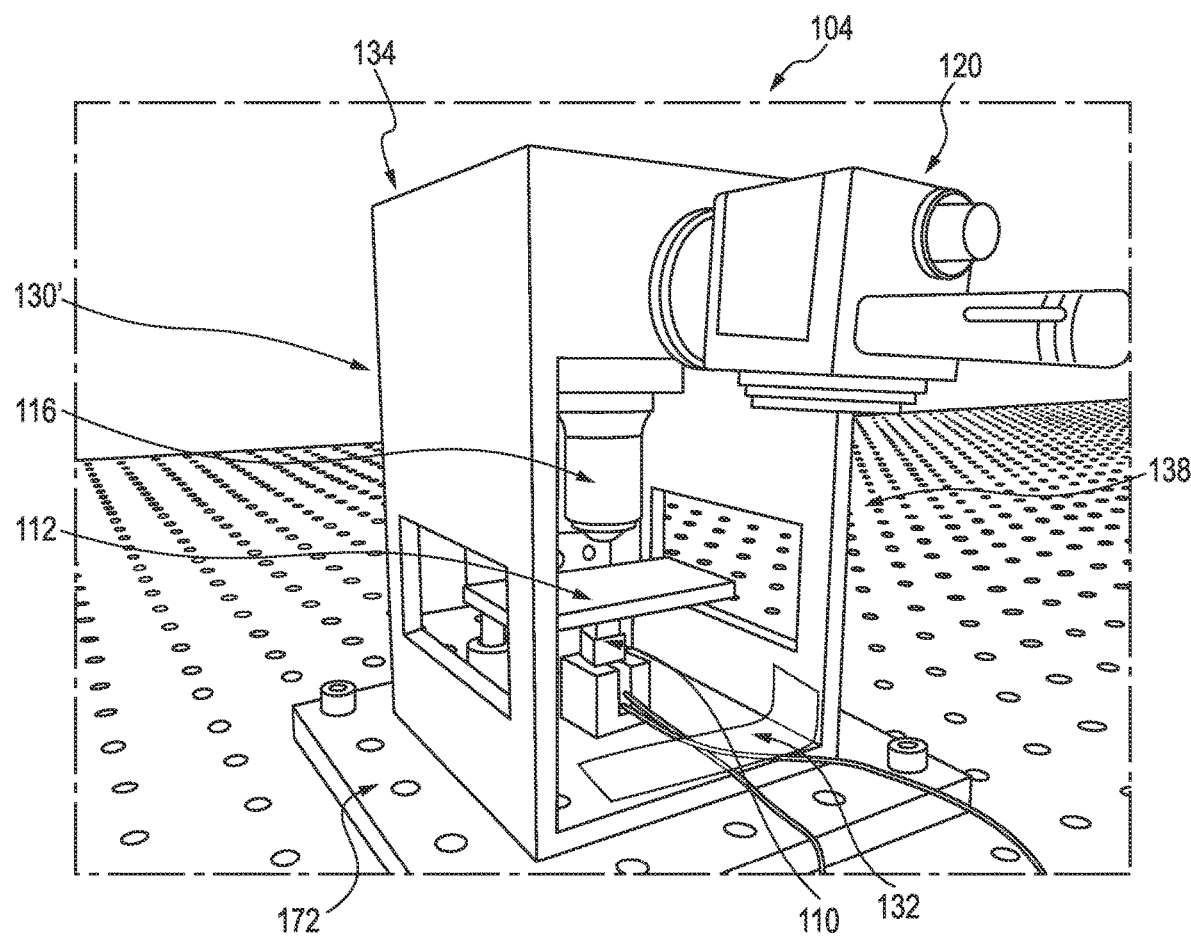
FIG. 9 is a perspective view of a portable common path shearing interferometry-based holographic microscopy system in accordance with some embodiments.
Figure 10A:
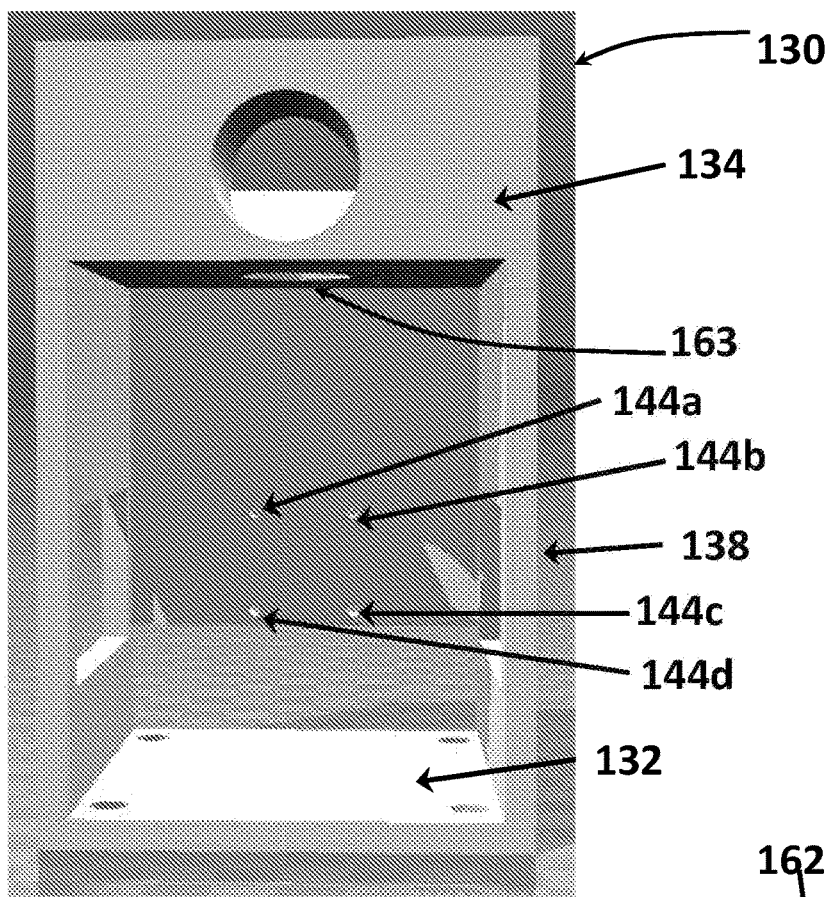
FIG. 10A is a front perspective view of a housing of the system of FIG. 9.
Figure 10B:
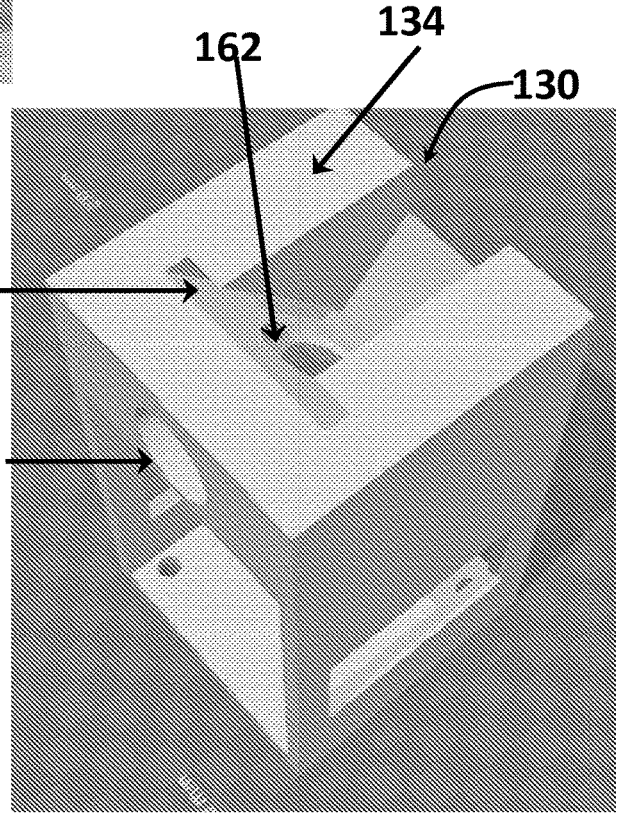
FIG. 10B is top perspective view of the housing of FIG. 10A.
Figure 10C:
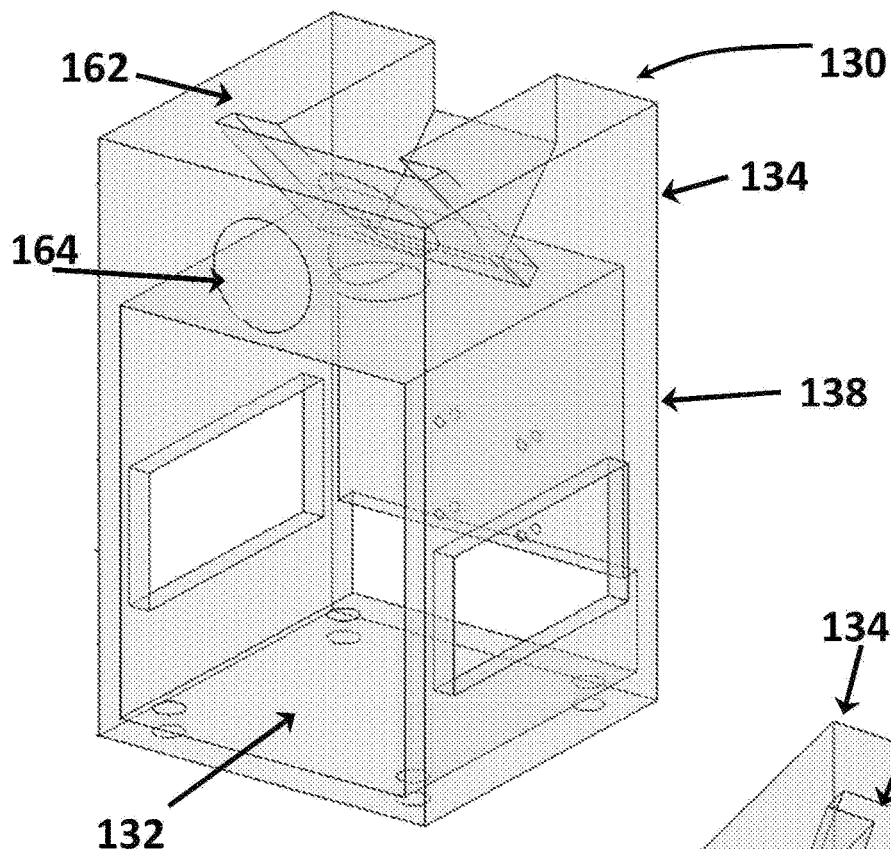
FIG. 10C is a perspective view from the front and side of the housing of FIG. 10A.
Figure 10D:
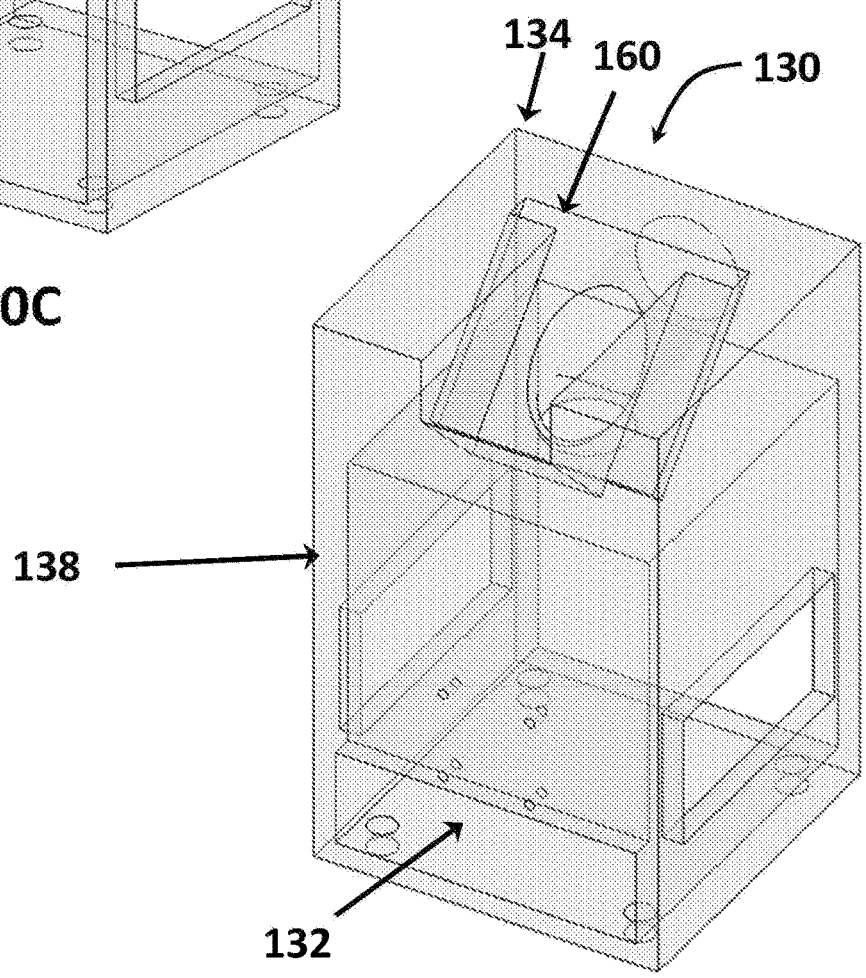
FIG. 10D is a perspective view from the top and back of the housing of FIG. 10A.

FIG. 9 depicts another embodiment of a portable common path shearing interferometry based holographic imaging system 104. System 104 has some similarities with system 100 and system 102 described above, however, it includes fewer components as compared to system 100 and system 102, and may exhibit more robust temporal stability.

In system 104, the orientation of the shear plate holding portion 134 of the housing is reversed with respect to that of system 100 and 102 so that the imaging device 120 is mounted to the front of the system.

In system 104, the sidewall portion 138 of the housing, the bottom portion 132 of the housing and the shear plate holding portion 143 of the housing are all formed in one unitary piece, instead of being multiple components that are attached to each other. By forming these portions of the housing in one unitary piece, vibrations between different portions of the housing may be reduced, thereby increasing the temporal stability of the system 104. FIGS. 10A-10D depict different views of the housing 130 of system 104. In this embodiment, the back wall of the housing has four holes 144a-144d for mounting the translation stage 168, which translates the sample holder, to the housing 130. Further, the opening 163 of the first channel 162 in the shear plate holding portion 134 of the housing is sized and configured for mounting the microscope objective. The imaging device mounts directly to the shear plate holding portion 134 of the housing.

Figure 11A:
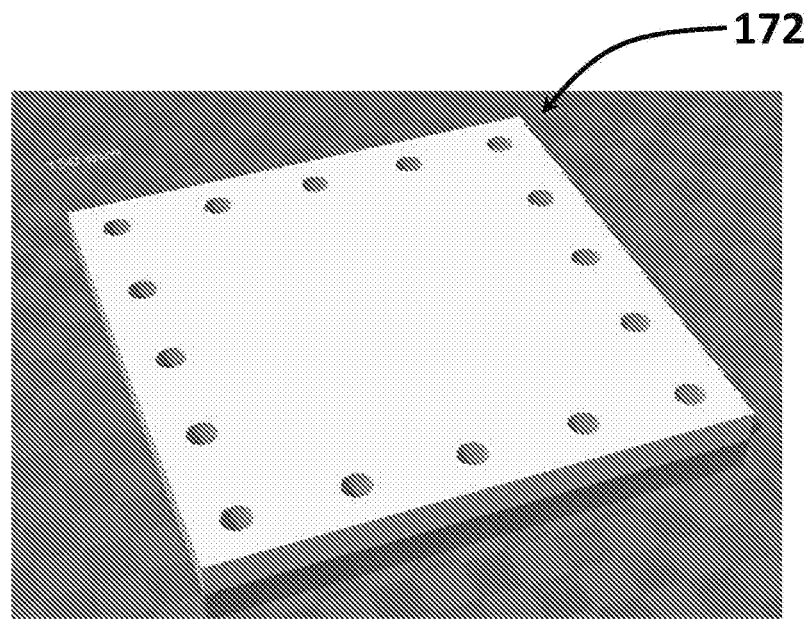
FIG. 11A is a perspective view of a base plate for the system of FIG. 9.
Figure 11B:
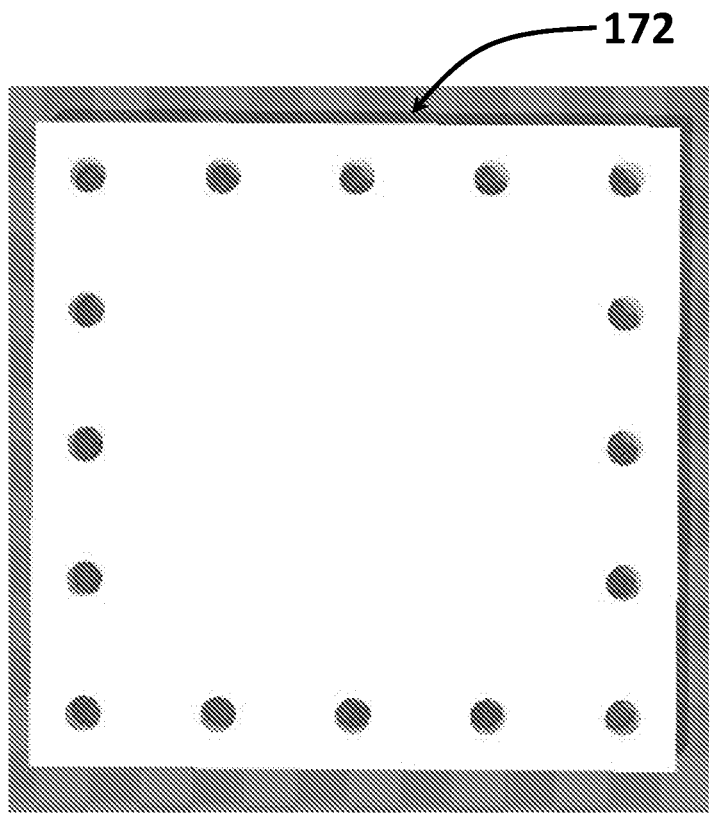
FIG. 11B is a top view of the base plate of FIG. 11A.

In system 194, the housing 130 is attached to a base plate 172, which may be 3D printed, molded or formed in any other suitable manner. In some embodiments, the housing 130 is glued or bonded to the base plate 172. In some embodiments, the housing 130 is attached to the base plate using screws or using any other suitable mechanism. In some embodiments, the housing 130 and base plate 172 may be formed together in one unitary piece. FIGS. 11A and 11B depict the base plate 172.

Figure 12A:
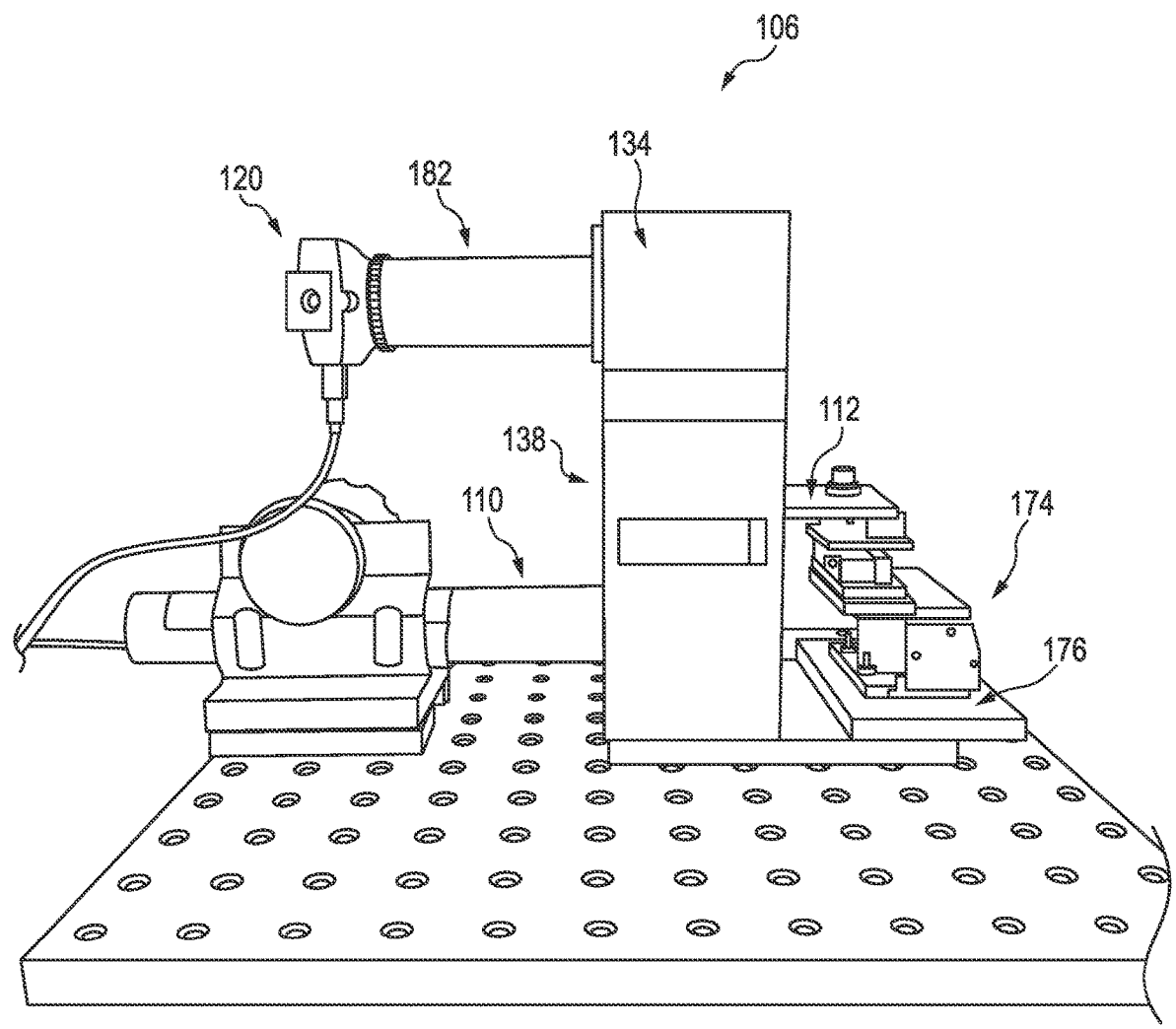
FIG. 12A is a perspective view of a portable common path shearing interferometry-based holographic microscopy system in accordance with some embodiments.
Figure 12B:
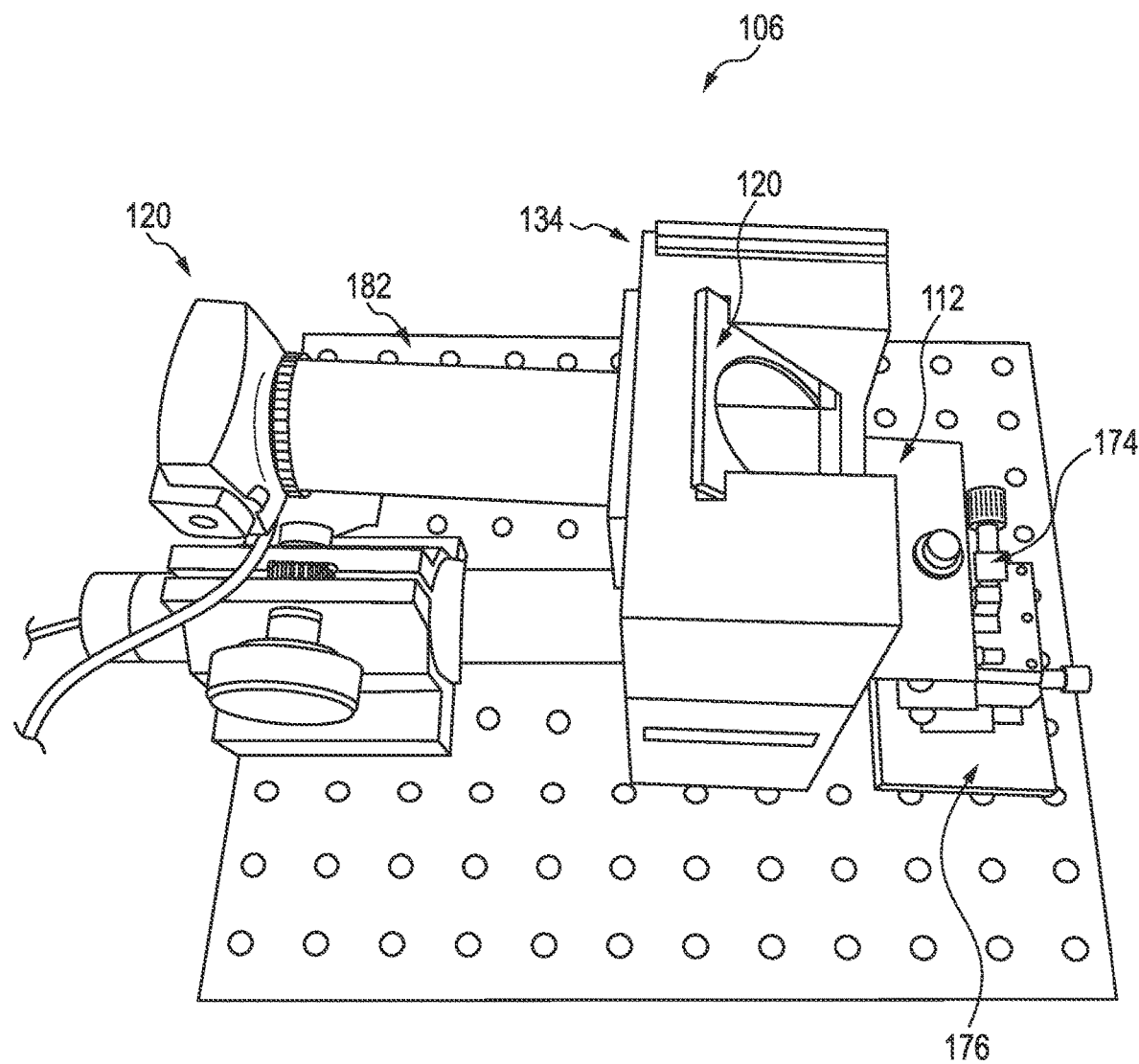
FIG. 12B is a top perspective view of the system of FIG. 12A.
Figure 14A:
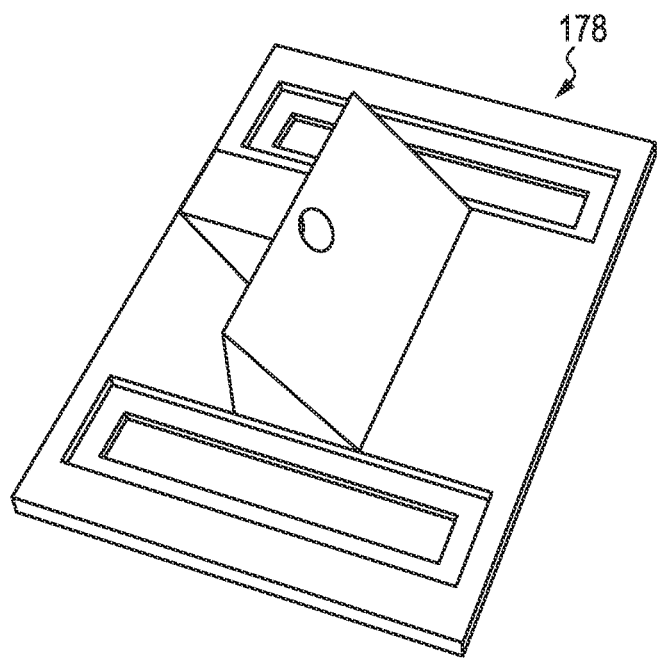
FIG. 14A is a perspective view of a 45 degree mount of the system of FIG. 12A.
Figure 14B:
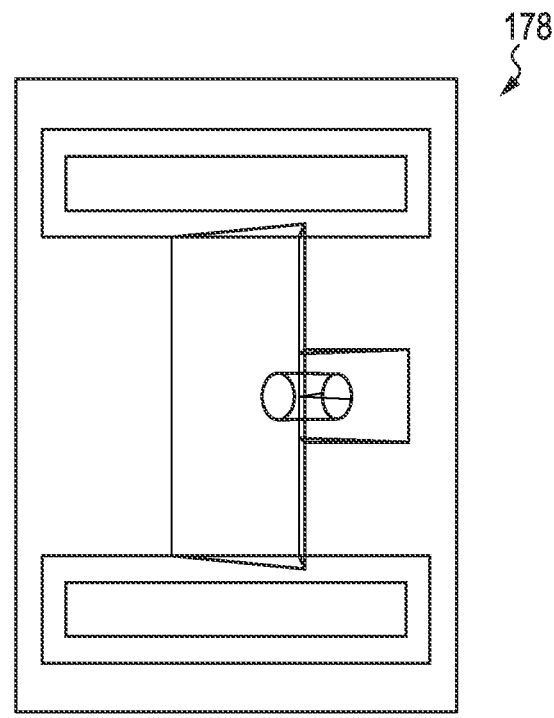
FIG. 14B is a top perspective view of the 45 degree mount of FIG. 14A.
Figure 15A:
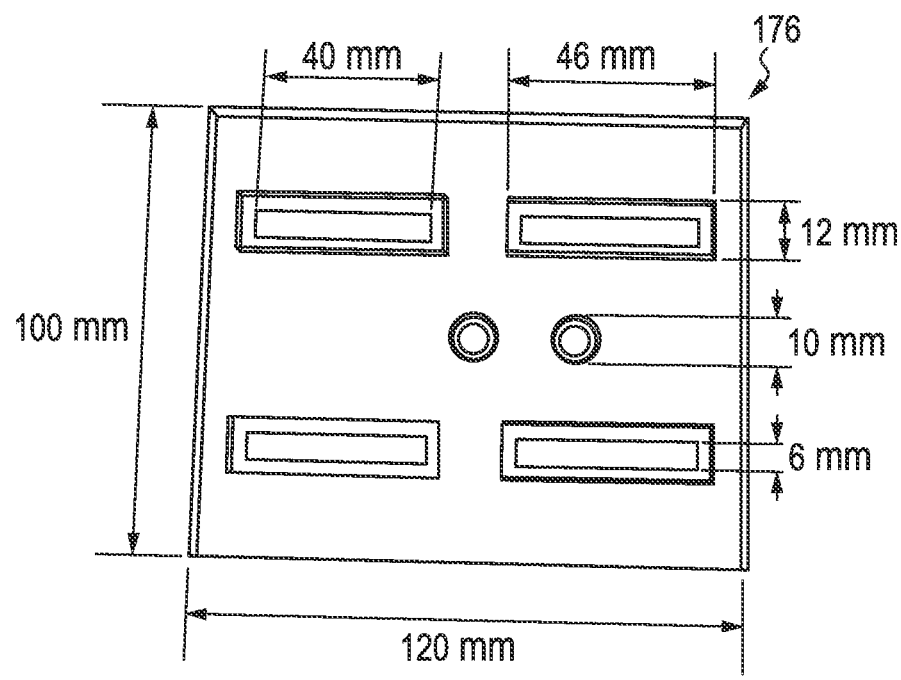
FIG. 15A is a top view of a base plate for the system of FIG. 12A.
Figure 15B:
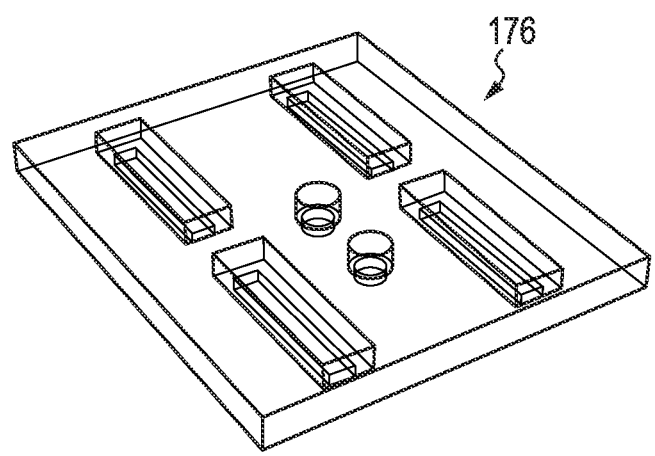
FIG. 15B is a perspective view of the base plate of FIG. 15A.
Figure 16:
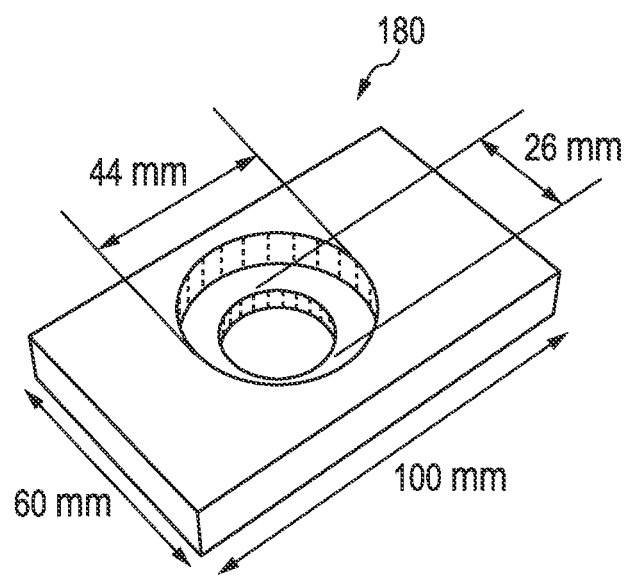
FIG. 16 is a perspective view of a top plate of the housing of the system of FIG. 12A for mounting a microscope objective.

FIGS. 12A-12B depict another embodiment of a portable common path shearing interferometry based holographic imaging system 106. System 106, which incorporates a Helium-Neon (He—Ne) laser source as opposed to a laser diode source for the laser light source 110, cannot be made as compact as systems 100, 102 and 104; however, the He—Ne laser source exhibits better temporal beam stability than a laser diode light source, which can improve the overall temporal stability of the system. The system 106 includes a housing 130 with a sidewall portion 138 and a shear plate holding portion 134 that are attached to each other. The housing 130 includes a top 180 of the sidewall portion that is configured to hold the microscope objective (see FIG. 16). The sample holder 112 is not mounted to the sidewall of the housing like in the systems 100, 102, 104. Instead, the sample holder 112 is mounted to a 3-axis stage 174, which is mounted to a base plate 176 (see FIGS. 15A and 15B). Below the sample holder 112, a mirror on an adjustable mirror mount that is on a 45 degree mount 178 (see FIGS. 14A and 14B) is used to direct the beam from the laser vertically upward and toward the sample.

Figure 13A:
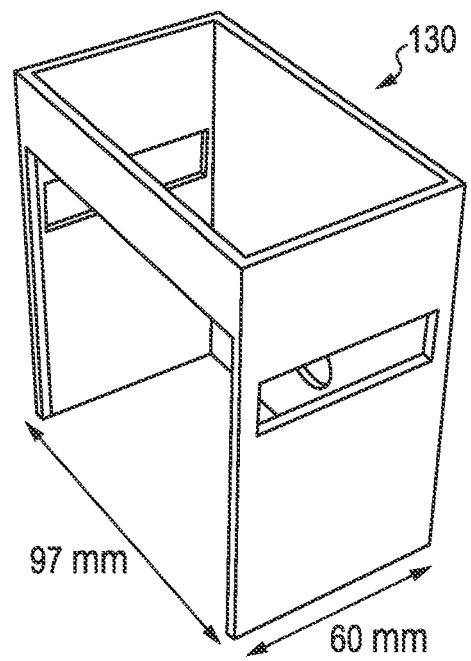
FIG. 13A is a perspective view of a sidewall portion of a housing of the system of FIG. 12A.
Figure 13B:
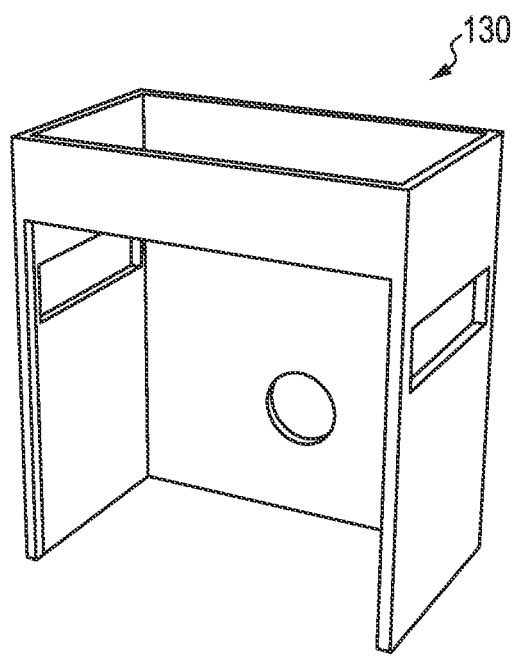
FIG. 13B is another perspective view of the sidewall portion of the housing of FIG. 12A.

FIGS. 13A and 13B depict the sidewall portion 138 of the housing 130 for system 106. The large aperture in the back side enables the laser to extend into the housing 130.

Figure 17:
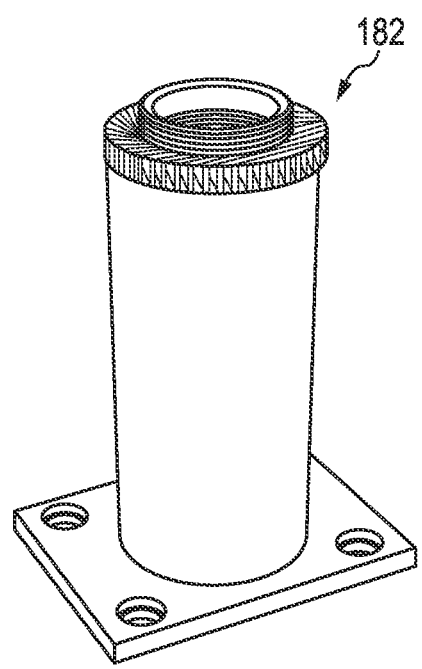
FIG. 17 is a perspective view of an adaptor of the system of FIG. 12A.

In the system 108, a relatively low magnification objective is being employed, which requires a relatively long distance between the sample and the imaging plane. In this embodiment, an adapter 182 (see FIG. 17) is employed that attaches to the housing and to which the imaging device is attached, which provides the necessary separation. In embodiments where a higher magnification objective is employed, the adapter may be shortened or omitted.

Figure 18A:
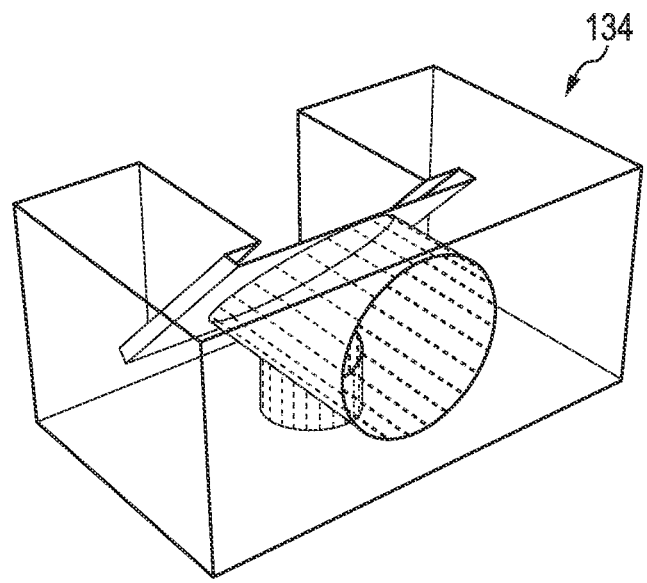
FIG. 18A is a perspective view of a shear plate holding portion of the housing of the system of FIG. 12A.
Figure 18B:
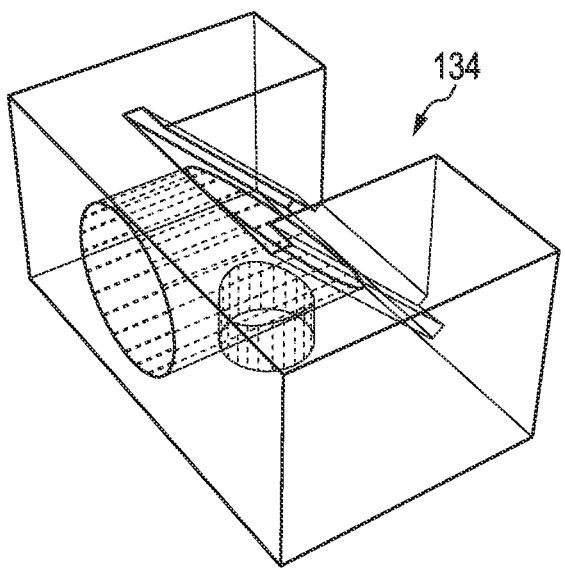
FIG. 18B is another perspective view of the shear plate holding portion of FIG. 18A.
Figure 19A:
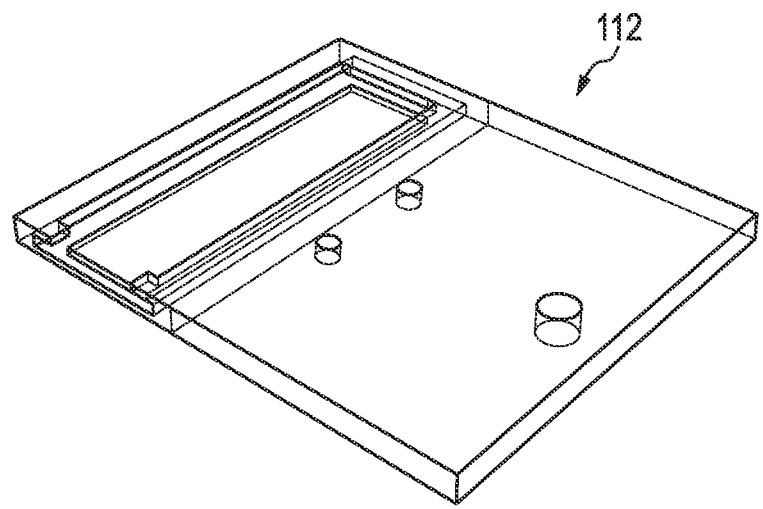
FIG. 19A is a perspective view of a sample holder for the system of FIG. 12A.
Figure 19B:
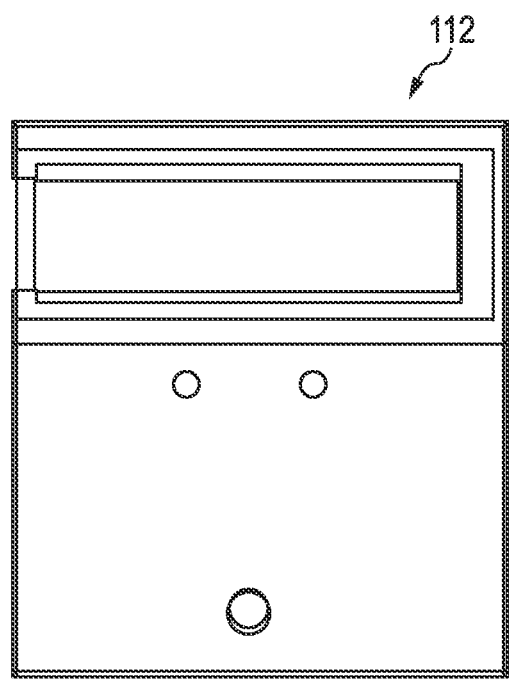
FIG. 19B is a top view of the sample holder of FIG. 19A.
Figure 20:
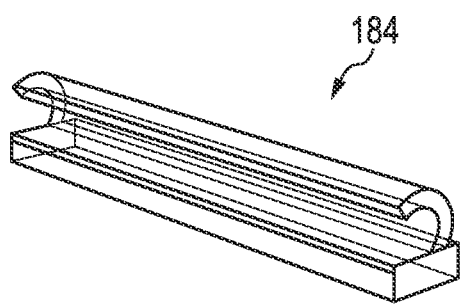
FIG. 20 is a perspective view of a wire holder for the system of FIG. 12A.

FIGS. 18A and 18B depict the shear plate holding portion of the housing 130 for system 108. FIGS. 19A and 19B depict the sample holder 112 for system 108. FIG. 20 depicts a wire holder 184 that may be attached to a portion of the housing to secure a cord from the imaging device and prevent it from moving.

In some embodiments, the system 100, 102, 104, 106 includes or is in communication with a computing device or a computing system. The computing device or computing system is configured for generating an image reconstruction and/or a 3D reconstruction of the sample based on the hologram data acquired by the imaging device. Example computing devices and computing systems are described below with respect to FIGS. 30-32.

In some embodiments, holograms instead of shearograms are formed at the detector. This is achieved by introducing shear much larger than the magnified object image so that the images from the front and back surface of the shear plate are spatially separated. Portions of the wavefront (reflected from the front or back surface of the shear plate) unmodulated by the object information act as the reference wavefront and interfere with portions of the wavefront (reflected from the back or front surface of the shear plate) modulated by the object, which acts as the object wavefront. If the shear amount is larger than the sensor dimension, the second image (either due to reflection from the front or back surface) falls outside the sensor area. If the sensor dimension is more than the shear amount, redundant information about the object is recorded. In some embodiments, the full numerical aperture (NA) of the magnifying lens is utilized in the formation of the holograms. As a result, in these embodiments, full spectral information can be used in the image reconstructions, and only the NA of the imaging lens limits the imaging.

In the reconstruction, the size of the filter window of the Fourier transformed holograms should be limited due to unwanted sidebands. These sidebands may appear because of the non-uniform intensity variation at the detector plane, leading to a change in the contrast of the interference fringes. Another reason may be intensity image saturation leading to a non-sinusoidal fringe pattern. In addition, the size of the filter window determines the maximum spatial frequency available in the reconstructed images. For imaging sensors with sufficient resolution (e.g., CMOS detectors), the lateral resolution in the reconstructed images is not limited by the imaging lens, but by the size of the filter window.

The lateral shear caused by the shear plate helps to achieve off-axis geometry, which enhances the reconstructions and simplifies the processing to reconstruct the digital holograms, which is typically not possible in in-line DHMIC setups such as Gabor holography. Moreover, the carrier fringe frequency of the interferogram should not exceed the Nyquist frequency of the sensor, as the carrier fringe frequency is related to the off-axis angle caused by the lateral shear generated by the glass plate. This means the fringe frequency is a function of the thickness of the shear plate. Thus, a thicker shear plate can be used to increase the off-axis angle. The fringe frequency is $f_s = S/r\lambda$, where S denotes the lateral shift induced by the shear plate, $\lambda$, is the wavelength of light source, and r is the radius of curvature of the wavefront. Moreover, the relationship between shift (S), shear plate thickness (t), incidence angle on shear plate ($\beta$), and refractive index of material of the shear plate (n) is given as follows: $S/t = \sin(2\beta)(n^2 - \sin \beta)^{-1/2}$. To have more control over the off-axis angle, a wedge plate can be used as the shear plate.

Two holograms can be recorded: one with an object and background ($H_O$), and another with background only ($H_R$). The Fourier transform of each hologram is taken, filtered (digital filtering of the real part of spectrum in Fourier domain), and then inverse Fourier transformed, generating the phase map for the respective digital hologram. The same filter window with the same dimensions is applied to filter the spectrums of both $H_O$ and $H_R$. This process results in two phase maps, one corresponding to the object and background ($\Delta\phi_O$) and the other to the background only ($\Delta\phi_R$). To obtain the phase map information due to the object only ($\Delta\phi$), the phase map of the object and background is subtracted from the phase map with background only ($\Delta\phi = \Delta\phi_R - \Delta\phi_O$); this process also removes most of the system-related aberrations.

The phase difference due to the object only ($\Delta\phi$) is then unwrapped using the Goldstein's branch cut method. After phase unwrapping ($\Delta\phi_{Un}$), the cell height/thickness, $\Delta h$, can be determined, using the following equation:

$$\Delta h = \Delta\phi_{Un} \frac{\lambda}{2\pi} \cdot \frac{1}{\Delta n}$$

where $\Delta\phi_{Un}$ is the unwrapped phase difference, $\lambda$, is the source wavelength, and $\Delta n$ is the refractive index difference between the object and the surroundings used for the reconstruction process.

In some embodiments, a computing device or computing system may be programmed to determine features of a cell, a cell-like object, or a microorganism in a reconstructed image. These features can include some or all of, but are not limited to: a mean physical cell thickness value ($\bar{h}$) for the cell/microorganism in the image; a standard deviation of optical thickness ($\sigma_O$) for the cell/microorganism; a coefficient of variation (COV) for the thickness of the cell/microorganism; a projected area ($A_P$) of the cell/microorganism; an optical volume ($V_O$) of the cell/microorganism; a thickness skewness value for the cell/microorganism, where the thickness skewness measures the lack of symmetry of the cell/microorganism thickness values from the mean thickness value; a ratio of the projected area to the optical volume ($R_{p\_a}$) for the cell/microorganism; a thickness kurtosis value that describes the sharpness of the thickness distribution for the cell/microorganism; and a dry mass (M) of the cell/microorganism.

The mean physical cell thickness is the mean value of optical thickness for a microorganism/cell and can be calculated using the following equations:

$$OPL = [n_c(x, y) - n_m(x, y)]h(x, y) =$$
$$\Delta n(x, y) \cdot h(x, y) \Rightarrow h(x, y) = h_i = \frac{\lambda \cdot \Delta\phi}{2\pi\Delta n} \Rightarrow \bar{h} = \frac{1}{N}\left(\sum_{i=1}^{N} h_i\right),$$

where $i = 1, 2, 3 \ldots N^{th}$ pixel where $n_c(x,y)$ is the refractive index of the cell, $n_m(x,y)$ is the refractive index of the surrounding medium and $h(x,y)$ is the thickness of the cell of a pixel location $(x,y)$, and where $n_c(x,y)$ satisfies the following equation:

$$n_c(x, y) = \frac{1}{h} \int_0^h n_c(x, y, z) dz$$

The coefficient of variation (COV) in thickness is the standard deviation of optical thickness for a microorganism/cell divided by the mean thickness. The standard deviation of optical thickness can be calculated using the following equation:

$$\sigma_0 = \sqrt{\frac{1}{N-1} \sum_{i=1}^{N} (h_i - \bar{h})^2}$$

where N is the total number of pixels containing the cell, $h_i$ are the cell thickness values and $\bar{h}$ is the mean cell thickness. The COV can be calculated using the following equation:

$$COV = \frac{\sigma_0}{\bar{h}}$$

The optical volume ($V_0$) is obtained by multiplying the area of each pixel with the thickness value at each pixel location and integrating over the entire cell thickness profile (SP) using the following equation:

$$V_0 = \int_{SP} h(x, y) ds$$

The projected area ($A_P$) can be calculated as the product of the total number of pixels containing the cell and the area of a single pixel using the following equation:

$$A_P = N \times \left( \frac{\Delta_{Pix\_x} \times \Delta_{Pix\_y}}{(\text{Optical Magnification})^2} \right)$$

where N is the total number of pixels that contain the cell, and $\Delta_{Pix\_x}$ and $\Delta_{Pix\_y}$ are the pixel sizes in the x direction and the y direction, respectively, for a single pixel of the sensor. The projected area also depends upon the optical magnification of the objective lens.

The cell thickness skewness measures the lack of symmetry of the cell thickness values from the mean cell thickness value and can be calculated using the following equation:

$$\text{skewness} = \sum_{i=1}^{N} \frac{(h_i - \bar{h})^3}{\sigma_0^3}$$

The ratio of the projected area to the optical volume ($R_{p\_a}$) and can be calculated using the following equation:

$$R_{p\_a} = \frac{A_p}{V_0}$$

Cell thickness kurtosis describes the sharpness of the thickness distribution. It measures whether the cell thickness distribution is more peaked or flatter and can be calculated using the following equation:

$$\text{Kurtosis} = \sum_{i=1}^{N} \frac{(h_i - \bar{h})^4}{\sigma_0^4}$$

The cell thickness is directly proportional to the dry mass (M) of the cell, which quantifies the mass of the non-aqueous material of the cell. That is, total mass of substances other than water in the cell is known as the dry mass (M) and can be calculated using the following equation:

$$M = \frac{10\lambda}{2\pi\alpha} \int_{A_P} \Delta n(x, y) \, ds$$

where $\alpha$ is the refractive increment, which can be approximated by 0.0018-0.0021 m/Kg when considering a mixture of all the components of a typical cell, $A_p$ is the projected area of the cell, and $\lambda$, is the wavelength.

In some embodiments, these features may be calculated by a features extraction module 207, which is described below with respect to FIG. 30.

Example 1

A first example system was built in accordance with system 106 schematically depicted in FIGS. 12A-20. The first example system included a HeNe laser ($\lambda$=633 nm) and was mounted on an optical breadboard. The system weighed 4.62 kg with the HeNe laser and breadboard and weighted 800 g without the HeNe laser and breadboard. The lateral dimensions of the first example system were 304 mm by 304 mm with a height of 170 mm. The first example system was used with two different imaging devices, the first was a CMOS sensor and the second was a cell phone camera.

The CMOS sensor was an 8 bit, 5.2 μm pixel pitch, model DCC1545M from Thorlabs, which has a large dynamic range and a 10-bit internal analog-to-digital conversion, but it transfers images to the PC with a bit depth of 8 bits to improve the readout time of the camera. For the cell phone sensor setup, a Google Nexus 5, which has an 8 MP primary camera, 1/3.2" sensor size, and 1.4 μm pixel size, was used. Moreover, the cell phone camera used 8 bits/channel. When comparing the camera sensor with the cell phone sensor, the dynamic range of the cell phone sensor may be lower due to the small sensor and pixel size, as the pixel wells fill quicker due to low saturation capacity. Moreover, the cell phone sensor had a Bayer filter for color detection. Finally, the cell phone camera sensor had a lower SNR than the CMOS camera. One reason is that the images generated from the cell phone camera were in the JPEG format, which is a lossy compression scheme resulting in a poorer image quality. The CMOS camera can save images as .bmp, which does not compress the images.

It is important to calculate the camera parameters. ImageJ (a public domain software: https://imagej.nih.gov/ij/) was used to establish an equivalence between the pixel covered by the object (also taking optical magnification into account) and the distance in microns for the cell phone sensor and CMOS. FIGS. 21A-21B show the equivalence between the pixels and the distance in microns.

The test object used in FIGS. 21A-21B was a 20-μm glass bead (SPI supplies). The other beads observed in FIGS. 21A-21B (solid yellow boxes around the objects) were the sheared copies of the same objects. Moreover, the field of view (FOV) of the DH microscope can depend on the objective and eyepiece lens used. A higher magnification objective gives a smaller FOV, as the sensor must image a more magnified object in comparison to a lower magnification lens; hence, a relatively smaller, magnified specimen region can be imaged on the sensor. For this example, a 40× objective lenses with a numerical aperture (NA) of 0.65 was used with the CMOS sensor. The actual magnification depends on the placement of the camera sensor from the objective. The theoretically achievable lateral resolution with this objective is 0.595 μm. To use the cell phone with the first example system 106, the CMOS was replaced with the eyepiece and the cell phone. A cell phone adapter was 3D printed to hold the camera and eyepiece in place. The eyepiece used with the cell phone setup had a magnification of 25×. Table 1 below summarizes the parameter values for the CMOS and the cell phone sensor.

TABLE 1

Camera Parameters

| Camera Parameters | Camera Type | |
|---|---|---|
| | CMOS | Cell Phone Sensor |
| Magnification | 52x | 17x |
| Available sensor area (ASA) | 35 mm² | 7.78 mm² |
| Usable FOV (vertical) | 104 μm | 260 μm |
| Usable FOV (horizontal) | 130 μm | 260 μm |
| Pixel size | 5.2 μm | 1.4 μm |
| Sensor type | Mono | Color |

A second example system was built in accordance with system 100 described above with respect to FIGS. 1A-1F. The second example system was more compact and lighter than the first example system. This second example system used a laser diode light source (Thorlabs, CPS 635) with a wavelength of 635 nm and an elliptical beam profile in place of the HeNe laser. The second example system had lateral dimensions of 75 mm by 95 mm and was 200 mm tall. The second example system weighed 910 g (without the base) and 1.356 kg (with the base). The computed lateral resolution of the first example system, taking into consideration the filter window size, was approximately 1.2 um. The computed lateral resolution of the second, more compact, example system was 0.9 um. For the example systems a 3-5 mm thick glass plate was using for the shear plate, which enabled spatial filtering of the spectrum and satisfied the Nyquist criteria for sampling.

Imaging Test Microspheres and Cells for the First Example System Using HeNe Laser:

Glass microspheres with a mean diameter of 19.9 plus/minus 1.4 μm and average refractive index $n_o$=1.56 were used test the performance of the first example system when used with the CMOS camera. The microspheres were immersed in oil (average refractive index, $n_m$=1.518) and then spread on a thin microscopic glass slide and covered with a thin coverslip. The digital holograms were recorded, and the 3D profiles were reconstructed as described above. FIGS. 22A-22E show the results of the reconstruction.

FIG. 22A is the digital hologram of a 20-μm glass bead, acquired using the CMOS sensor. FIG. 22B shows the unwrapped phase profile of the bead. FIG. 22C shows the height variations, as depicted by color maps, and FIG. 22D is the one-dimensional cross-sectional profile, along the line (see FIG. 22C). FIG. 22E shows the pseudocolor 3D rendering of the thickness profile for the same bead. The thickness/diameter was measured for 50 20-μm glass microspheres, and the mean diameter for the microspheres was measured to be 17.38 plus/minus 1.38 μm, which was close to the thickness value specified by the manufacturer.

Figure 23:
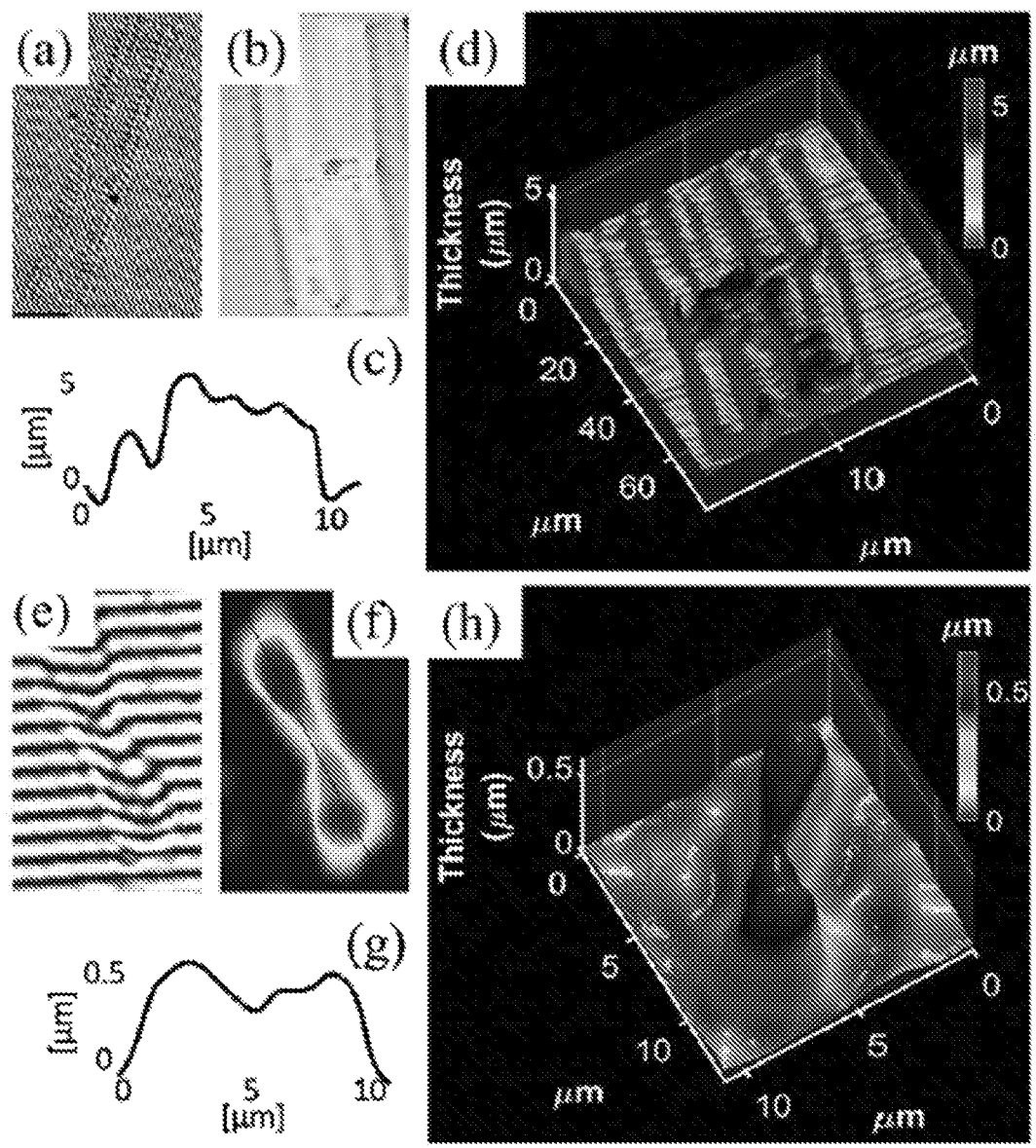
FIGS. 23A-H are experimental results for the first example system using the CMOS sensor to image cells.

The experiments were repeated for biological cells, including Diatom-Tabellaria ($n_m$=1.50) and E. coli bacteria ($n_m$=1.35). Both cell types were immersed in deionized water ($n_m$=1.33). FIG. 23A shows the digital hologram of the Diatom-Tabellaria cells. FIG. 23B shows the height variations depicted by color maps, FIG. 23C shows the 1D cross-sectional profile of the diatom along the line, and FIG. 23D is the reconstructed 3D height profile for the diatom. Likewise, FIGS. 23E-23H are the digital hologram, the height variations depicted by color maps, the 1D cross-sectional profile along the line (see FIG. 23F), and the reconstructed 3D height profile for the E. coli bacteria. From FIG. 23H, one can see that the length of E. coli is close to 12 μm, the width is between 2-4 μm, and maximum height is 0.6 μm.

Imaging Test Microspheres and Cells for the Second Example System (Compact 3D Printed Setup Using a Laser Diode):

To show the 3D reconstruction capabilities with the second example system, which was the more compact 3D printed DH microscope system 100 shown in FIGS. 1A-1F, the 3D data was reconstructed from the holograms as described above.

Figure 24:
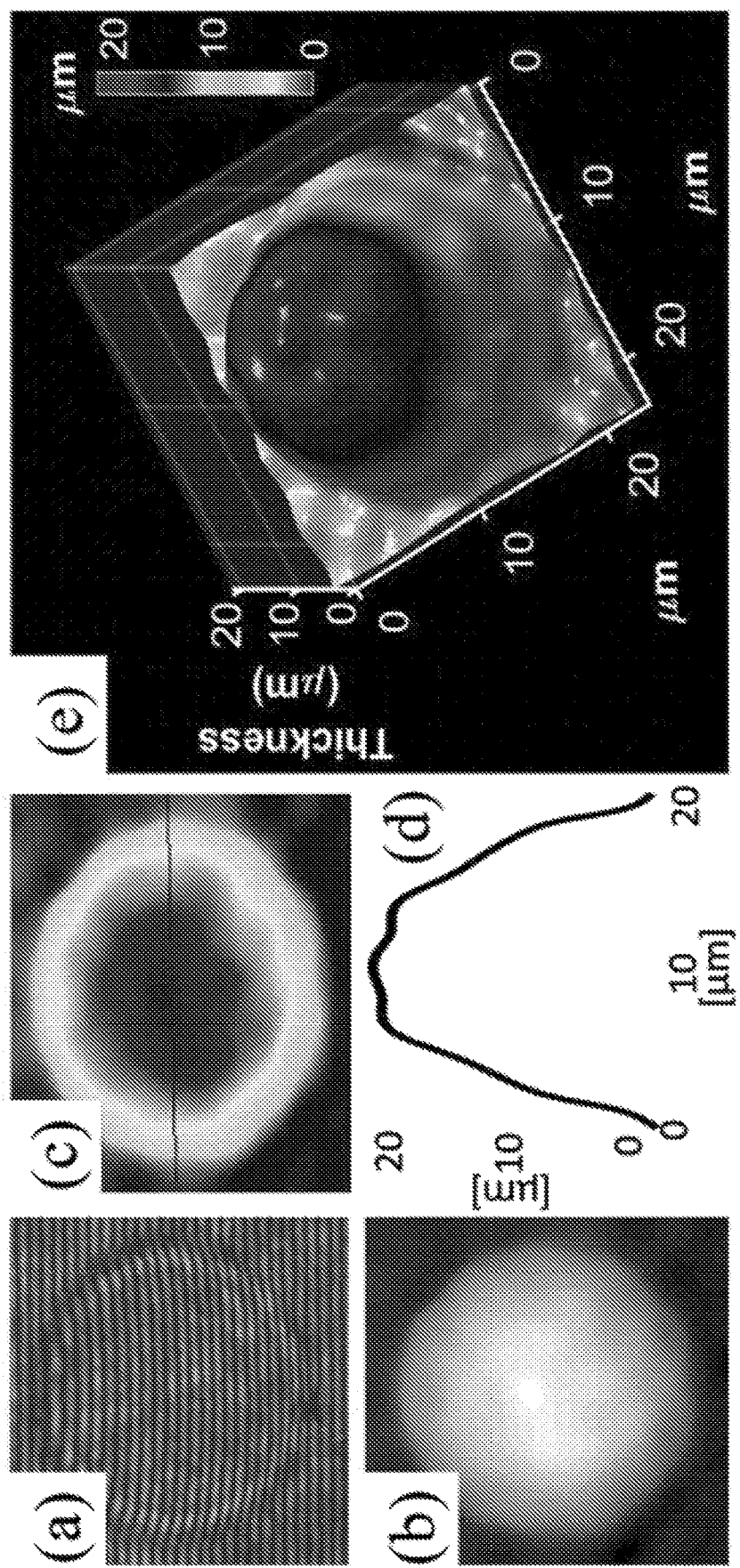
FIGS. 24A-24E show experimental results for the second example system (the more compact 3D printed DH microscope)

FIG. 24A is the digital hologram of a 20-μm glass bead ($n_o$=1.56) immersed in oil ($n_m$=1.5181) that was acquired using the CMOS sensor for the second example system. The bead diameter (obtained experimentally) is 17.427 μm plus/minus 0.903 μm. FIG. 24B shows the unwrapped phase profile of the bead. FIG. 24C shows the height variations depicted by the color maps, and FIG. 24D is the one-dimensional cross-sectional profile along the line (see FIG. 24B). FIG. 24E shows the pseudocolor 3D rendering of the thickness profile for the same bead.

Figure 25:
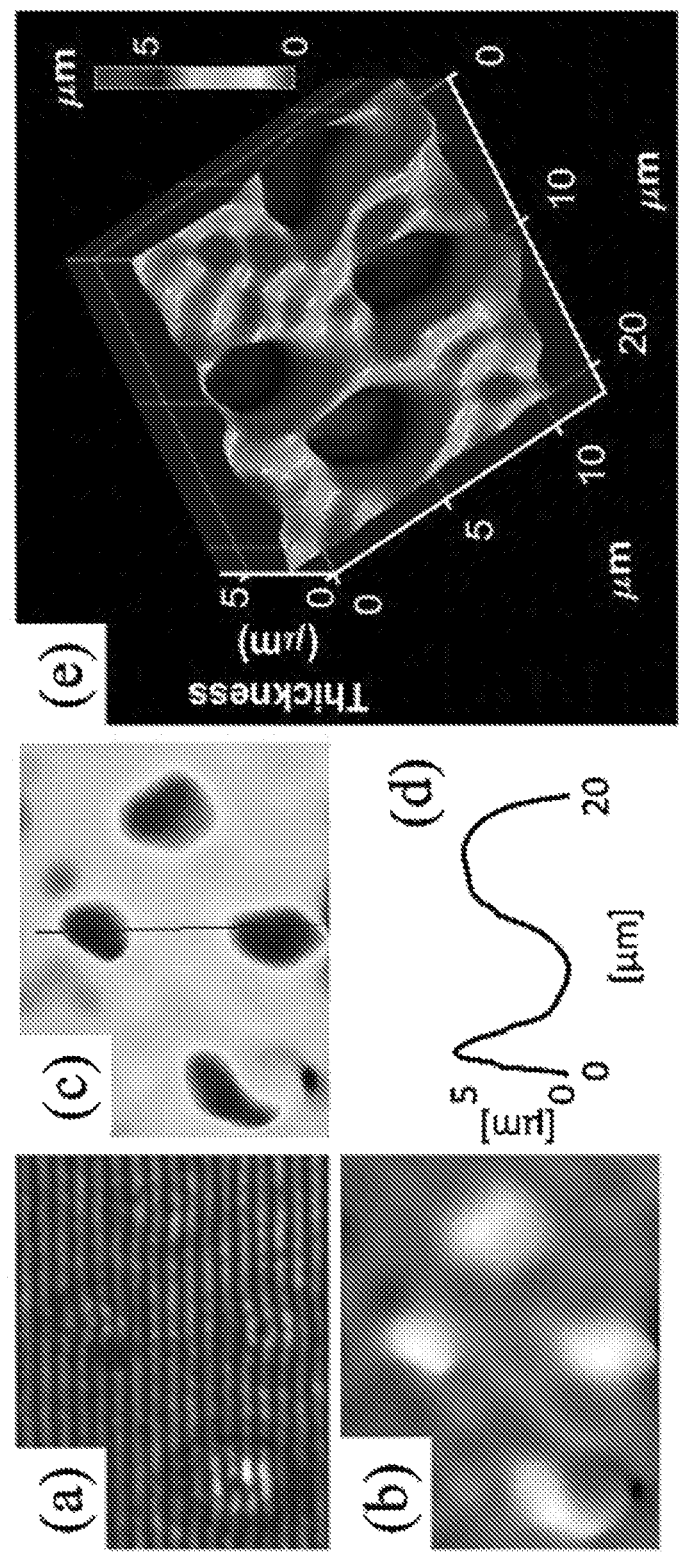
FIGS. 25A-25E show experimental results for the second example system (the more compact 3D printed DH microscope) imaging cells.

Data was also obtained from yeast cells ($n_o$=1.53) immersed in deionized water ($n_m$=1.33) using the second example system. FIG. 25A is the digital hologram of yeast cells immersed in distilled water acquired using the CMOS sensor. FIG. 25B shows the unwrapped phase profile of the cells. FIG. 25C shows the height variations depicted by color maps, and FIG. 25D is the one-dimensional cross-sectional profile, along the line (see FIG. 25C). FIG. 25E shows the pseudocolor 3D rendering of the thickness profile for the same cells.

In the reconstructions, roughness around and on the objects was observed. This roughness can be attributed to optical thickness variations. Microspheres may not be smooth. Moreover, the optical thickness variation of the object and its surroundings depends on either change in the real thickness or due to spatially changing refractive index (due to density change) in the micro-sphere and its surroundings.

The size of the roughness was approximately 1-2 μm, which became visible as the window size becomes large enough to accommodate the high spatial frequencies. One can obtain smooth reconstructions if the size of the filter window is reduced. Other possible reasons for the roughness is sample deformations and the presence of impurities.

Temporal Stability of the First Example System Using HeNe Laser:

As described above, the systems herein employ common path digital holography and exhibit a very high temporal stability in contrast to the two beam configurations such as Michelson and Mach-Zehnder interferometers, where the two beams may acquire uncorrelated phase changes due to vibrations. To determine the temporal stability of the first example system, a series of fringe patterns or movies were recorded for a glass slide without any object. For example, 9000 fringe patterns were recorded for 5 min at a frame rate of 30 Hz for a sensor area of 128×128 pixels (15.8×15.8 µm) using the "windowing" functionality of the CMOS sensor.

CMOS sensors can read out a certain region of interest (ROI) from the whole sensor area, which is known as windowing. One of the advantages of windowing is the elevated frame rates, which makes CMOS a favorable choice over CCDs to study the dynamic cell membrane fluctuations. One of the main reasons for using a small sensor area (128×128 pixels) is because processing the whole sensor area images (1280×1024 pixels) may be computationally expensive and time consuming. Path length changes were computed by comparing the reconstructed phase distribution for each frame (containing the fringe patterns) to a previously recorded reference background. It should be noted that the 3D-printed DHMIC prototype was not isolated against vibrations, that is, it was not placed on an air floating optical table. Standard deviations were computed for a total of 16,384 (128×128) pixel locations.

Figure 26:
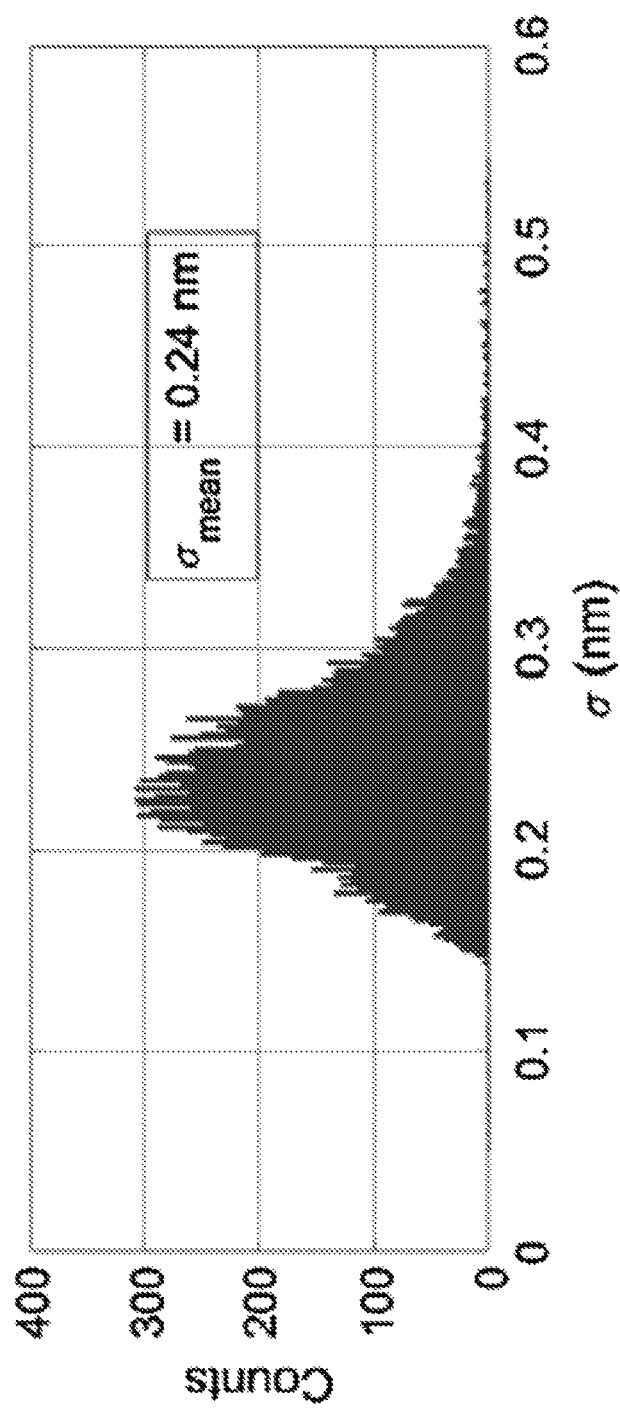
FIG. 26 shows experimental results for the temporal stability of the first example system including a HeNe laser, the temporal stability data includes a histogram of standard deviations of fluctuations of 128×128 pixels recorded at a frame rate of 30 Hz without mechanical isolation, where the inset shows the mean of standard deviations, which was 0.24 nm.

FIG. 26 shows the histogram of standard deviation fluctuations with a mean standard deviation of 0.24 nm. With the first example system, sub-nanometer temporal stability of the order of 0.24 nm was obtained without any vibration isolation. This can be highly beneficial in the study involving cell membrane fluctuations, which are on the order of tens of nanometers.

Thus, the first example system and the second example system can be used with common mobile devices for hologram recording. There are many advantages to using mobile devices in microscopy. For example, using the field-portable prototypes presented in the present disclosure, it is possible to record and send digital holograms to a computational device located remotely, via the internet for data analysis. This becomes important when the personnel handling the system lack the skills to process the acquired data. In addition, inexpensive laser diodes and CMOS sensors, such as webcams, can be used in the setup. Mass-producing the system can further reduce the cost.

Use of the First Example System Including a HeNe Laser to Study Red Blood Cells:

Sickle cell disease (SCD) is a life threatening condition, where a person suffering from such a disease is prone to several complications such as organ malfunction, which is caused due to deformations in the shapes (e.g., from doughnut to a sickle) of red blood cells (RBC). The first example system based on system 100 was used to image deformations in membranes of red blood cells (RBC). RBC membrane fluctuations can provide some insights into the state of a cell. The present disclosure provides a spatio-temporal analysis of cell membrane fluctuations. A video hologram of a cell was recorded and reconstructions were created for every hologram frame (time steps). Analysis of the reconstructions enabled automated classification of the cells as normal or sickle cells as described in related U.S. provisional application entitled "Automated Cell Identification Using Shearing Interferometry," previously incorporated by reference.

Figure 27:
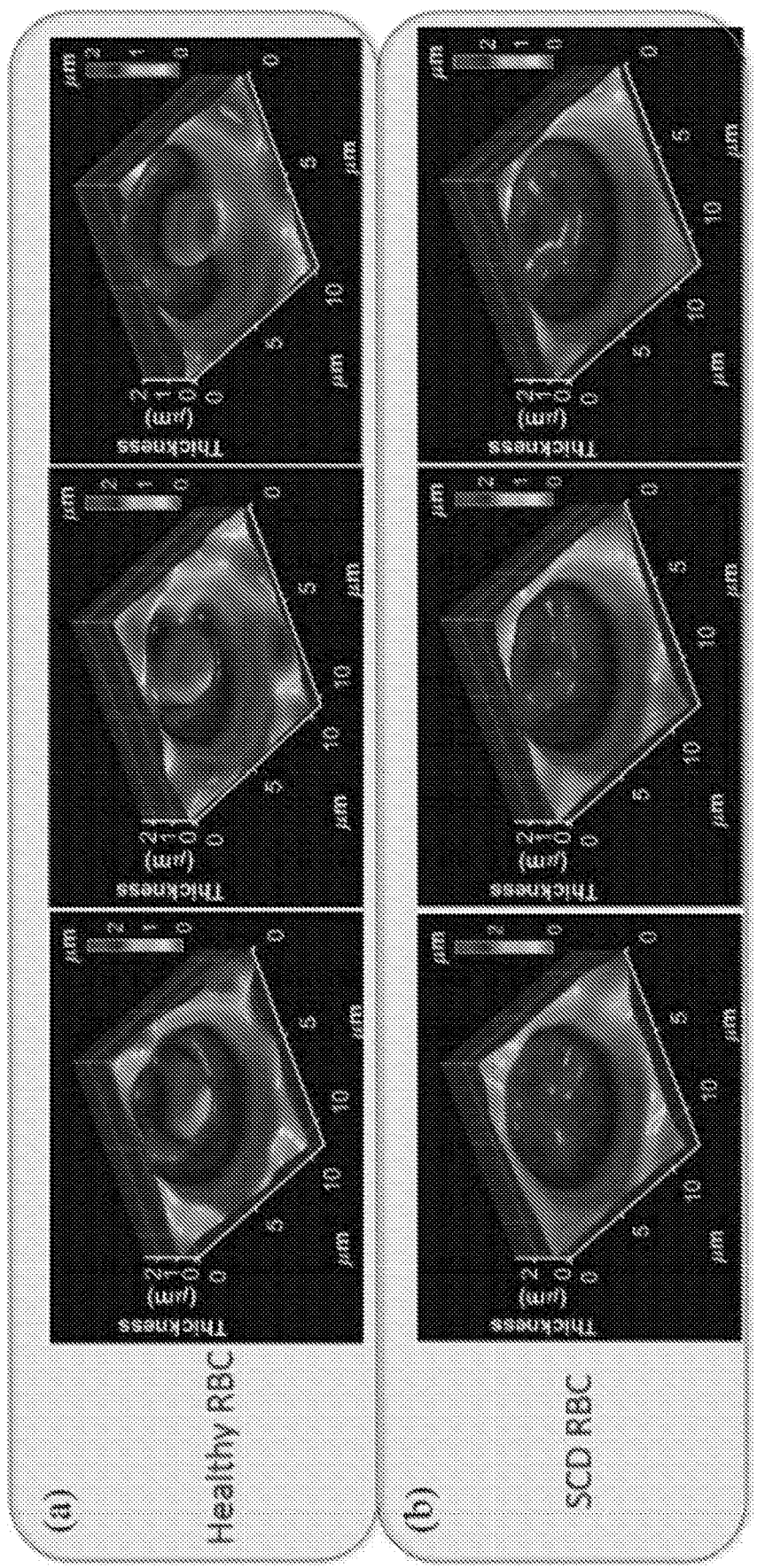
FIGS. 27A-27B.

Holograms were recorded of RBC samples using the first example system. Reconstructed thickness profiles were generated from the holograms. FIG. 27A depicts three 3D reconstructed images/profiles (holograms) of healthy RBCs from different healthy volunteers, while FIG. 27B depicts three 3D reconstructed images/profiles (holograms) of sickle cell diseased (SCD) RBCs from different patients.

Example 2

Several additional example systems were built and tested for temporal stability. A third example system was built in accordance with system 102 described above with respect to FIGS. 8A to 8D. The system had a length of 90 mm, a width of 85 mm and a height of 200 mm. The system had a mass of 0.87 kg.

A fourth example system was built in accordance with system 104 described above with respect to FIG. 9. The system had a length of 80 mm, a width of 80 mm and a height of 130 mm. The system had a mass of 0.43 kg.

Figure 29:
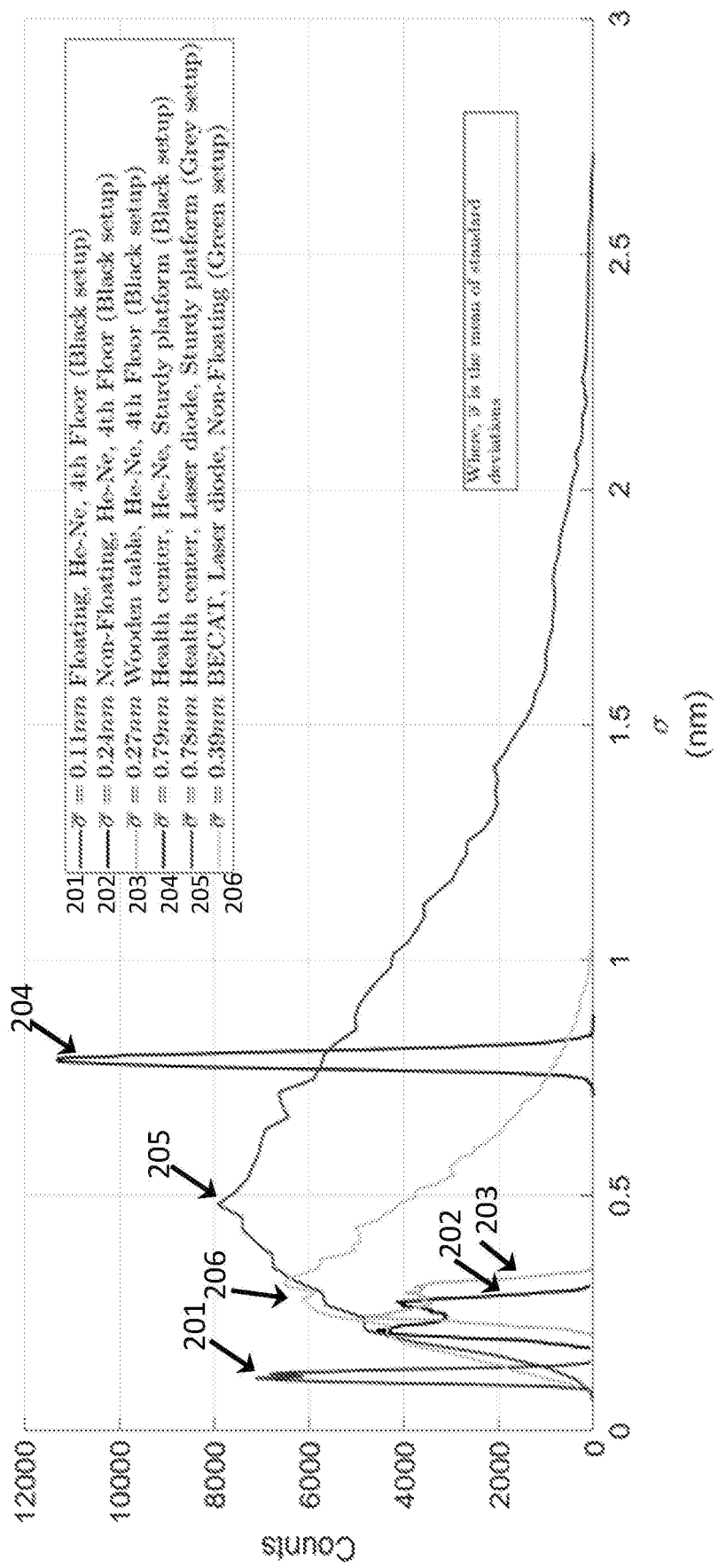
FIG. 29 is a histogram of the experimental temporal stability data for the different example systems placed in varying locations that exhibit different sources of noise

The example systems were tested for temporal stability, where stability was calculated as the mean/average of the standard deviations calculated for every pixel for frames in a video over a period of time. For stability measurements in the example systems, the windowing functionality of the CMOS sensor was used to record from a sensor area of 128 by 128 pixels (16,384 total pixels) corresponding to 15.8 µm by 15.8 µm. Fringe patterns were recorded for 9000 frames over 5 minutes at a frame rate of 30 Hz. FIG. 28 is a table of the various example systems under different conditions where the "black setup" refers to the first example system corresponding to system 106, "grey setup" refers to the third example system corresponding to system 102, and the "green setup" refers to the fourth example system corresponding to system 104. FIG. 29 is a histogram of the standard deviations for the various systems. As indicated in FIGS. 28 and 29 the temporal stability was better than 1 nm for all example systems under all circumstances. For some of the systems, the temporal stability was better than 0.5 nm.

Figure 30:
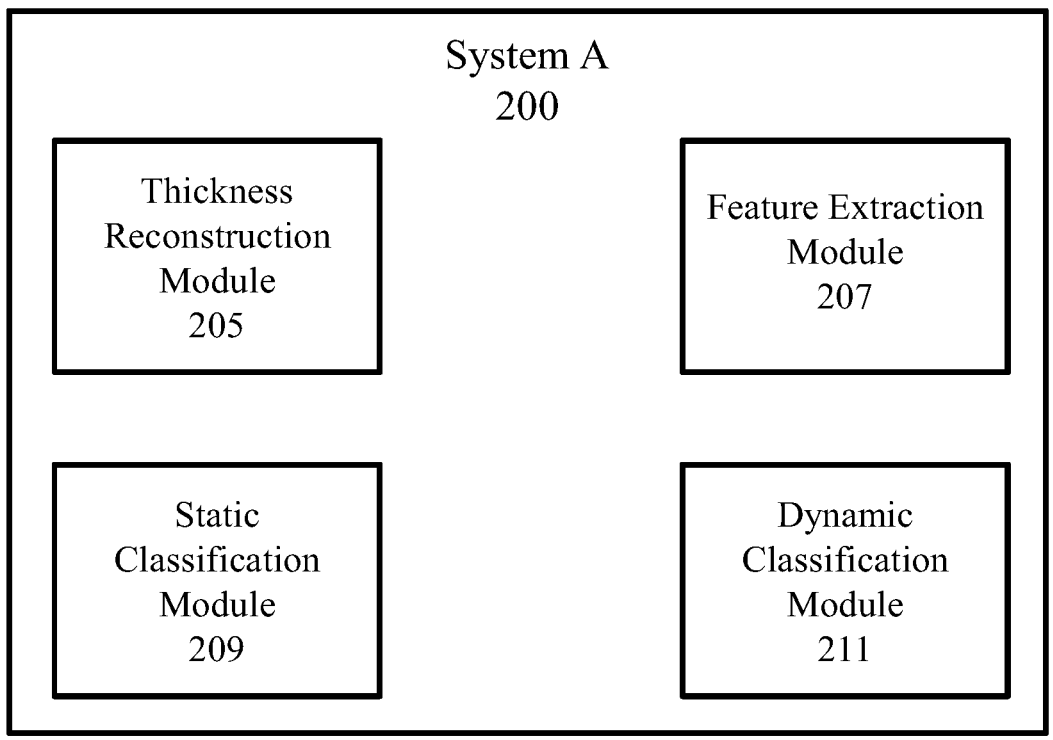
FIG. 30 is a block diagram showing an exemplary system for processing and analyzing hologram data, according to an example embodiment.
Figure 41:
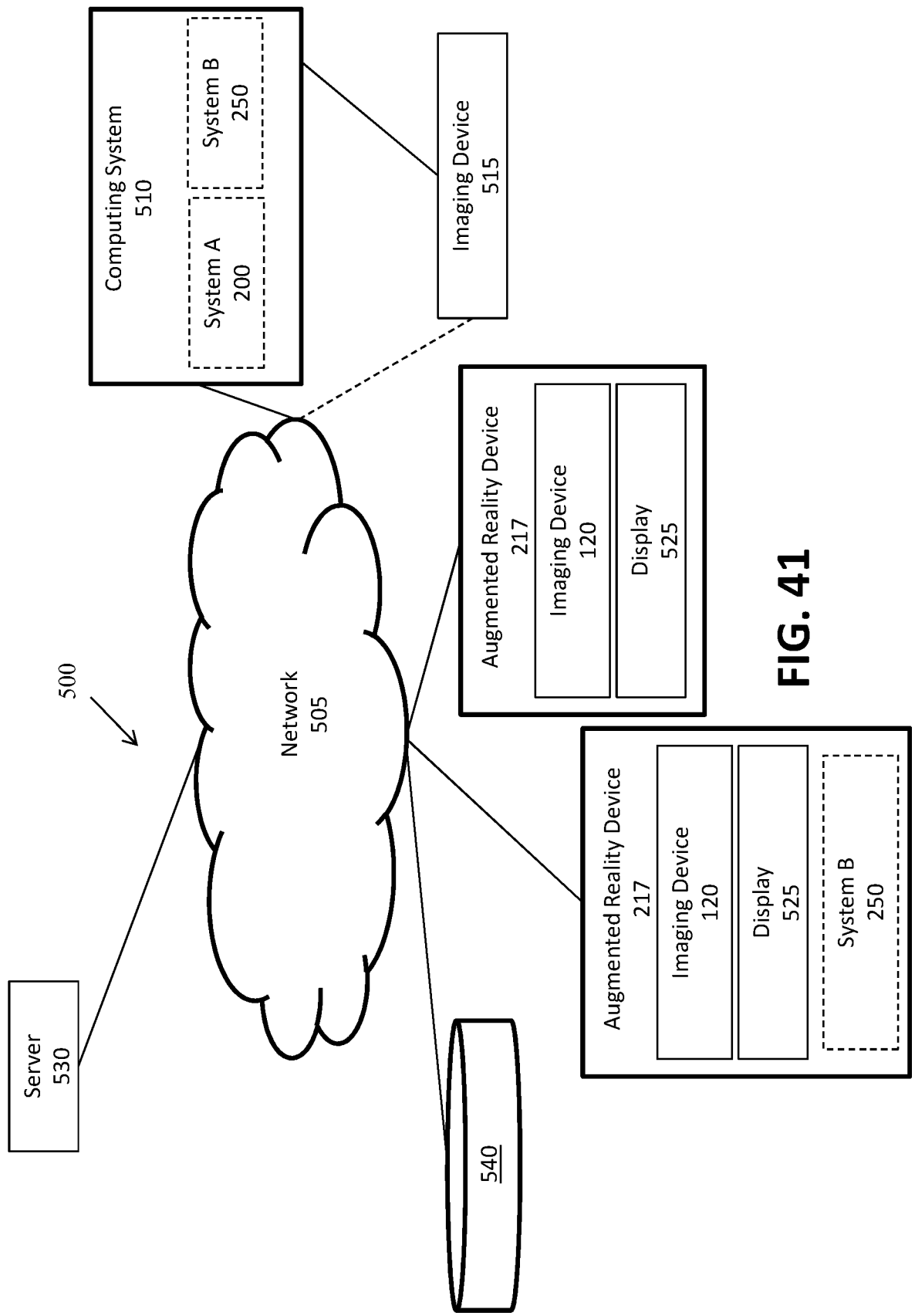
FIG. 41 is a diagram of an exemplary network environment suitable for a distributed implementation of exemplary embodiments for processing and analyzing hologram data.

FIG. 30 is a block diagram showing a system A 200 in terms of modules for analyzing the hologram data. The features extraction module 207 may be executing on a computing system associated with an imaging device, or may be provided remotely via a network. In some embodiments, a system A 200 is used to analyze data from the shearing interferometry-based microscope system 100. The modules include one or more of a thickness reconstruction module 205, a features extraction module 207, a static classification module 209, and a dynamic classification module 211. The modules may include various circuits, circuitry and one or more software components, programs, applications, or other units of code base or instructions configured to be executed by one or more processors (e.g., processors included in a computing system 510 as shown in FIG. 41). In an example embodiment, one or more of modules 205, 207, 209, and 211 are included in a device (e.g., computing system 510 as shown in FIG. 41). In another embodiment, one or more of the modules 205, 207, 209, and 211 may be provided remotely by a server through a network. Although modules 205, 207, 209, and 211 are shown as distinct modules in FIG. 30, it should be understood that modules 205, 207, 209, and 211 may be implemented as fewer or more modules than illustrated. It should be understood that one or more of modules 205, 207, 209, and 211 may communicate with one or more components included in exemplary embodiments of the present disclosure (e.g., computing system 510, imaging device 120, server 530, or database(s) 540 of system 500 shown in FIG. 41).

The reconstruction module 205 may be a software implemented or hardware implemented module configured to reconstruct a thickness profile map from hologram data. The features extraction module 207 may be a software implemented or hardware implemented module configured to extract features regarding cells or microorganisms from the sample data. The static classification module 209 may be a software implemented or hardware implemented module configured to classify cells or microorganisms in a sample in an automated fashion based on static data measurements. The dynamic classification module 211 may be a software implemented or hardware implemented module configured to classify cells or microorganisms in a sample in an automated fashion based on time evolving features of the cells or microorganisms. In some embodiments, aspects of the method are implemented on a computing system associated with the shearing digital holographic microscopy system, which is described in FIG. 41. In some embodiments, some aspects of the method are implemented on a computing device associated with the shearing digital holographic microscope system and other aspects are implemented remotely (e.g., on a server remote from the shearing digital holographic microscope system).

Figure 31:
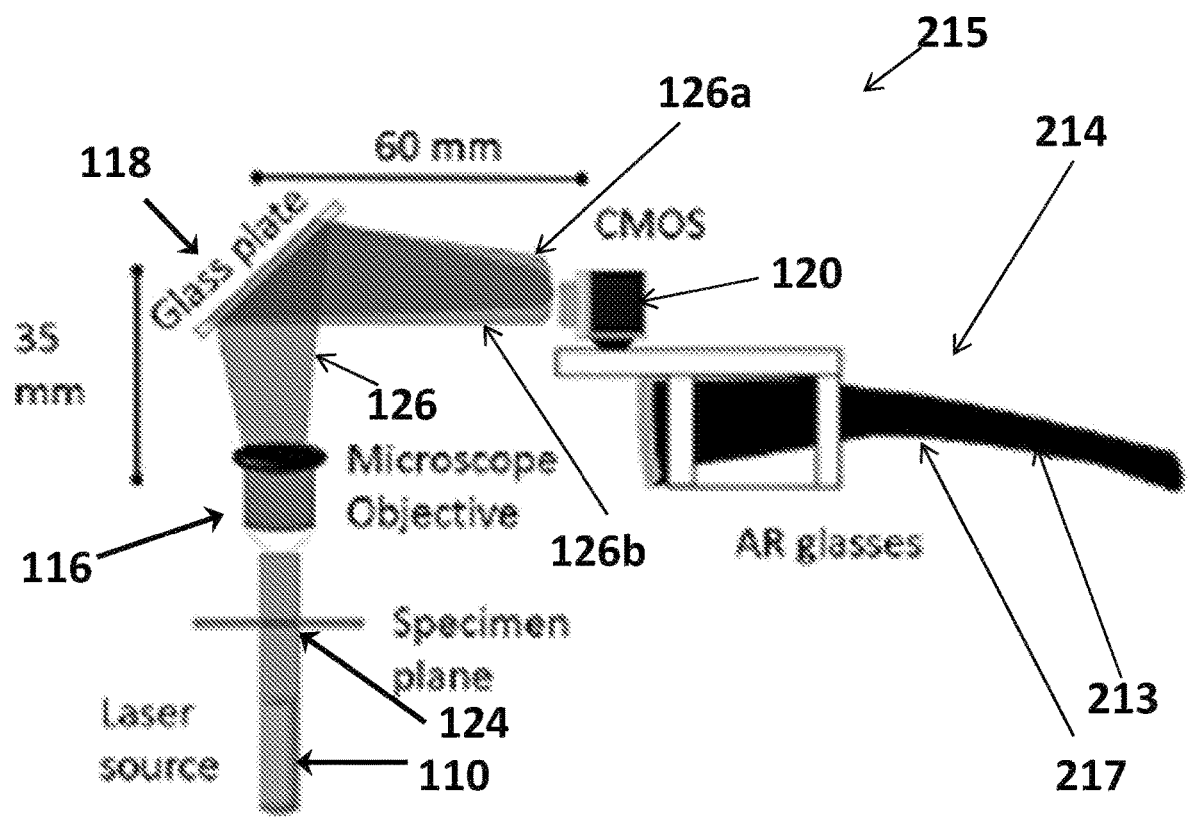
FIG. 31 illustrates a three-dimensional (3D) microscopy for three-dimensional (3D) microscopy for the automated cell identification and visualization system 215 using an augmented reality display device in accordance with an exemplary embodiment.

FIG. 31 illustrates three-dimensional (3D) microscopy for automated cell identification and visualization system 215 using an augmented reality display device 217. As described above, augmented reality can be presented through numerous mediums, including projection, handheld, and head mounted devices. Head mounted devices include smart glasses such as the Epson Moverio smart glasses. The glasses can use optical see-through techniques to display virtual images coexisting with reality. With optical see-through systems, the virtual images can be displayed onto a partially transmissive screen that may not block the real world scenes behind it. The key advantage of augmented reality over other systems is allowing the user to view both the real world and the virtual computer generated images simultaneously. Optical see-through devices have the advantages of not altering the real-world resolution, as well as being cheaper, safer, and parallax free.

The use of augmented reality in smart glasses leads to a variety of medical applications such as assisting and improving surgery, helping to improve vision for patients, and displaying useful information overlaid onto a subject. By combining digital holography with augmented reality via smart glasses, information such as the disease state of a cell may be provided to a physician in real time to ultimately improve the quality of healthcare.

The three-dimensional (3D) microscopy for automated cell identification and visualization system 215 can include a light source 110 which can be embodied as laser diode, a specimen plane 124, a microscope objective lens 116, a shearing plate 118, an imaging device 120, and an augmented reality display device 117. The augmented reality device 217 can further include a right band 213 and left band 214.

In one embodiment, the light source 110 can be disposed under the specimen plane 124. The specimen plane 124 can include a sample holder to hold and support a sample. The light source 110 outputs a beam 126 which illuminates a sample at a specimen plane 124. After passing through the specimen plane 124 and through/around the sample, the beam 126 is magnified by the microscope objective lens 116, and is incident on the shear plate 118, which splits the beam generating two laterally sheared object beams 126a, 126b. The two laterally sheared object beams 126a, 126b can generate a hologram of the sample. As a non-limiting example, the beam 126 and shearing glass can intersect with the shear plate 118 at a 45 degree angle. These two sheared beams interfere at the imaging device 120 and interference fringes are observed. A final visualization of the 3D reconstruction of the sample along with labels and the extracted features associated with the sample can be rendered on the augmented reality display device 217. The imaging device 120 can record the hologram of the sample. The imaging device can capture one or more still or moving images or a video of the hologram. As an example, the sample can be one or more microscopic objects such as biological cells. The visualization of the 3D reconstructed biological cells can include a 3D image of the biological cells, labels identifying the biological cells and extracted features of the biological cells.

Figure 32:
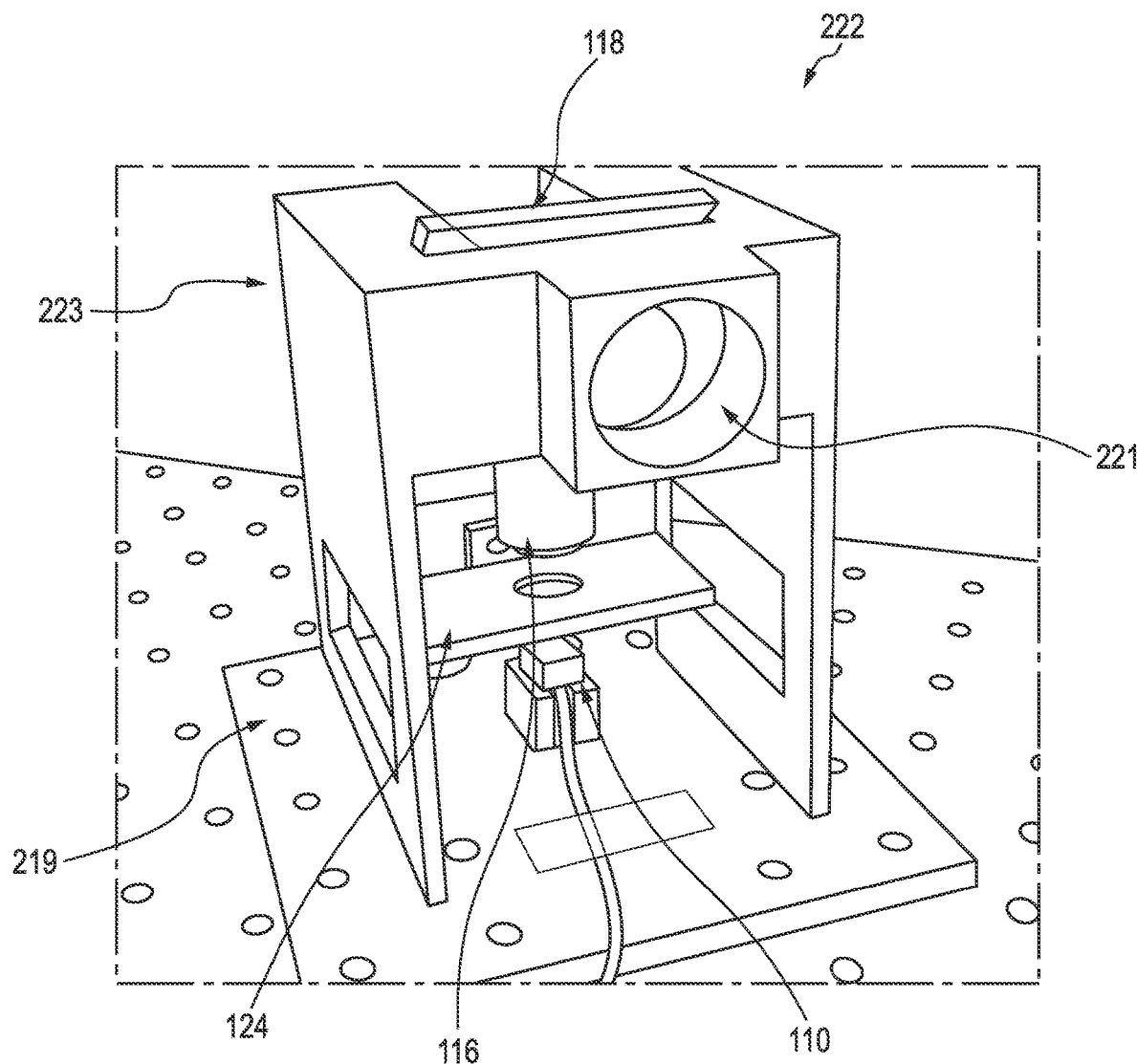
FIG. 32 illustrates an exemplary setup for three-dimensional (3D) microscopy for the three-dimensional (3D) microscopy for the automated cell identification and visualization system 215 in accordance with an exemplary embodiment.

As a non-limiting example, the light source 110 can be a Laserex Technologies LDM-1. The 1 mW laser can have a collimated elliptical beam size of 2.5 mm×0.8 mm and a wavelength of 635 nm. This light source 110 can be a compact size and can measure 10 mm×12 mm×13 mm. The imaging device 120 can be a CMOS image sensor. In particular, the imaging device 120 can be a Basler acA3800-14 um, which has a resolution of 3840×2784 pixels and square pixel dimensions of 1.67 μm×1.67 μm. The microscope objective lens 116 can be a 40× microscope objective lens. The setup 222 can have a maximum field-of-view of 270 μm×195 μm. The lateral resolution of the optical system can depend on the numerical aperture (NA) of the lens, source wavelength, and the size of the filter window. The computed lateral resolution of the setup 222 can be is 1.10 μm after taking into consideration the size of the filter window. The Epson Moverio BT-200 smart glasses are equipped with a 0.42 inch wide LCD optical display in each lens, which is equivalent to viewing an 80 inch display at 5 m. FIG. 32 illustrates an example setup 222 for the three-dimensional (3D) microscopy for the automated cell identification and visualization system 215. In one embodiment, the three-dimensional (3D) microscopy for automated cell identification and visualization system can include a housing 223 where the housing 223 holds the shear plate 118. In some embodiments, the housing 223 is mounted on the stabilizing base 219 as shown. The three-dimensional (3D) microscopy for automated cell identification and visualization system 215 is configured to position the light source 110, the sample holder located in the specimen plane 124, the objective lens 116, the shear plate 118 and the imaging device 120 in a common path shearing interferometry configuration.

As an example, the light source 110, specimen plane 124, and microscope objective lens 116 can be disposed within the housing 223. The light source 110 can be disposed below the specimen plane 124. The laser diode can emit a beam through the specimen plane 124, illuminating the sample disposed on the sample holder. The microscope objective lens 116 can be disposed above the specimen plane 124. The microscope objective lens 116 can magnify the beam illuminating the sample. The beam can intersect with the shear plate 118 which is disposed above the microscope objective lens 116.

The housing 223 can further include an opening 221 disposed on the outside face of the housing 223. The opening 223 can be configured to receive the imaging device. As an example, the opening can be round to receive the imaging device. The opening 221 can be disposed below the shear plate 118.

Figure 33:
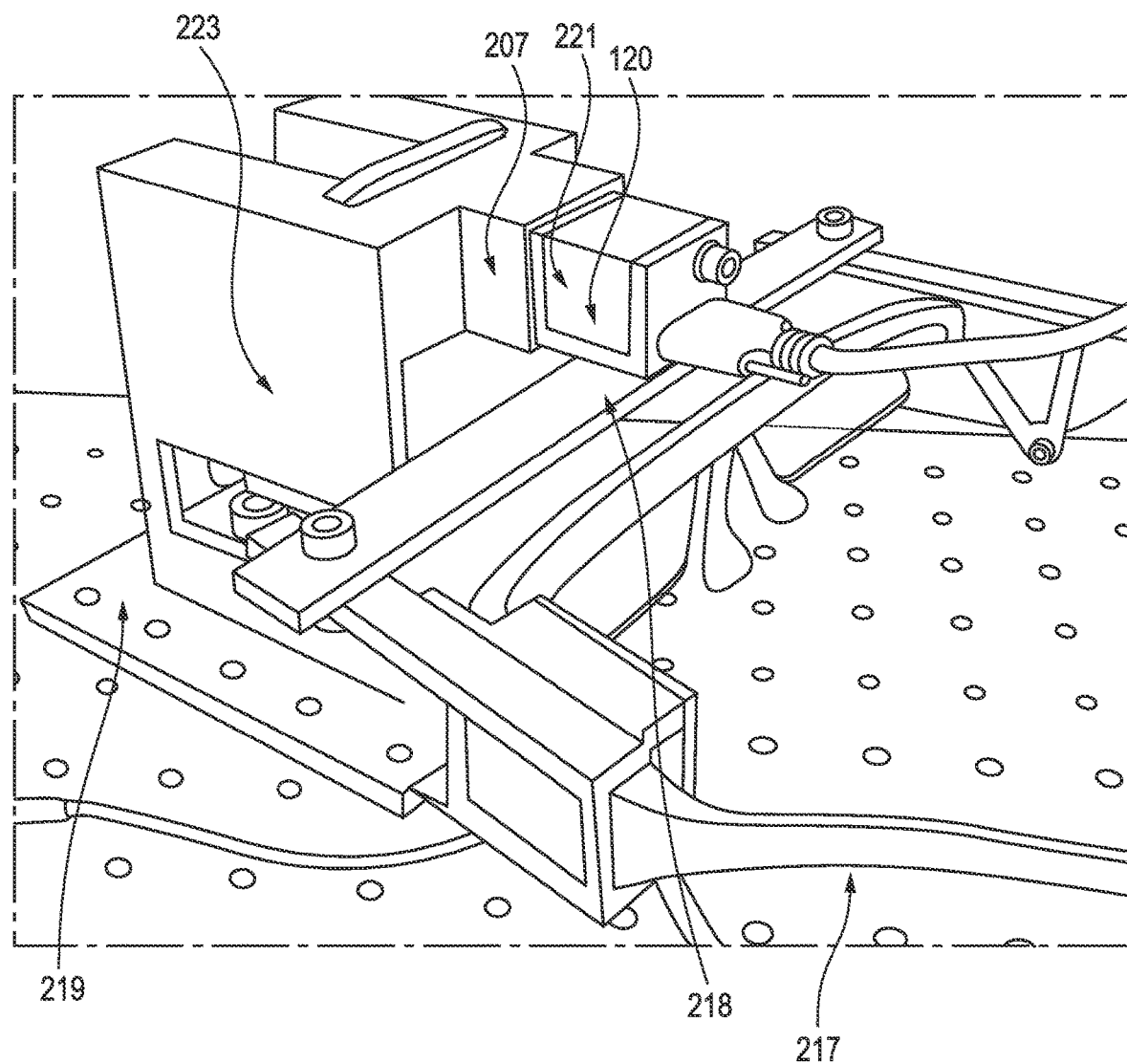
FIG. 33 illustrates the exemplary setup for three-dimensional (3D) microscopy for the three-dimensional (3D) microscopy for the automated cell identification and visualization system 215 in accordance with an exemplary embodiment.

FIG. 33 illustrates the example setup 222 for three-dimensional (3D) microscopy for the three-dimensional (3D) microscopy for the automated cell identification and visualization system 215. As described above, the setup 222 can include an opening 221 to receive an imaging device 120. The imaging device 120 can be mounted to augmented reality display device 217 such as glasses. The imaging device 120 can be mounted to the augmented reality display device 217 using an attachment 218. The attachment 218 can hold the augmented reality display device 217 (e.g., glasses) and the imaging device 120 in place. A portion of the imaging device 120 can be inserted into the opening 221 of the housing 223. The imaging device 120 can capture one or more images of two sheared beams.

The stabilizing base 219 may be mounted to any hard surface, however, the setup 222 can be portable and may be used without being mounted to a surface. In the sensing stage (i.e., while the imaging device 120 is capturing images of the two sheared beams), the augmented reality device 217 (i.e., head mounted device) can be connected to the device during the data recording process. A user can remove the augmented reality device 217 from the setup 222 and visualize the results using the augmented reality device 217.

As a non-limiting example, the setup 222 can be 150 mm tall from the bottom of the green stabilizing base 219 to the top of the shear plate 118. Excluding the stabilizing base 219, the setup 222 can be 93 mm wide where the imaging device 120 can connect to the housing 223 (80 mm wide excluding the connector) and 80 mm in length.

Shearing geometry can allow the use of a common path setup, in which both the object and reference beams travel in the same direction, making the setup compact, robust, and more resistant to mechanical noise (vibrations) due to self-referencing and a low number of optical components. In comparison shearing geometry provides high temporal stability. The fringe frequency can be controlled by varying the thickness of the shear (glass) plate or by simply using a glass wedge for more control.

Numerical Reconstruction

In one embodiment, in the event objects are mainly transparent, phase objects and propagation distances are small, the angular spectrum propagation (ASP) approach can be best suited. The complex amplitude U(x,y,0) at the hologram plane can be obtained by illuminating the hologram by the reference wave as follows:

$$U(x,y,0)=h(x,y)R(x,y),$$

where h(x,y) is the hologram function, and R(x,y) is the complex reference wave. Once a hologram has been recorded, the Fourier transform of the wave field at the hologram plane (U(x,y,0)), can be taken, followed by manual filtering of the Fourier spectra and multiplying by the free space propagation function. An inverse Fourier transform can then be taken, leading to the reconstructed image at the image plane:

$$U(x, y, d) = \Im^{-1}\left\{filt[\Im\{U(x, y, 0)\}]e^{ikd\sqrt{1-\lambda^2 f_x^2-\lambda^2 f_y^2}}\right\},$$

where $\Im\{.\}$ and $\Im^{-1}\{.\}$ denote Fourier transform and inverse Fourier transform operations, respectively; $f_x$ and $f_y$ are the spatial frequencies; $k=2\pi/\lambda$, where $\lambda$ is the wavelength; and $$e^{ikd\sqrt{1-\lambda^2 f_x^2-\lambda^2 f_y^2}}$$

is the transfer function for free space propagation, where d is the distance of propagation. In aforementioned equation, filt[.] is the filtering operation that is the spectrum filtering of one of the conjugate images to eliminate the un-diffracted reference beam (DC or zero order) and the conjugate real image. The complex amplitude at the image plane (U(x,y,d)) is parallel to the hologram plane and separated by distance d. If the hologram plane is at the same distance as the image plane, then d=0, and the aforementioned equation can reduce to:

$$U(x,y,d=0)=\Im^{-1}\{filt[\Im\{U(x,y,0)\}]\}.$$

The phase of the object wavefront is given by the angle between the complex amplitude and the real axis, i.e., $\phi(x,y)=\tan^{-1}$ Im(U(x,y))/Re(U(x,y)). The wrapped phase is unwrapped using Goldstein's branch-cut method to yield the unwrapped continuous phase map, which can be used to calculate the OPL inform.

Numerical reconstruction can be implemented using MATLAB. For an area of 512×512 pixels (21 μm×21 μm for Basler acA3800-14 um and 40× magnification) using a computer with 3.07 GHz Intel i7 Processor, the reconstruction can take ~3.5 s. The computational speed can be increased by dedicated software and hardware.

Temporal Stability

In one embodiment, temporal stability of the three-dimensional (3D) microscopy for the automated cell identification and visualization system 215 can be tested. To test the temporal stability of the three-dimensional (3D) microscopy for the automated cell identification and visualization system 215 2400 fringe patterns, can be recorded, for 60 s at the frame rate of 40 Hz using a sensor area of 512×512 pixels by exploiting the windowing function of the CMOS sensor. Windowing can allow for the selection of a region of interest from the available sensor area, which can result in a higher frame rate of acquisition and reduced computation time. The stability can be tested at two different locations, a floating optical bench and a wooden table. The three-dimensional (3D) microscopy for the automated cell identification and visualization system 215 can be implemented in a controlled laboratory setting and a practical environment. A video of fringe patterns can be recorded at each location. The path length changes can be computed by comparing the reconstructed phase distribution for each frame to a previously recorded reference background.

Figure 34:
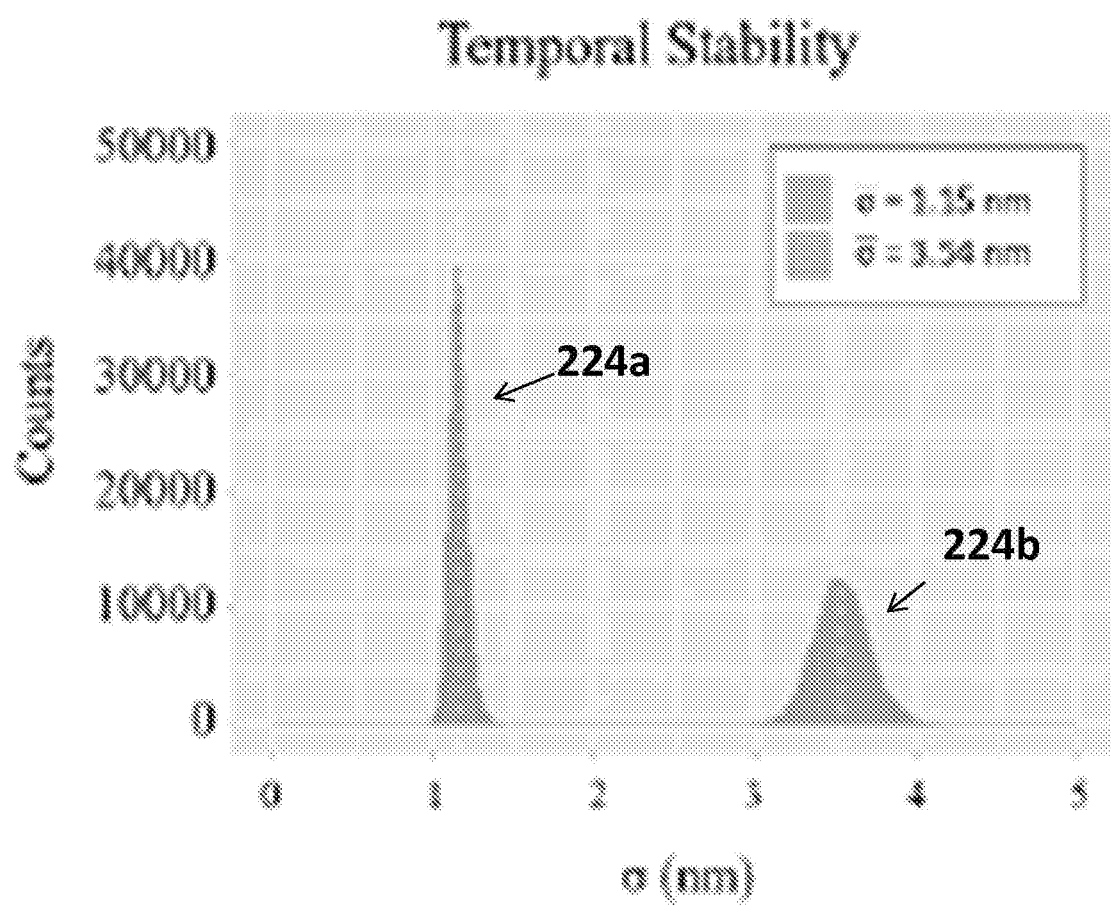
FIG. 34 shows the computed stabilities of the setup placed on a floating optical bench and on a wooden table.

FIG. 34 shows the computed stabilities of the setup 222 placed on a floating optical bench and on a wooden table. When placed on a floating optical bench, the setup 222 had an average standard deviation, $\bar{\sigma}$, of 1.15 nm (FIG. 34 224a). When placed on a wooden table, the stability of the system decreases to $\bar{\sigma}$=3.54 nm (FIG. 34 224b). The stability of the three-dimensional (3D) microscopy for the automated cell identification and visualization system 215 can be shown to be in the range of a few nanometers, which can be sufficient for all of the cases described herein. The stability of the three-dimensional (3D) microscopy for the automated cell identification and visualization system 215 can be based on the laser used in this three-dimensional (3D) microscopy for the automated cell identification and visualization system 215. As previously noted, the laser diode can be for its compact size. The stability of the three-dimensional (3D)

microscopy for the automated cell identification and visualization system 215 can be further increased by using different laser diodes.

Classification

Five classes (micro-objects) can used for testing classification in the three-dimensional (3D) microscopy for the automated cell identification and visualization system 215. These classes can be diatom phytoplankton, diatom pennate, navicula, selenastrum, and 20 μm glass beads (SPI Supplies). Diatom phytoplankton and diatom pennate are two specific diatoms included in a fixed slide sample of mixed diatoms (Carolina Biological). Navicula (Carolina Biological) is another class of diatom that is rod shaped, and selenastrum (Carolina Biological) is a green alga that is sickle shaped. As with any live microorganisms, there may be variations in the shape of these organisms. All samples can be under 40× magnification using the setup 222 shown in FIGS. 32-33. After image acquisition, the digital hologram can be processed to extract the phase image, which is then manually segmented to allow for reconstruction of a cell.

Fifty cells from each class can be reconstructed, and the following morphological features can be extracted from the optical path length maps: MOPL, COV, OV, PA, PA/OV ratio, cell skewness, and cell kurtosis. In particular, cell kurtosis describes the flatness of a cell and is a measure of whether the OPL data of a cell is heavy-tailed or light-tailed in comparison to normal distribution. Cell skewness measures the symmetry in cell OPL data. OV can be computed by multiplying the OPL by the area of the object, where area is calculated by taking into consideration the pixel size and magnification used in the system. For feature extraction, OPL can be used as opposed to height information, as the refractive index difference between the sample and media may not be known for all classes.

Figure 35:
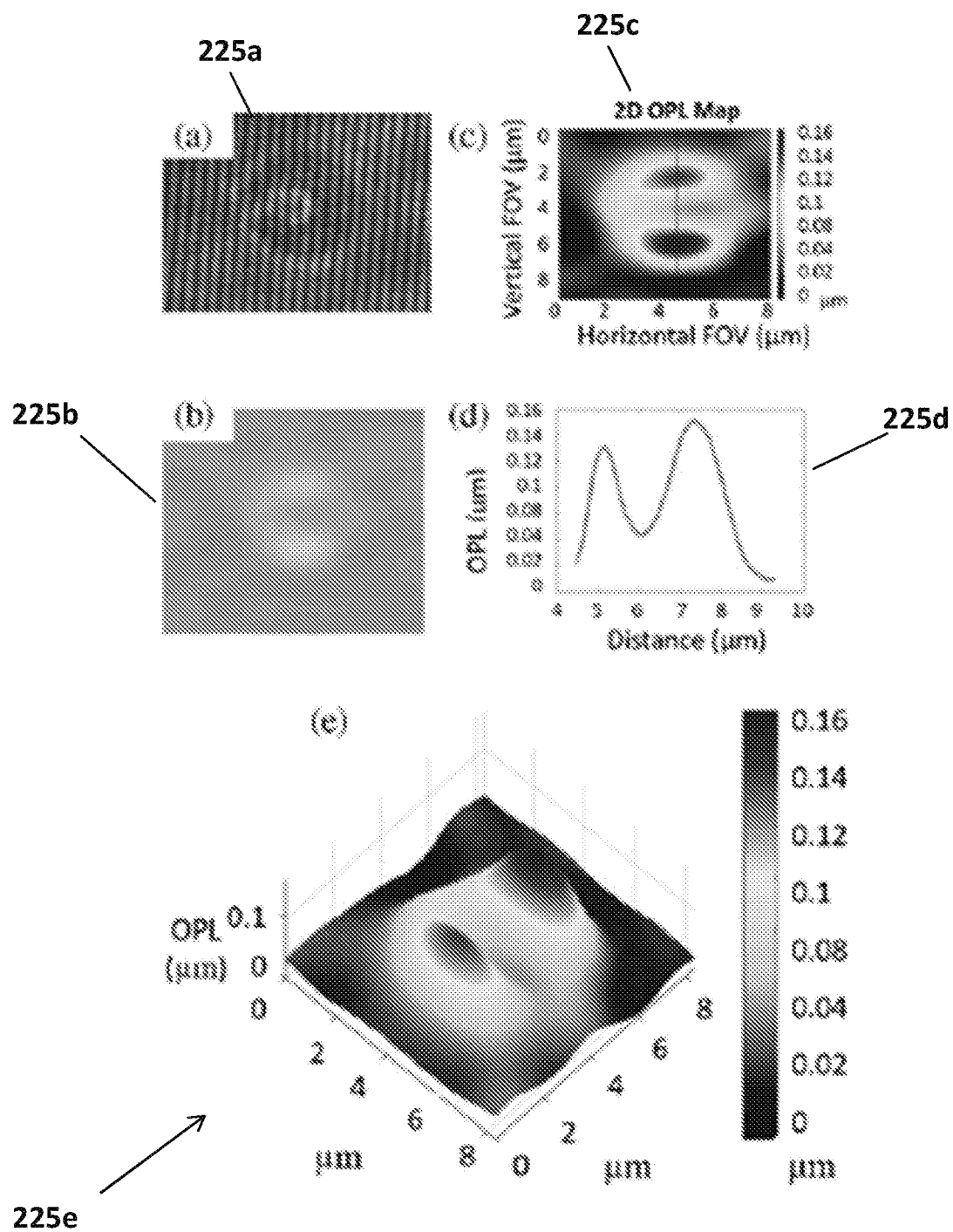
FIG. 35 illustrates experimental results for selenastrum imaged using the setup as shown in FIGS. 32-33.

FIG. 35 illustrates experimental results for selenastrum imaged using the setup 222 shown in FIGS. 32-33. FIG. 35 225a depicts a digital hologram of the algae, 225b depicts a wrapped phase map of the object, 225c depicts a 2D optical path length map, 225d depicts a 1D line profile along the line in 225c, 225a depicts a pseudocolor 3D rendering of the optical path length profile for selenastrum.

An example of selenastrum is shown in FIG. 35. FIG. 35 225a shows the region of interest for selenastrum. From the digital hologram, the wrapped phase image 225b is computed. The phase image is unwrapped, allowing for the OPL to be computed. The results can be displayed by a two-dimensional (2D) OPL map 225c, one-dimensional (1D) line profile 225d or a pseudocolor 3D rendering of the cell's OPL profile 225e.

Figure 36:
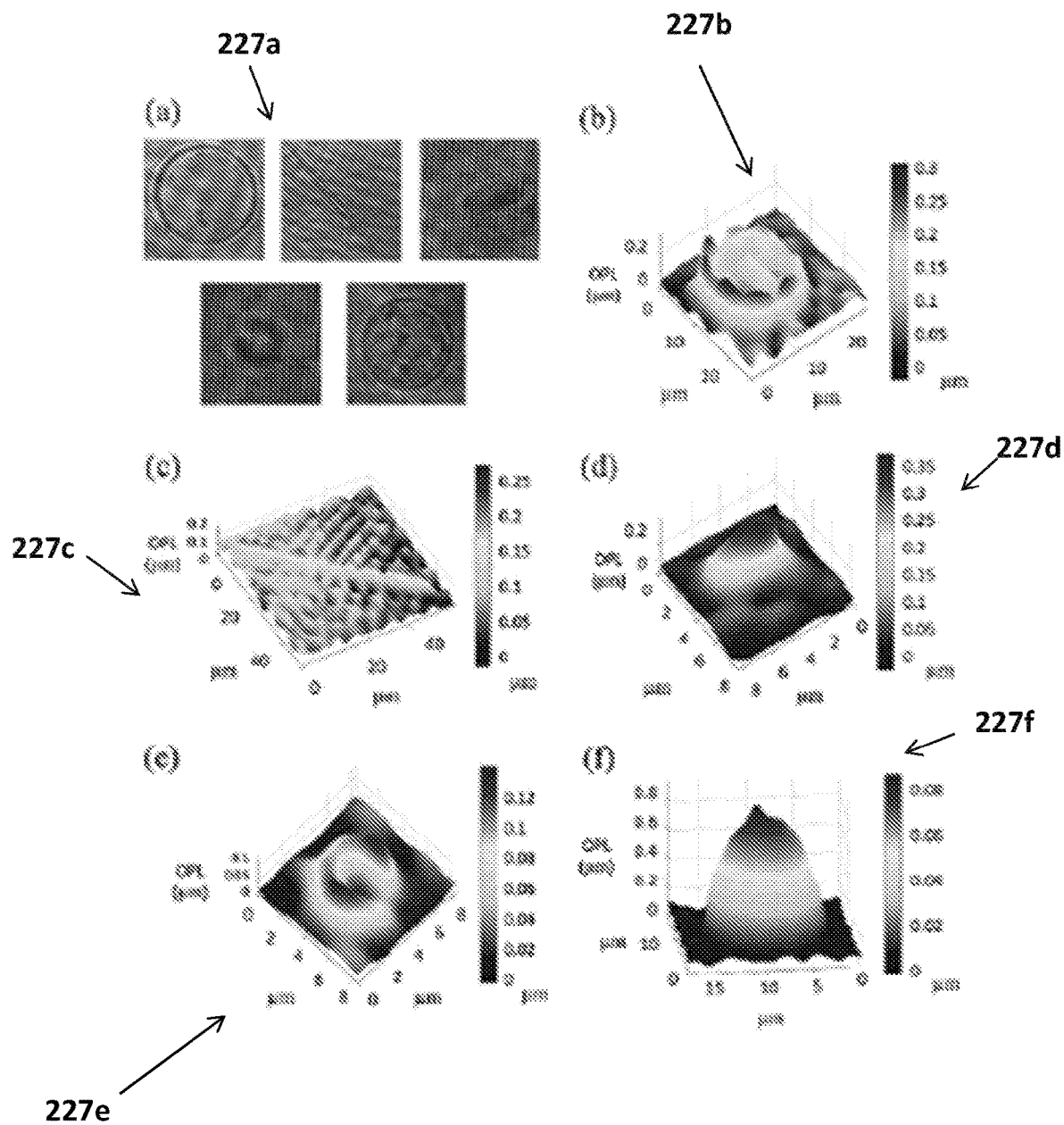
FIG. 36 shows the digital holograms for all five classes along with the corresponding digital reconstructions.

FIG. 36 shows the digital holograms for all five classes 227a, along with the corresponding digital reconstructions 227b-f. For classification, series of algorithms can be used, including the RF classifier, the SVM classifier, and the KNN classifier. Multiple classifiers can be used as performance may vary depending upon the datasets. RF is an ensemble learning method for classification and regression. The classifier can construct multiple independent decision trees during training and then output the class that is the mode of the classes determined by the individual trees. For the RF model, 100 decision trees can be used, following the Gini diversity index criteria to form the trees. Based on the aforementioned extracted features, 25 reconstructions from each class can be used as training data for the RF classifier, while the remaining 25 reconstructions can be used as testing data. In each classifier, class 1 represents diatom phytoplankton, class 2 represents diatom pennate, class 3 represents navicula, class 4 represents selenastrum, and class 5 represents 20 μm glass beads. For each confusion matrix, the actual class represents the actual class of the object being classified, whereas the predicted class is the output of the classifier.

TABLE 2

Classification Results for Random Forest for Data Acquired Using the Proposed Imaging Setup (FIGS. 31-33)

| | P1 | P2 | P3 | P4 | P5 |
|---|---|---|---|---|---|
| A1 | 25 | 0 | 0 | 0 | 0 |
| A2 | 0 | 25 | 0 | 0 | 0 |
| A3 | 0 | 0 | 25 | 0 | 0 |
| A4 | 0 | 0 | 3 | 22 | 0 |
| A5 | 0 | 0 | 0 | 0 | 25 |

A1, Actual Class 1;
A2, Actual Class 2;
A3, Actual Class 3;
A4, Actual Class 4;
A5, Actual Class 5;
P1, Predicted Class 1;
P2, Predicted Class 2;
P3, Predicted Class 3;
P4, Predicted Class 4;
P5, Predicted Class 5

TABLE 3

Classification Results for Support Vector Machine (SVM) for Data Acquired Using the Proposed Imaging Setup (FIGS. 31-33)

| | P1 | P2 | P3 | P4 | P5 |
|---|---|---|---|---|---|
| A1 | 25 | 0 | 0 | 0 | 0 |
| A2 | 4 | 21 | 0 | 0 | 0 |
| A3 | 0 | 0 | 21 | 4 | 0 |
| A4 | 0 | 0 | 0 | 25 | 0 |
| A5 | 0 | 0 | 0 | 0 | 25 |

A1, Actual Class 1;
A2, Actual Class 2;
A3, Actual Class 3;
A4, Actual Class 4;
A5, Actual Class 5;
P1, Predicted Class 1;
P2, Predicted Class 2;
P3, Predicted Class 3;
P4, Predicted Class 4;
P5, Predicted Class 5

TABLE 3

Classification Results for K-Nearest Neighbor (KNN) for Data Acquired Using the Proposed Imaging Setup (FIGS. 31-33)

| | P1 | P2 | P3 | P4 | P5 |
|---|---|---|---|---|---|
| A1 | 21 | 0 | 0 | 4 | 0 |
| A2 | 1 | 20 | 2 | 2 | 0 |
| A3 | 0 | 0 | 22 | 3 | 0 |
| A4 | 0 | 0 | 1 | 24 | 0 |
| A5 | 0 | 0 | 0 | 0 | 25 |

A1, Actual Class 1;
A2, Actual Class 2;
A3, Actual Class 3;
A4, Actual Class 4;
A5, Actual Class 5;
P1, Predicted Class 1;
P2, Predicted Class 2;
P3, Predicted Class 3;
P4, Predicted Class 4;
P5, Predicted Class 5.

Tables 2-4 show the confusion matrices for this dataset using the RF classifier, the SVM classifier, and the KNN classifier, respectively. Classification accuracy is calculated by (TP+TN)/N where TP is the number of true positives (i.e., predicted class 1 for actual class 1), TN is the number of true negatives, and N is the total number of test data. A1-A5 refer to the micro-objects in FIG. 36, respectively. Classification between the five classes using the RF classifier was 97.6% accurate. Using the same set of morphological features and dataset as used in the RF model, the SVM classifier was modeled with a cubic kernel, and a multiclass method of one-versus-one (Table 3). SVMs perform slightly worse than RF with a classification accuracy of 93.6%. Lastly, the KNN classifier can be used for predicting the class of an unknown sample using the Euclidean distance metric and the number of neighbors set to one. Table 4 shows the results using the KNN classifier, which is 89.6%.

In general, a larger training sample size is preferable to a smaller sample size, and the use of a sample size that is too small would not allow for drawings conclusions regarding the classification accuracy. Additionally, it is important to use at least half the dataset for training so that the testing sample size does not exceed the training sample size. In our experiments, various training sample sizes with the dataset can be explored, and a sample size of 25 may be an appropriate choice for the objects used.

Live Imaging Sample.

The three-dimensional (3D) microscopy for the automated cell identification and visualization system 215 can be tested by imaging live samples. Videos of paramecium caudatum (Carolina Biological) can be recorded under 60× magnification. In total, 200 frames can be recorded at a frame rate of 15 frames per second. Videos can be limited to 200 frames to keep computation times low. The frames of the video can be then reconstructed individually and combined in their original order to create a video of the paramecium's pseudocolor 3D rendering.

Figure 37:
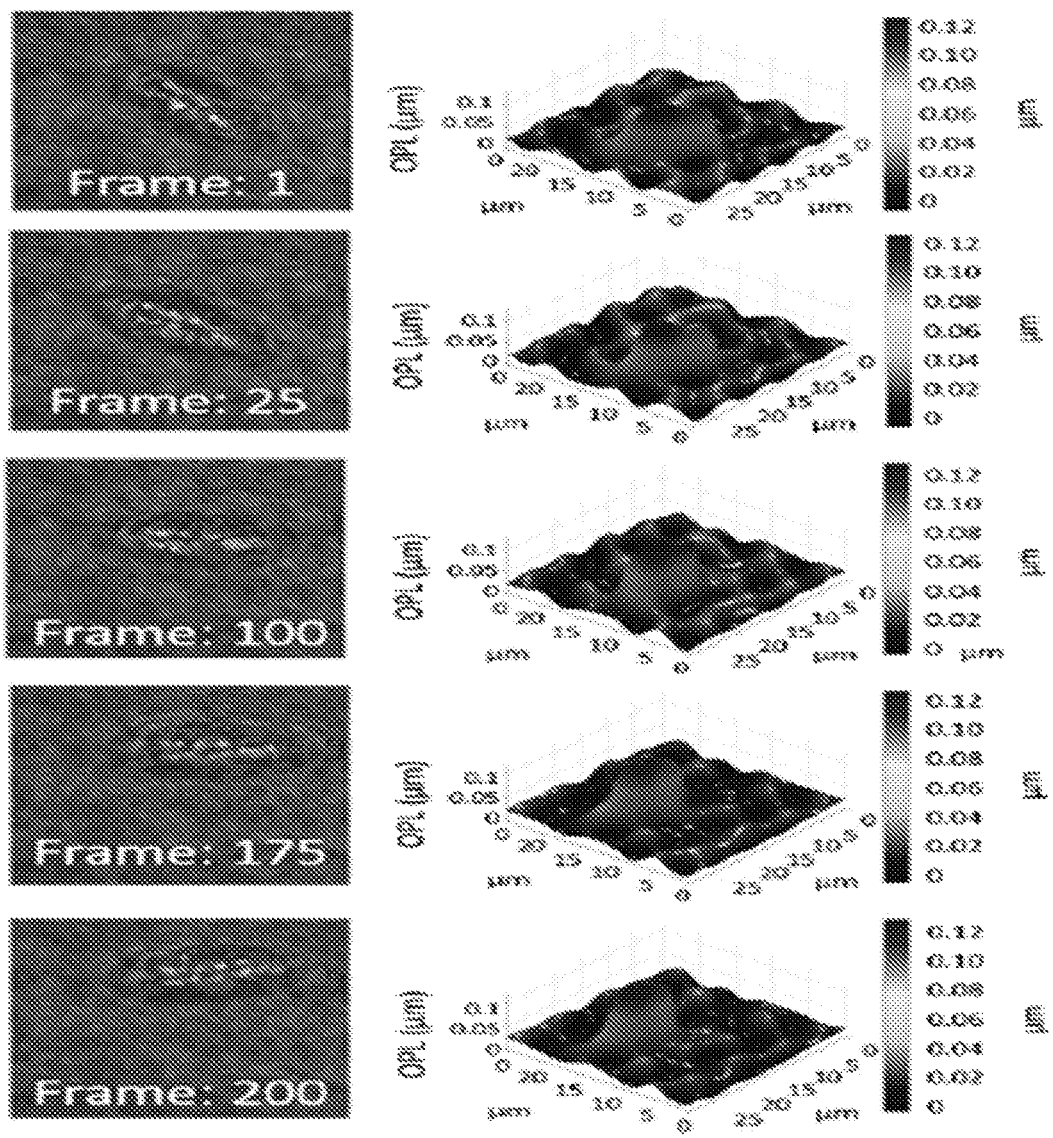
FIG. 37 shows frames of the digital holographic recording and their corresponding reconstruction for selected frames of the video.

FIG. 37 shows frames of the digital holographic recording and their corresponding reconstruction for selected frames of the video. The full video as seen through the augmented reality device along with extracted features of the paramecium is shown in Visualization 1. These features can be extracted for the first frame of the video for simplification, though the features could be extracted and updated for each frame of the video if accurate measurements at specific frames are important. The visualization shows the holographic reconstruction as well as a test tube sample from Carolina Biological to illustrate the augmented reality capabilities of the three-dimensional (3D) microscopy for the automated cell identification and visualization system 215. Processing of this video took approximately 30 s per frame using a computer with 3.07 GHz Intel i7 Processor and MATLAB software. It can be appreciated that dedicated software and hardware can be used to reduce computational time.

Visualization with an Augmented Reality Device

Figure 38:
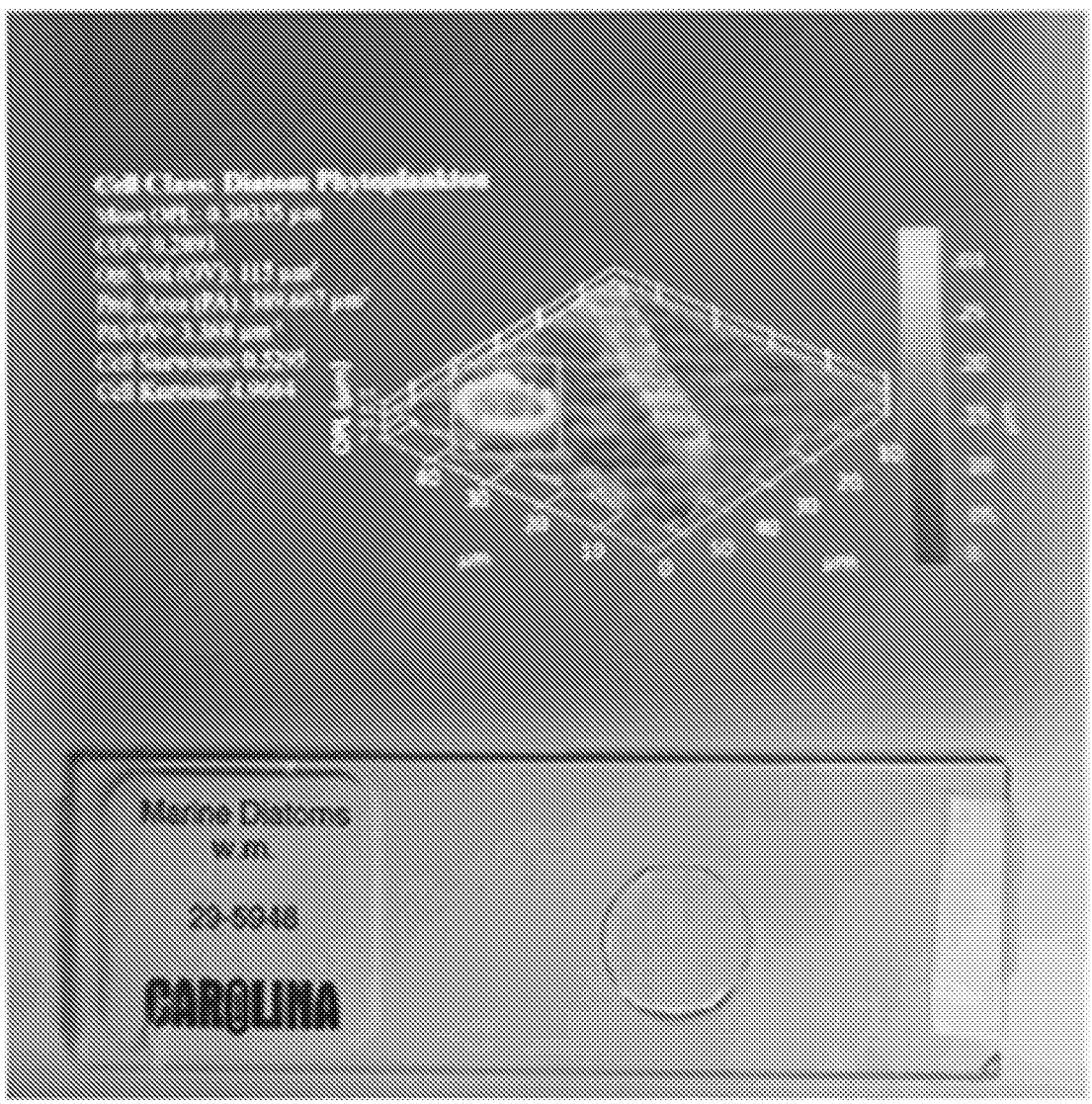
FIG. 38 shows a scene where both diatom pennate and diatom phytoplankton can be imaged and reconstructed, and diatom phytoplankton has been correctly classified.

Following reconstruction of the manually segmented region of interest, feature extraction, and classification, the final visualizations of the pseudocolored 3D rendering of the cell along with the cell's identified class and other extracted information are displayed on the augmented reality device (i.e., head mounted device). FIG. 38 shows a scene where both diatom pennate and diatom phytoplankton can be imaged and reconstructed, and diatom phytoplankton has been correctly classified. This allows a user to visualize the pseudocolor 3D rendering of the OPL profile for a microscopic object while maintaining vision of the sample from which it was taken. It also shows the extracted features of MOPL, COV, OV, PA, PA/OV, cell skewness, and cell kurtosis with the corresponding extracted value for each feature.

The three-dimensional (3D) microscopy for the automated cell identification and visualization system 215 can successfully work using samples such as fixed and live microorganisms, such as diatoms, algae, and paramecium. Samples can be presented on the augmented reality device by the pseudocolor 3D rendering of their optical path length profile and their associated extracted features. From the reconstructions, features can be extracted about the specimen, such as MOPL, COV, OV, PA, PA/OV ratio, cell skewness, and cell kurtosis. These features are valuable cell properties that can be used to determine the correct identification of a cell or be used as marker of overall health.

The three-dimensional (3D) microscopy for the automated cell identification and visualization system 215 can successfully classified between the five classes of microorganisms in our experiments using the RF classifier, SVMs, and KNN with 97.6%, 93.6%, and 89.6% accuracy, respectively. The ability to image live cells and display their pseudocolor 3D rendering to augmented reality devices can be implemented for medical applications, as it allows biological samples to be studied in label free settings and to quickly obtain indicators of a cell's health. A portable system, described herein for cell identification and visualization, may be used to make healthcare more attainable even when testing laboratories are not accessible. Moreover, the three-dimensional (3D) microscopy for the automated cell identification and visualization system 215 can be further automated which may allow diagnoses to be performed remotely, cutting down the diagnosis time and expanding care for hard to reach places.

Figure 39:
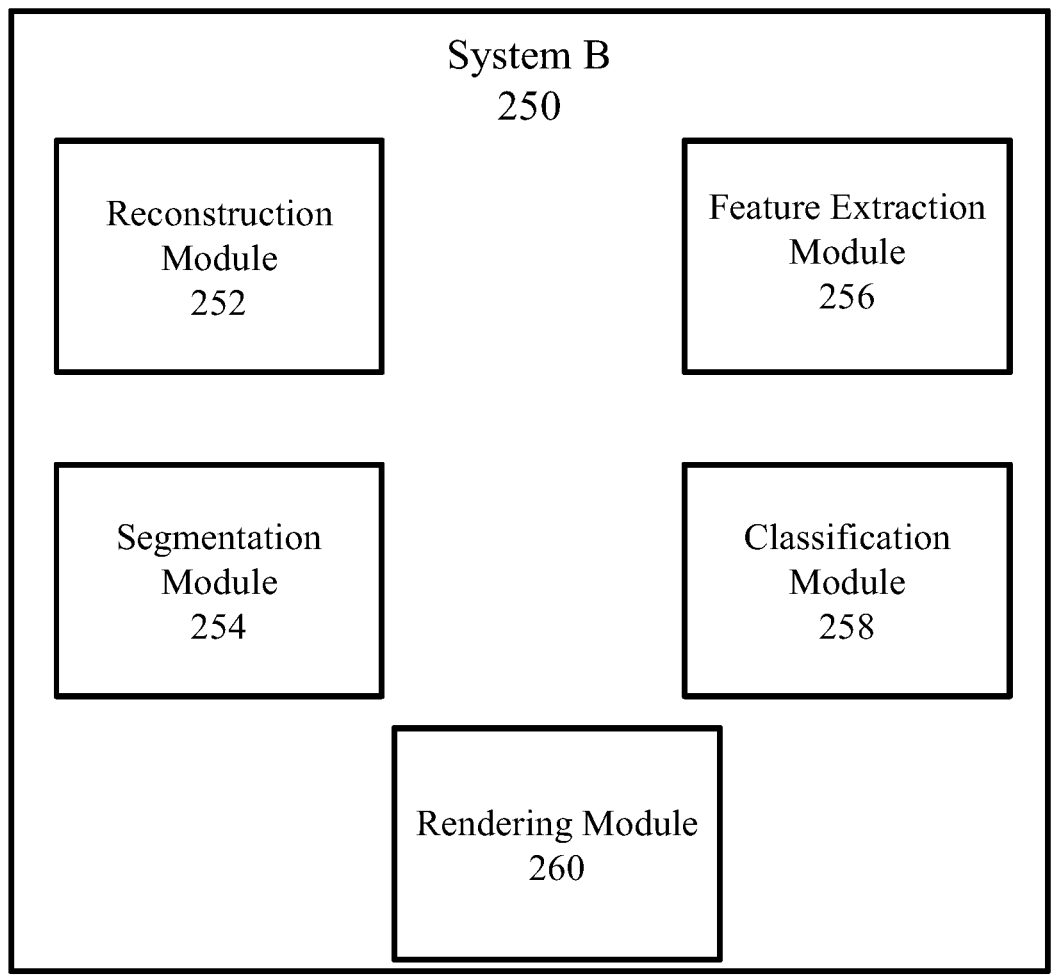
FIG. 39 is a block diagram showing an exemplary system for three-dimensional (3D) microscopy for the automated cell identification and visualization system 215 using an augmented reality display device, according to an example embodiment.

FIG. 39 illustrates an augmented reality display device 217. As described above, the augmented reality display device 217 can be embodied as a head mounted display (HMD). The augmented reality display device 217 can render an augmented reality display according to an exemplary embodiment. The augmented reality display device 217 and a computing system 510 can be communicatively coupled to each other via wireless or wired communications such that the augmented reality display device 217 and the computing system 510 can interact with each other to the augmented reality display. The computing system 510 will be discussed in further details with reference to FIG. 41.

The augmented reality display device 217 include circuitry disposed within a housing 350. The circuitry can include a display system 310 having a right eye display 322, a left eye display 324, one or more image capturing devices 326, one or more display controllers 338 and one or more hardware interfaces 340. The display system 310 can render an augmented reality display.

The right and left eye displays 322 and 324 can be disposed within the housing 350 such that the right display is positioned in front of the right eye of the user when the housing 350 is mounted on the user's head and the left eye display 324 is positioned in front of the left eye of the user when the housing 350 is mounted on the user's head. In this configuration, the right eye display 322 and the left eye display 324 can be controlled by one or more display controllers 338 to render images on the right and left eye displays 322 and 324 to induce a stereoscopic effect, which can be used to generate three-dimensional images. In exemplary embodiments, the right eye display 322 and/or the left eye display 324 can be implemented as a light emitting diode display, an organic light emitting diode (OLED) display (e.g., passive-matrix (PMOLED) display, active-matrix (AMOLED) display), and/or any suitable display.

In some embodiments the display system 310 can include a single display device to be viewed by both the right and left eyes. In some embodiments, pixels of the single display device can be segmented by the one or more display controllers 338 to form a right eye display segment and a left eye display segment within the single display device, where different images of the same scene can be displayed in the right and left eye display segments. In this configuration, the right eye display segment and the left eye display segment can be controlled by the one or more display controllers 338 disposed in a display to render images on the right and left eye display segments to induce a stereoscopic effect, which can be used to generate three-dimensional images.

The one or more display controllers 338 can be operatively coupled to right and left eye displays 322 and 324 (or the right and left eye display segments) to control an operation of the right and left eye displays 322 and 324 (or the right and left eye display segments) in response to input received from the computing system 510 and in response to feedback from one or more sensors as described herein. In exemplary embodiments, the one or more display controllers 338 can be configured to render images on the right and left eye displays (or the right and left eye display segments) of the same scene and/or objects, where images of the scene and/or objects are render at slightly different angles or points-of-view to facilitate the stereoscopic effect. In exemplary embodiments, the one or more display controllers 338 can include graphical processing units.

The augmented reality display device 217 can include one or more sensors for providing feedback used to control the augmented reality display. For example, the headset can include image capturing devices 326, accelerometers 328, gyroscopes 330 in the housing 350 that can be used to detect movement of a user's head or eyes. The detected movement can be used to form a sensor feedback to affect augmented reality display. As an example, if the images captured by the camera indicate that the user is looking to the left, the one or more display controllers 338 can cause a pan to the left in the augmented reality display. As another example, if the output of the accelerometers 328 and/or gyroscopes 330 indicate that the user has tilted his/her head up to look up, the one or more display controllers can cause a pan upwards in the augmented reality display.

The one or more hardware interfaces 340 can facilitate communication between the augmented reality display device 217 and the computing system 510. The augmented reality display device 217 can be configured to transmit data to the computing system 510 and to receive data from the computing system 510 via the one or more hardware interfaces 340. As one example, the one or more hardware interfaces 340 can be configured to receive data from the computing system 510 corresponding to images and can be configured to transmit the data to the one or more display controllers 338, which can render the images on the right and left eye displays 322 and 324. Likewise, the one or more hardware interfaces 340 can receive data from the image capturing devices corresponding to eye movement of the right and left eyes of the user and/or can receive data from the accelerometer 328 and/or the gyroscope 330 corresponding to movement of a user's head. and the one or more hardware interfaces 340 can transmit the data to the computing system 510, which can use the data to control an operation of the augmented reality display.

The housing 350 can include a mounting structure 352 and a display structure 354. The mounting structure 352 allows a user to wear the augmented reality display device 217 on his/her head and to position the display structure over his/her eyes to facilitate viewing of the right and left eye displays 322 and 324 (or the right and left eye display segments) by the right and left eyes of the user, respectively. The mounting structure can be configured to generally mount the augmented reality display device 217 on a user's head in a secure and stable manner. As such, the augmented reality display device 217 generally remains fixed with respect to the user's head such that when the user moves his/her head left, right, up, and down, the augmented reality display device 217 generally moves with the user's head.

The display structure 354 can be contoured to fit snug against a user's face to cover the user's eyes and to generally prevent light from the environment surrounding the user from reaching the user's eyes. The display structure 354 can include a right eye portal 356 and a left eye portal 358 formed therein. A right eye lens 360a can be disposed over the right eye portal and a left eye lens 360b can be disposed over the left eye portal. The right eye display 322, the one or more capturing devices 326 behind the lens 360a of the display structure 354 covering the right eye portal 356 such that the lens 356 is disposed between the user's right eye and each of the right eye display 322 and the one or more right eye image capturing devices 326. The left eye display 324 and the one or more image capturing devices 326 can be disposed behind the lens 360b of the display structure covering the left eye portal 358 such that the lens 360b is disposed between the user's left eye and each of the left eye display 324 and the one or more left eye image capturing devices 326.

The mounting structure 352 can include a right and left band (e.g., right and left band 213, 214 as shown in FIG. 31). The right and left band can be wrapped around a user's head so that the right and left lens are disposed over the right and left eyes of the user, respectively. The augmented reality display device 217 can include one or more inertial sensors 309 (e.g., the accelerometers 328 and gyroscopes 330). The inertial sensors 309 can detect movement of the augmented reality display device 217 when the user moves his/her head. The augmented reality display device 217 can adjust the augmented reality display based on the detected movement output by the one or more inertial sensors 309. The accelerometers 328 and gyroscope 330 can detect attributes such as the direction, orientation, position, acceleration, velocity, tilt, pitch, yaw, and roll of the augmented reality display device 217. The augmented reality display device 217 can adjust the augmented reality display based on the detected attributes. For example, if the head of the user turns to the right the augmented reality display device 217 can render the augmented reality display to pan to the right.

FIG. 39 is a block diagram showing a system B 250 in terms of modules for implementing the three-dimensional (3D) microscopy for the automated cell identification and visualization system 215 using an augmented reality display device. The system B 250 can include modules including a reconstruction module 252, a segmentation module 254, a feature extraction module 256, a classification module 258, and a rendering module 260. The modules 252, 254, 256, 258, and 260 may be executing on a computing system associated with an imaging device, or may be provided remotely via a network. In some embodiments, a system B 250 is used to analyze data from the shearing interferometry-based microscope system 100. The modules may include various circuits, circuitry and one or more software components, programs, applications, or other units of code base or instructions configured to be executed by one or more processors (e.g., processors included in a computing system 510 as shown in FIG. 41). In an example embodiment, one or more of modules 252, 254, 256, 258, and 260 are included in a device (e.g., computing system 510 as shown in FIG. 41). In another embodiment, one or more of the modules 2 252, 254, 256, 258, and 260 may be provided remotely by a server through a network. Although modules 252, 254, 256, 258, and 260 are shown as distinct modules in FIG. 39, it should be understood that modules 252, 254, 256, 258, and 260 may be implemented as fewer or more modules than illustrated. It should be understood that one or more of modules 252, 254, 256, 258, and 260 may communicate with one or more components included in exemplary embodiments of the present disclosure (e.g., computing system 510, imaging device 515, server 530, or database(s) 540 of system 500 shown in FIG. 41).

The 252, 254, 256, 258, and 260 may be a software implemented or hardware implemented modules configured to implement the three-dimensional (3D) microscopy for the automated cell identification and visualization system 215 using an augmented reality display device. In one embodiment, after the imaging device has recorded one or more images of the hologram of the sample, the imaging device can transmit the recorded one or more images of the hologram to the computing system. The computing system can execute system B 250 in response to receiving the hologram.

The segmentation module 254 can execute segmentation on the one or more images of the hologram by isolating regions of interest containing the sample in the field of view. The reconstruction module 252 can digitally reconstruct the sample based on the isolated regions of interest containing the sample in the field of view, to generate one or more reconstructed images. The feature extraction module 256 can extract one or more features of the sample from the reconstructed images. The features can be morphological features such as optical volume (OV), coefficient of variation (COV), MOPL, projected area (PA), PA to OV ratio, cell skewness, or cell kurtosis. The morphological features can be extracted from the optical length path maps. The classification module 258 can use the extracted features for classifications using one or more classifiers including but not limited to: random forest (RF) classifier, support vector machines (SVM), or K-nearest neighbor (KNN). The rendering module 260 can generate a visualization of a final 3D rendering of the optical path length profile along with labels for the type of the sample, and the extracted features. The visualization can include a pseudo-colored 3D rendering of the sample, along with an identified class of the sample, and other extracted information. The system B 250 can instruct the augmented reality display device to render the visualization on the display.

FIG. 41 illustrates a network diagram depicting a system 500 for implementing some methods described herein, according to an example embodiment. The system 500 can include a network 505, computing system 510, an augmented reality display device 217, a server 530, and database(s) 540. Each of the computing system 510, server 530, and database(s) 540 may be in communication with the network 505. In some embodiments, the computing system 510 is in wired or wireless communication with the imaging device 515. Although imaging device 515 is shown as connected to the network 505 through computing system 510, additionally or alternatively, imaging device 515 may connect to the network directly. In one embodiment, the imaging device 515 is mounted to or integrated with the augmented display device 217.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Figure 42:
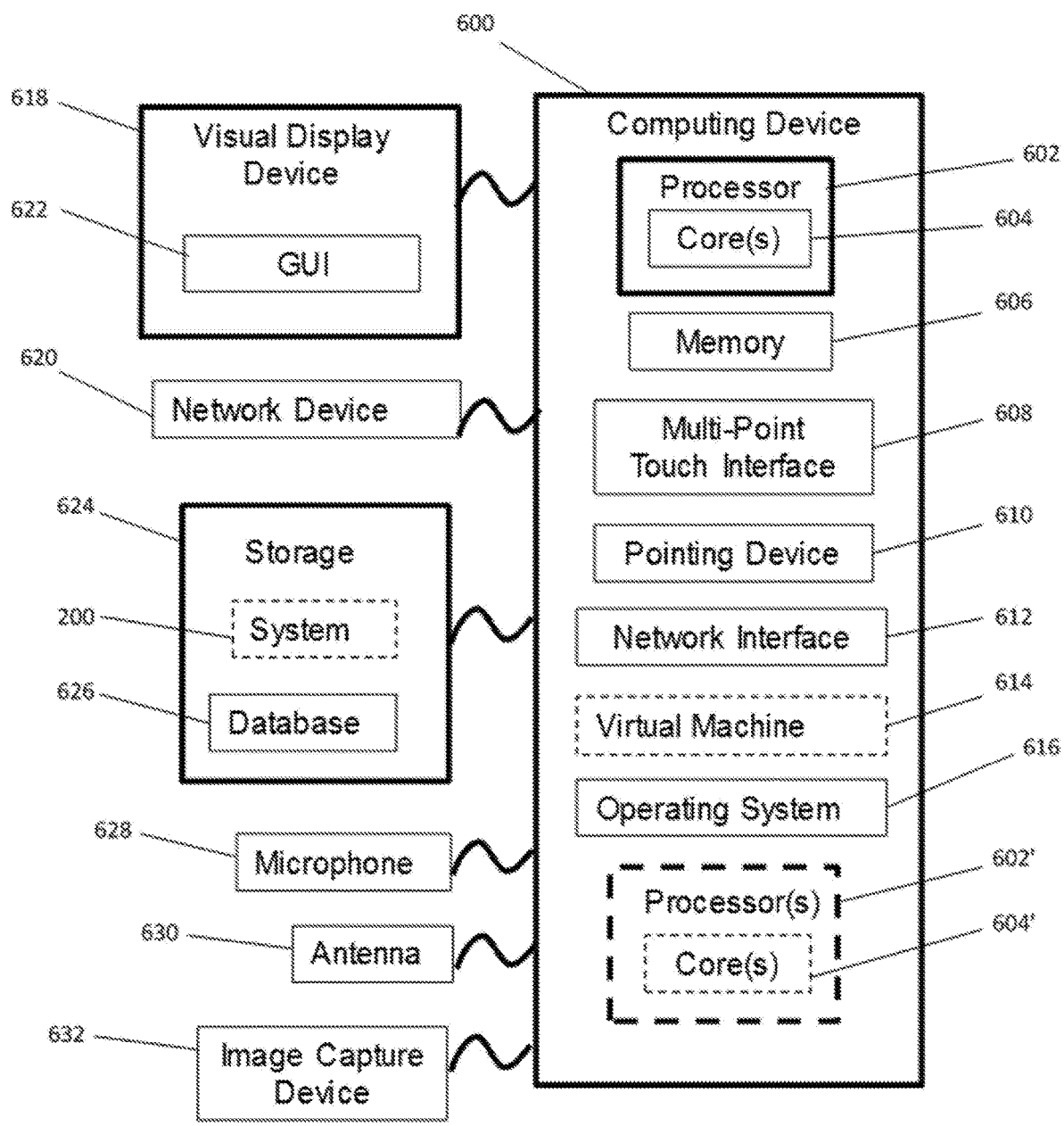
FIG. 42 is a block diagram of an exemplary computing device that may be used with exemplary optical systems to implement exemplary embodiments described herein.

The computing system 510 may include, but is not limited to, one or more work stations, computers, general purpose computers, a data center (a large group of networked computer servers), Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. The computing system 510 can include one or more components described in relation to computing device 600 as shown in FIG. 42.

The computing system 510 may connect to network 505 via a wired or wireless connection. The computing system 510 may include one or more applications or systems such as, but not limited to, a web browser, and the like. In an example embodiment, computing system 510 may perform some of the functionalities described herein.

Each of the database(s) 540 and server 530 is connected to the network 505 via a wired or wireless connection. The server 530 may include one or more computers or processors configured to communicate with the computing system 510 via network 505. In some embodiments, the server 530 hosts one or more applications accessed by the computing system 510 and/or facilitates access to the content of database(s) 540. Database(s) 540 may include one or more storage devices for storing data and/or instructions (or code) for use by the server 530, and/or computing system 510. Database(s) 540 and server 530 may be located at one or more geographically distributed locations from each other or from computing system 510. Alternatively, database(s) 540 may be included within server 530.

Figure 40:
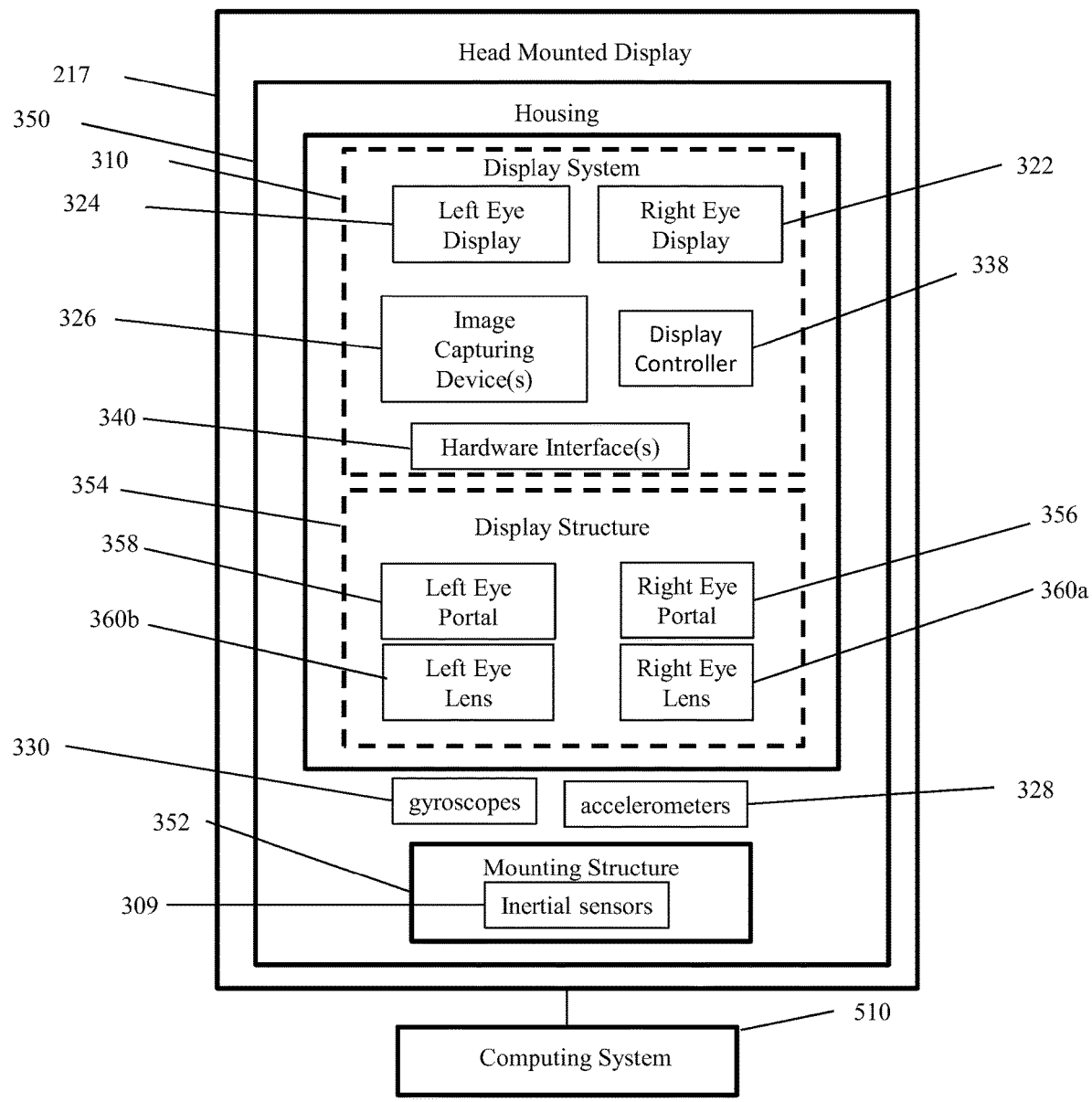
FIG. 40 illustrates an augmented reality display device in accordance with an exemplary embodiment.

In one embodiment, the computing system 510 can execute system A 200 and/or system B 250. The imaging device 515 can be mounted to or integrated with the augmented reality display device 217. As an example, the augmented reality display device 217 can be a head mounted device such as glasses. The augmented reality display device 217 can include a display 525. As an example, the display 525 can be embodied as the display system (e.g., display system 310 as shown in FIG. 40). The display 525 can be configured to render visualizations of a psuedocolored 3D rendering of the sample, along with an identified class of the sample, and other extracted information. In one embodiment, the system B 250 can reside on the computing system 510. Alternatively, or in addition to, the augmented reality display device 217 may have one or more processors to execute system B 250 residing on the augmented reality display device 217.

FIG. 42 is a block diagram of an exemplary computing device 600 that can be used to perform the methods provided by exemplary embodiments. The computing device 600 can be a part of or can fully embody the computing system. The computing device 600 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606 included in the computing device 600 can store computer-readable and computer-executable instructions or software for implementing exemplary embodiments. The computing device 600 also includes processor 602 and associated core 604, and optionally, one or more additional processor(s) 602' and associated core(s) 604' (for example, in the case of computer systems having multiple processors/cores), for executing computer-readable and computer-executable instructions or software stored in the memory 606 and other programs for controlling system hardware. Processor 602 and processor(s) 602' can each be a single core processor or multiple core (604 and 604') processor.

Virtualization can be employed in the computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof.

A user can interact with the computing device 600 through a visual display device 618, such as a touch screen display or computer monitor, which can display one or more user interfaces 619 that can be provided in accordance with exemplary embodiments. The visual display device 618 can also display other aspects, elements and/or information or data associated with exemplary embodiments. The computing device 600 can include other I/O devices for receiving input from a user, for example, a keyboard or other suitable multi-point touch interface 608, a pointing device 610 (e.g., a pen, stylus, mouse, or trackpad). The keyboard 608 and the pointing device 610 can be coupled to the visual display device 618. The computing device 600 can include other suitable conventional I/O peripherals.

In some embodiments, the computing device is in communication with an imaging device 515 or an image capture device 632. In other embodiments, the imaging device is incorporated into the computing device (e.g., a mobile phone with a camera).

The computing device 600 can also include one or more storage devices 624, such as a hard-drive, CD-ROM, or other computer readable media, for storing data and computer-readable instructions and/or software, such as the system A 200 that implements exemplary embodiments of the authentication system described herein, or portions thereof, which can be executed to generate user interface 622 on display 618. Exemplary storage device 624 can also store one or more databases for storing suitable information required to implement exemplary embodiments. Exemplary storage device 624 can store one or more databases 626 for storing data used to implement exemplary embodiments of the systems and methods described herein.

The computing device 600 can include a network interface 612 configured to interface via one or more network devices 620 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of the above. The network interface 612 can include a built-in network adapter, network interface card, PCMCIA network card, card bus network adapter, wireless network adapter, USB network adapter, modem or another device suitable for interfacing the computing device 600 to a type of network capable of communication and performing the operations described herein. Moreover, the computing device 600 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600 can run operating systems 616, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or another operating system capable of running on the computing device and performing the operations described herein. In exemplary embodiments, the operating system 616 can be run in native mode or emulated mode. In an exemplary embodiment, the operating system 616 can be run on one or more cloud machine instances.

Figure 43:
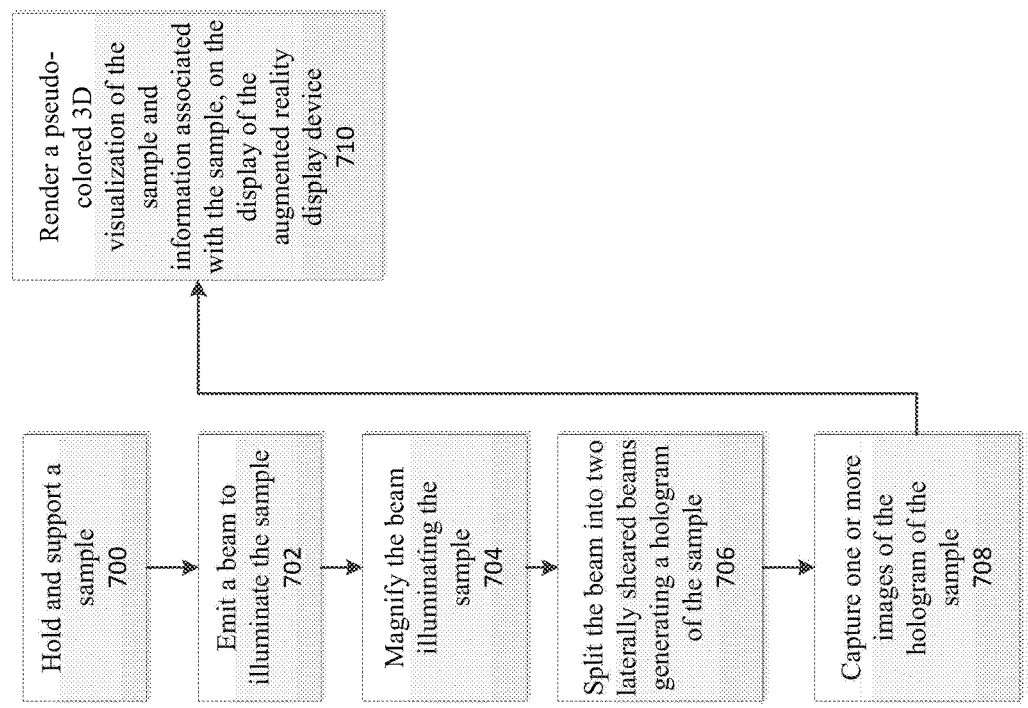
FIG. 43 is a flowchart of the process for implementing the three-dimensional (3D) microscopy for the automated cell identification and visualization system 215 using an augmented reality display device, according to an example embodiment.

FIG. 43 is a flowchart of the process of implementing the three-dimensional (3D) microscopy for the automated cell identification and visualization system 215 using an augmented reality display device. In operation 700, a sample holder can hold and support a sample. In operation 702, a laser light source can emit a beam to illuminate the sample on the sample holder. In operation 704, a microscope objective lens can magnify the beam illuminating the sample. In operation 706, the shear plate can split the beam into two laterally sheared beams generating a hologram of the sample. In operation 708, an imaging device mounted to an augmented reality display device can capture one or more images of the hologram of the sample. In operation 710, the augmented reality display device including a display can to render a pseudo-colored 3D visualization of the sample and information associated with the sample, on the display.

Figure 44:
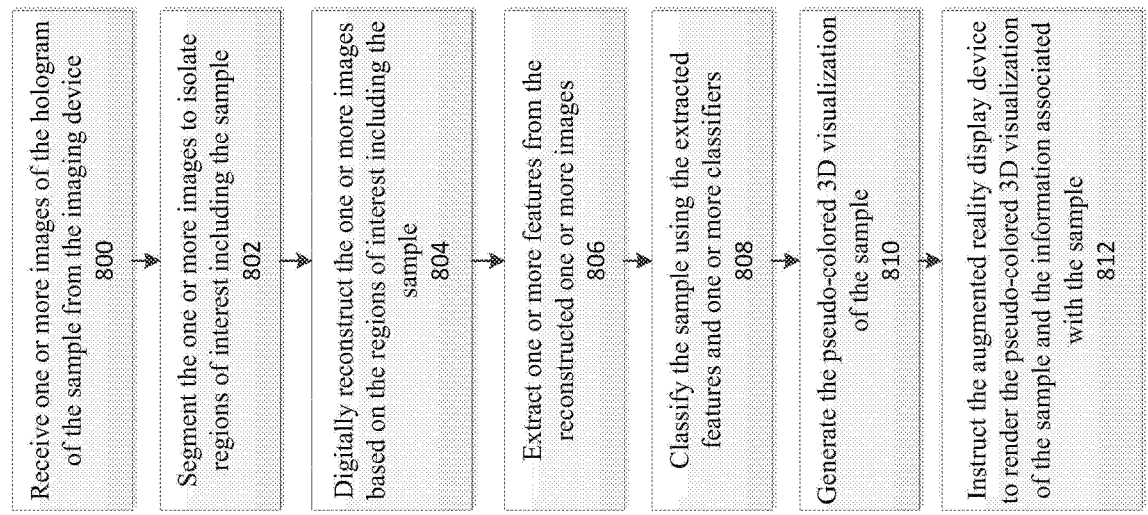
FIG. 44 is a flowchart of the process for implementing the three-dimensional (3D) microscopy for the automated cell identification and visualization system 215 using an augmented reality display device, according to an example embodiment.

FIG. 44 is a flowchart of the process of implementing the three-dimensional (3D) microscopy for the automated cell identification and visualization system 215 using an augmented reality display device. In operation 800, a computing system in communication with the imaging device and augmented reality display device can receive one or more images of the hologram of the sample from the imaging device. In operation 802, the computing system can segment the one or more images to isolate regions of interest including the sample. In operation 804, the computing system can digitally reconstruct the one or more images based on the regions of interest including the sample. In operation 806, the computing system can extract one or more features from the reconstructed one or more images. In operation 808, the computing system can classify the sample using the extracted features and one or more classifiers. In operation 810, the computing system can generate the pseudo-colored 3D visualization of the sample. In operation 812, the computing system can instruct the augmented reality display device to render the pseudo-colored 3D visualization of the sample and the information associated with the sample.

The present disclosure will be further described with respect to the following examples; however, the scope of the disclosure is not limited thereby. The following examples illustrate systems of the present disclosure.

Although the systems/methods of the present disclosure have been described with reference to exemplary embodiments thereof, the present disclosure is not limited to such exemplary embodiments/implementations. Rather, the systems/methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

We claim:

1. A compact, portable common path shearing interferometry based holographic imaging system comprising:
   a light source;
   a sample holder;
   a microscope objective lens;
   a shear plate;
   an imaging device; and
   a housing configured to receive and hold the shear plate and maintain a position of the shear plate relative to the microscope objective lens, wherein the system is configured for positioning the light source, the sample holder, the microscope objective lens, the shear plate and the imaging device in a common path shearing interferometry configuration.

2. The system of claim 1, wherein the system has a length of less than 350 mm, a width of less than 350 mm and a height of less than 300 mm.

3. The system of claim 1, wherein the system has a length of less than 320 mm, a width of less than 320 mm and a height of less than 250 mm.

4. The system of claim 1, wherein the system has a length of less than 150 mm, a width of less than 150 mm and a height of less than 250 mm.

5. The system of claim 1, wherein the system has a mass of less than 6 kg.

6. The system of claim 1, wherein the system has a mass of less than 2 kg.

7. The system of claim 1, wherein the system has a mass of less than 1 kg.

8. The system of claim 7, wherein the system exhibits temporal stability of 0.4 nm or better when used without mechanical isolation.

9. The system of claim 1, wherein the system exhibits a temporal stability of 1.2 nm or better when used without mechanical isolation, where stability is the mean or average of the standard deviation calculated for every pixel of the imaging device over a period of time calculated at a video rate of 30 frames per second.

10. The system of claim 9, wherein the system exhibits temporal stability of 0.9 nm or better when used without mechanical isolation.

11. The system of claim 10, wherein the system exhibits temporal stability of 0.5 nm or better when used without mechanical isolation.

12. The system of claim 1, wherein a beam path of the system is uninterrupted between the light source and the sample holder.

13. The system of claim 1, wherein the light source is a laser light source, and wherein a beam path is disposed between the laser light source and the sample holder.

14. The system of claim 1, wherein the optical path between the light source and the imaging device is uninterrupted except by the microscope objective, the shear plate, the sample and any support for the sample.

15. The system of claim 1, wherein the housing comprises a shearing plate mounting portion including:
   a slot configured to receive the shearing plate;
   a first channel that enables light from the microscope objective to reach the shearing plate; and
   a second channel that enables light from the shearing plate to reach the imaging device, wherein the second channel intersects the first channel.

16. The system of claim 15, wherein the microscope objective is mounted in or at an opening of the first channel.

17. The system of claim 15, wherein the sample holder is mounted on a sidewall of the housing.

18. The system of claim 15, wherein the microscope objective, and the sample holder are mounted to the housing.

19. The system of claim 18, wherein the imaging device is mounted to the housing.

20. The system of claim 18, wherein the light source is mounted to the housing.

21. The system of claim 1, wherein the light source includes a laser diode.

22. The system of claim 1, wherein the imaging device is a mobile phone.

* * * * *